(12) United States Patent
Dascola et al.

(10) Patent No.: US 12,147,591 B2
(45) Date of Patent: Nov. 19, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Jonathan R. Dascola, San Francisco, CA (US); Lorena S. Pazmino, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 177 days.

(21) Appl. No.: 17/949,117

(22) Filed: Sep. 20, 2022

(65) Prior Publication Data

US 2023/0106627 A1 Apr. 6, 2023

Related U.S. Application Data

(60) Provisional application No. 63/408,044, filed on Sep. 19, 2022, provisional application No. 63/248,375, filed on Sep. 24, 2021.

(51) Int. Cl.
*G06T 19/00* (2011.01)
*G06F 3/01* (2006.01)

(52) U.S. Cl.
CPC ............ *G06F 3/011* (2013.01); *G06T 19/006* (2013.01); *G06T 2200/24* (2013.01)

(58) Field of Classification Search
CPC ........ G06F 3/011; G06F 3/012; G06T 19/006; G06T 2200/24
See application file for complete search history.

(56) References Cited

U.S. PATENT DOCUMENTS 9,619,105 B1 4/2017 Dal Mutto
11,650,658 B2 5/2023 Babu et al.
(Continued)

FOREIGN PATENT DOCUMENTS

WO WO 2020/247256 A1 12/2020

OTHER PUBLICATIONS

International Search Report and Written Opinion, dated Mar. 3, 2023, received in International Application No. PCT/US2022/044117, which corresponds with U.S. Appl. No. 17/948,096, 26 pages.
(Continued)

*Primary Examiner* — Chong Wu
(74) *Attorney, Agent, or Firm* — Morgan, Lewis & Bockius LLP

(57) ABSTRACT

A computer system displays an alert at a first position relative to the three-dimensional environment, the alert at least partially overlapping a first object in a first view. The first position has a respective spatial relationship to the user. The computer system detects movement of the user from a first viewpoint to a second viewpoint. At the second viewpoint, the computer system, in accordance with a determination that the alert is a first type of alert, displays the alert at a second position in the three-dimensional environment, the second position having the respective spatial relationship to the user and in accordance with a determination that the alert is a second type of alert, displays the three-dimensional environment from the second viewpoint without displaying the alert with the respective spatial relationship to the user.

57 Claims, 27 Drawing Sheets

(56) References Cited

U.S. PATENT DOCUMENTS

| | | |
|---|---|---|
| 2007/0266336 A1 | 11/2007 | Nojima et al. |
| 2012/0075168 A1 | 3/2012 | Osterhout et al. |
| 2015/0035822 A1 | 2/2015 | Arsan et al. |
| 2017/0039765 A1* | 2/2017 | Zhou .................. G06T 7/521 |
| 2017/0358141 A1 | 12/2017 | Stafford et al. |
| 2018/0350119 A1 | 12/2018 | Kocharlakota et al. |
| 2020/0225813 A1 | 7/2020 | Schwarz et al. |
| 2021/0327146 A1 | 10/2021 | Buerli et al. |
| 2022/0254120 A1 | 8/2022 | Berliner et al. |
| 2022/0413609 A1 | 12/2022 | Mounier et al. |
| 2023/0092874 A1 | 3/2023 | Krivoruchko et al. |
| 2023/0129718 A1 | 4/2023 | Yang |
| 2023/0315202 A1 | 10/2023 | Poulos et al. |
| 2023/0333642 A1 | 10/2023 | Chimalamarri et al. |

OTHER PUBLICATIONS

Invitation to Pay Additional Fees, dated Jan. 20, 2023, received in International Patent Application No. PCT/US2022/044350, which corresponds with U.S. Appl. No. 17/949,117, 16 pages.

International Search Report and Written Opinion, dated Mar. 15, 2023, received in International Patent Application No. PCT/US2022/044350, which corresponds with U.S. Appl. No. 17/949,117, 22 pages.

Duchowski, "Gazed-Based Interaction: A 30 year retrospective", https:www.sciencedirect.com/science/article, Jun. 2018, 11 pages.

Office Action, dated Feb. 7, 2024, received in U.S. Appl. No. 17/948,096, 26 pages.

Notice of Allowance, dated Jun. 20, 2024, received in U.S. Appl. No. 17/948,096, 26 pages.

* cited by examiner

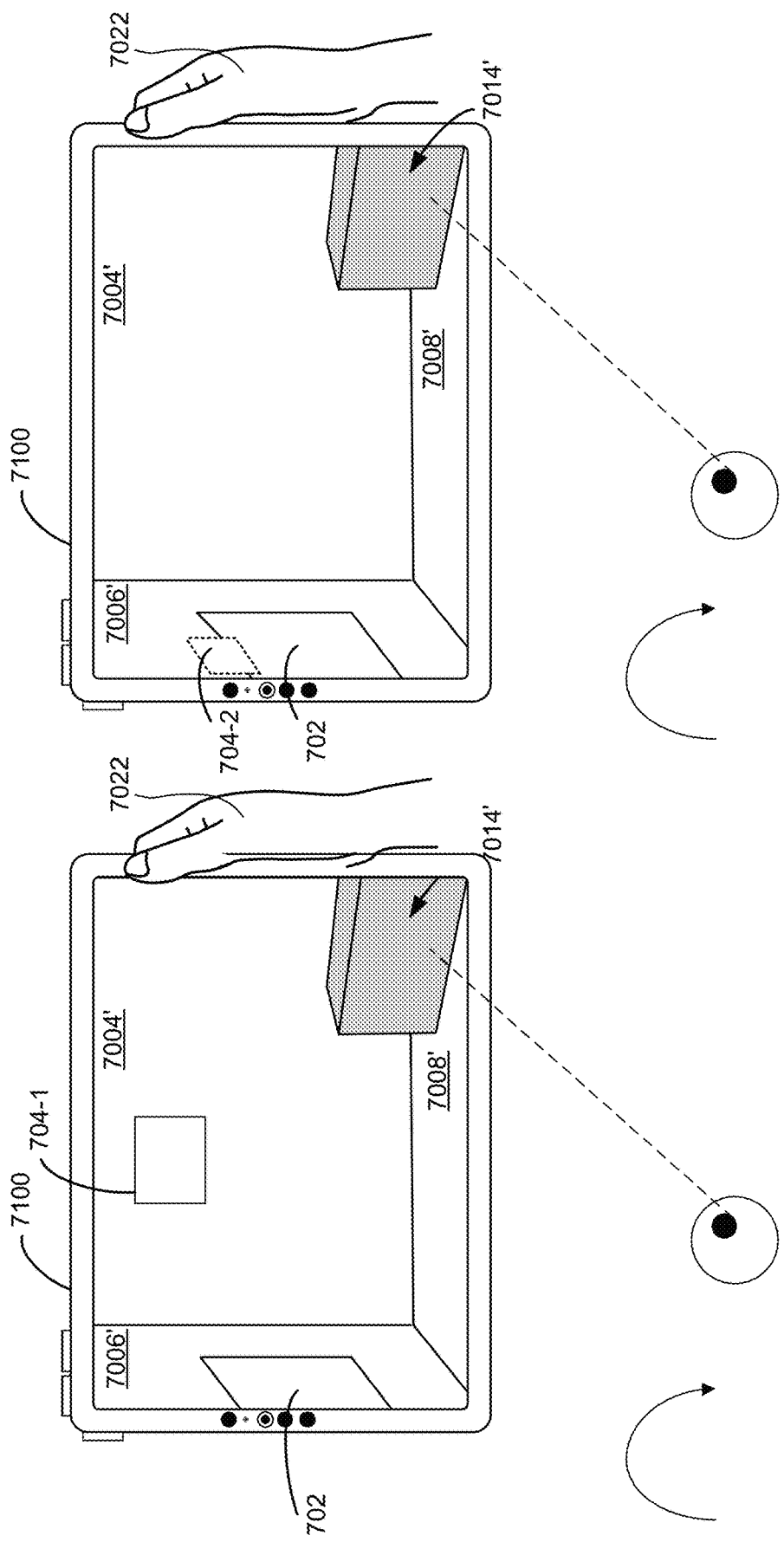

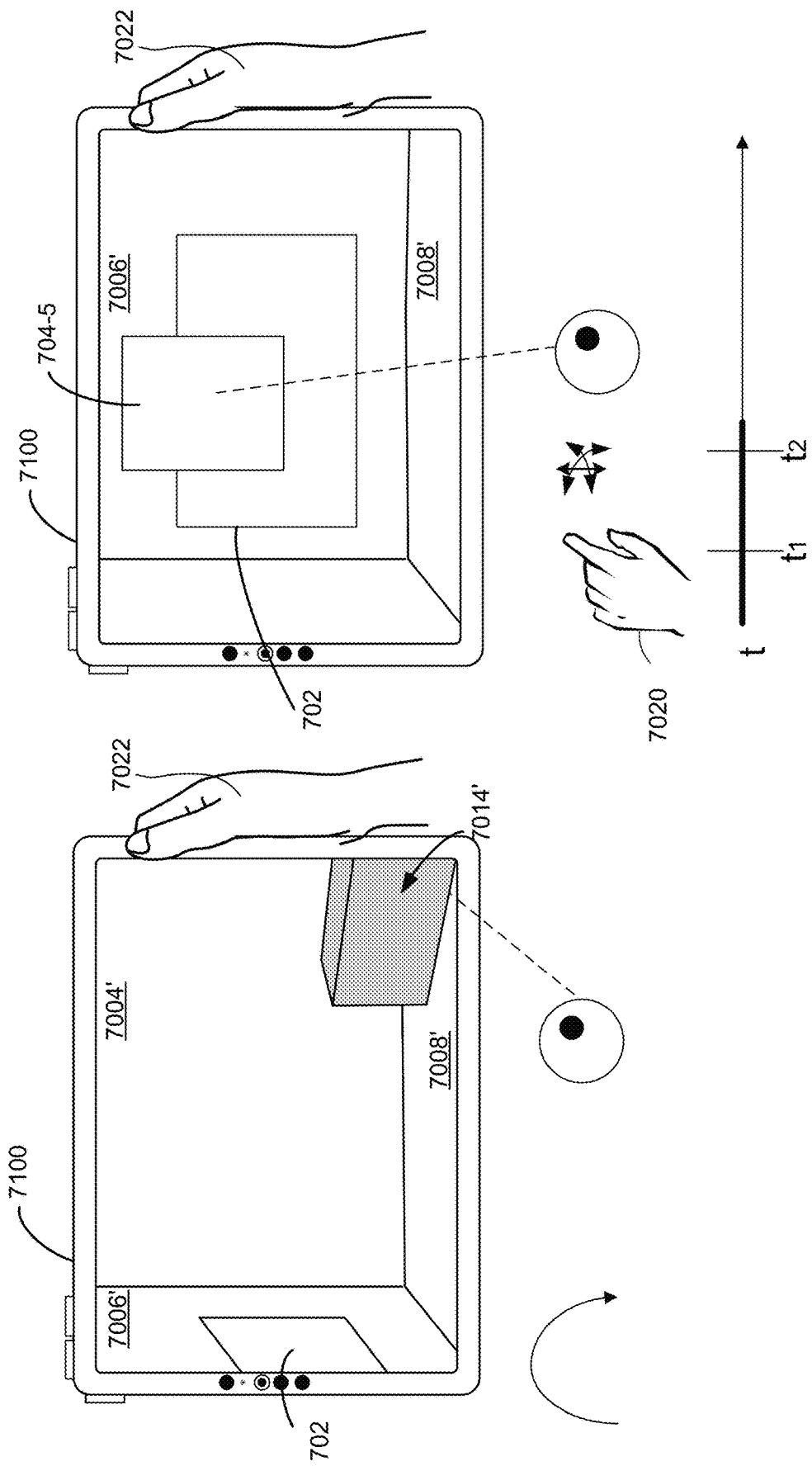

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Application No. 63/408,044, filed Sep. 19, 2022, and U.S. Provisional Application No. 63/248,375, filed Sep. 24, 2021, each of which is hereby incorporated by reference in its entirety.

TECHNICAL FIELD

This disclosure relates generally to computer systems with a display generation component and one or more input devices that provide computer-generated extended reality (XR) experiences, including but not limited to electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, virtual reality environments, and extended reality environments, etc.) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

SUMMARY

Accordingly, there is a need for computer systems with improved methods and interfaces for providing computer-generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component and one or more input devices. The method includes displaying, via the first display generation component, a first object in a first view of a three-dimensional environment. The method further includes, while displaying the first object, displaying an alert at a first position relative to the three-dimensional environment, the alert at least partially overlapping the first object in the first view, wherein the first position has a respective spatial relationship to the user. The method further includes, detecting, via the one or more input devices, movement of a current viewpoint of the user from a first viewpoint to a second viewpoint. The method further includes, while the current viewpoint of the user is the second viewpoint, in accordance with a determination that the alert is a first type of alert, displaying the alert at a second position in the three-dimensional environment that is different from the first position in the three-dimensional environment, wherein the second position in the three-dimensional environment has the respective spatial relationship to the user when the current viewpoint of the user is the second viewpoint. The method further includes, while the current viewpoint of the user is the second viewpoint, in accordance with a determination that the alert is a second type of alert, displaying the three-dimensional environment from the second viewpoint without displaying the alert with the respective spatial relationship to the user when the current viewpoint of the user is the second viewpoint.

In some embodiments, a method is performed at a computer system that is in communication with a first display generation component and one or more input devices. The method includes displaying, via the first display generation component, a first representation of a first notification in a first view of a three-dimensional environment. The method further includes while displaying the first representation of the first notification, detecting, via the one or more input devices, that the user satisfies attention criteria with respect to the first representation of the first notification. The method further includes in response to detecting that the user satisfies the attention criteria with respect to the first representation of the first notification, displaying a second representation of the first notification that is different from the first representation of the first notification. The method further includes after displaying the second representation of the first notification, detecting that the user no longer satisfies the attention criteria with respect to a respective representation of the first notification. The method further includes in response to detecting that the user-interface object no longer satisfies the attention criteria with respect to the respective representation of the first notification: in accordance with a determination that the respective representation of the first notification is the second representation of the first notification, ceasing display of the respective representation of the first notification, and in accordance with a determination that the respective representation of the first notification is a third representation of the first notification that is different from the second representation of the first notification, maintaining display of the respective representation of the first notification.

In some embodiments, a method is performed at a computer system that is in communication with a first display generation component and one or more input devices. The method includes displaying, via the first display generation component, a first application in a first view of a three-dimensional environment. The method further includes while displaying the first application, displaying a representation of a second application in the first view of the three-dimensional environment. The method further includes detecting, via the one or more input devices, an input directed to the representation of the second application. The method further includes in response to detecting the input directed to the representation of the second application: in accordance with a determination that the input is a first type of input, replacing display of the first application with display of the second application, and in accordance with a determination that the input is a second type of input, concurrently displaying the first application and the second application.

In some embodiments, a method is performed at a computer system that is in communication with a display generation component and one or more input devices. The method includes displaying, via the display generation component, a first view of a three-dimensional environment, the first view corresponds to a first viewpoint of a user. The method further includes, while displaying the first view of the three-dimensional environment, displaying a first user interface object at a first position in the three-dimensional environment, wherein the first position has a first spatial relationship with the first viewpoint of the user. The method further includes, while displaying the first view of the three-dimensional environment including the first user interface object at the first position in the three-dimensional environment, detecting a first input that is directed to at least a first portion of the first user interface object. The method further includes, in response to detecting the first input that is directed to at least the first portion of the first user interface object: displaying a second user interface object at a second position in the three-dimensional environment, and moving the first user interface object from the first position to a third position in the three-dimensional environment, wherein the third position has a greater distance from the first viewpoint of the user than the first position in the three-dimensional environment.

In some embodiments, a method is performed at a computer system that is in communication with a display generation component and one or more input devices. The method includes, while a first view of a three-dimensional environment that includes a first object is visible via the display generation component, detecting an event corresponding to the first object. The method further includes, in response to detecting the first event, displaying a second object, wherein the second object is a virtual user interface object that is displayed, via the display generation component, at a first position and with a first orientation in the three-dimensional environment, and wherein the second object displayed at the first position with the first orientation faces toward the first viewpoint corresponding to the first view of the three-dimensional environment. The method further includes, while displaying the second object at the first position with the first orientation, detecting a first request to change a current viewpoint from the first viewpoint to a second viewpoint. The method further includes, in response to detecting the change in viewpoint from the first viewpoint to the second viewpoint, wherein the second viewpoint is rotated relative to the first viewpoint: moving the second object from the first position to a second position in a second view of the three-dimensional environment that corresponds to the second viewpoint, and updating an orientation of the second object from the first orientation to a second orientation, wherein the second object displayed at the second position with the second orientation faces toward the second viewpoint, and wherein the first position and orientation and the second position and orientation are consistent with placement of the second object on a curved surface that surrounds at least a portion of the first object in the three-dimensional environment.

In accordance with some embodiments, a computer system includes or is in communication with a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more audio output components, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more audio output components, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7H are block diagrams that illustrate displaying representations of alerts concurrently with user interface objects displayed in a three-dimensional environment, in accordance with some embodiments.

FIGS. 7D and 7I-7L are block diagrams that illustrate a representation of an alert in a plurality of states, in accordance with some embodiments.

FIGS. 7M-7O are block diagrams that illustrate opening an application from a displayed application icon, in accordance with some embodiments.

FIGS. 7X-7AE are block diagrams that illustrate displaying a virtual object in association with an object in a three-dimensional environment while updating a view of the three-dimensional environment in accordance with movement of a viewpoint of a user, in accordance with some embodiments.

DESCRIPTION OF EMBODIMENTS

Figure 1:
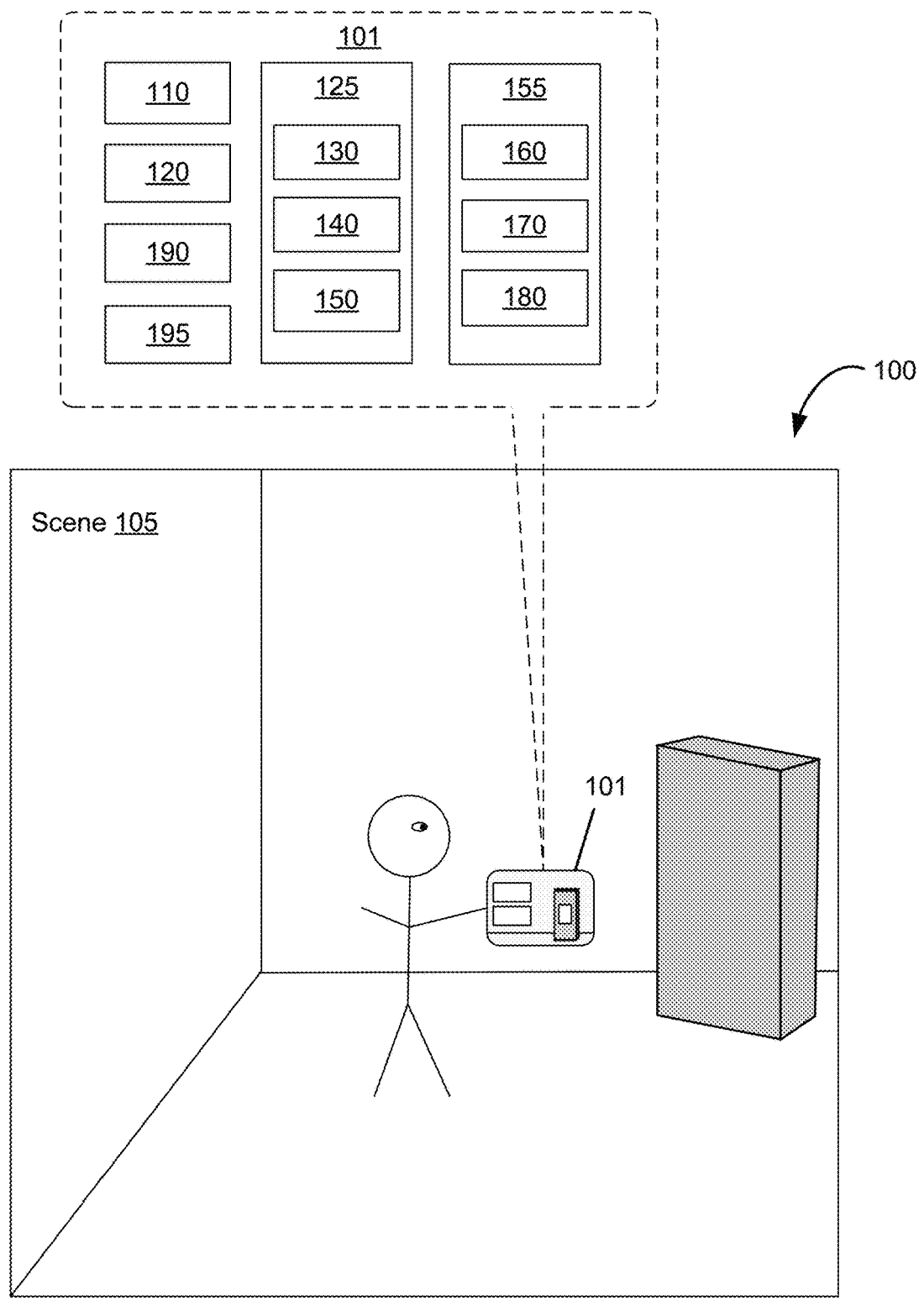
FIG. 1 is a block diagram illustrating an operating environment of a computer system for providing extended-reality (XR) experiences in accordance with some embodiments.

The present disclosure relates to user interfaces for providing a computer-generated extended reality (XR) experience to a user, in accordance with some embodiments.

The systems, methods, and GUIs described herein improve user interface interactions with virtual/augmented reality environments in multiple ways.

In some embodiments, a computer system, displays an alert at a first position relative to the three-dimensional environment, the alert at least partially overlapping a first object in a first view. In response to the user turning away from the first object, if the alert is a first type of alert (e.g., a system alert), the alert is displayed at a location that is away from the object (e.g., at a same relative location to the user's current viewpoint as before the user turned), and if the alert is a second type of alert (e.g., an object alert and/or an application alert), the alert is not displayed at the location that is away from the object, in accordance with some embodiments.

In some embodiments, a computer system displays a notification with different properties in accordance with the user paying attention to the respective notification. While displaying a first notification in a first state, the computer system detects that the user has paid attention to (e.g., satisfies attention criteria with respect to) the first notification in the first state. In response to detecting that the user has paid attention to the first notification in the first state, the computer system displays the first notification in a second state, distinct from the first state. The computer system detects that the user no longer is paying attention to the first notification (in any state), and, the computer system, in accordance with a determination that the first notification is currently displayed in the second state, ceases display of the respective representation and in accordance with a determination that the first notification displayed in a third state, maintains display of the respective representation.

In some embodiments, a computer system displays a first application in a first view of a three-dimensional environment. While displaying the first application, the computer system displays a representation of a second application, such as a notification or an application icon, in the first view of the three-dimensional environment. The computer system detects, an input directed to the representation of the second application, and based on the type of input, the computer system displays the second application in a different manner. For example, in response to detecting the input directed to the representation of the second application, the computer system, in accordance with a determination that the input is a first type of input, replaces display of the first application with display of the second application, and in accordance with a determination that the input is a second type of input, concurrently displays the first application and the second application.

A computer system, while displaying a first view of a three-dimensional environment that corresponds to a first viewpoint of a user, displays a first user interface object at a first position in the three-dimensional environment that has a first spatial relationship with the first viewpoint of the user. While displaying the first view of the three-dimensional environment including the first user interface object at the first position in the three-dimensional environment, the computer system, in response to detecting a first input that is directed to at least a first portion of the first user interface object, displays a second user interface object at a second position in the three-dimensional environment and moves the first user interface object from the first position to a third position in the three-dimensional environment that has a greater distance from the first viewpoint of the user than the first position in the three-dimensional environment.

In response to detecting a change in viewpoint of a user from a first viewpoint to a second viewpoint, a computer system moves, from the first position to a second position in an updated view of the three-dimensional environment that corresponds to the second viewpoint, a second object that was displayed in response to an event associated with a first object, and updates an orientation of the second object from a first orientation to a second orientation, wherein the second object displayed with the first position and orientation faces toward the first viewpoint and the second object displayed with the second position and orientation faces toward the second viewpoint, and wherein the first position and orientation and the second position and orientation are consistent with placement of the second object on a curved surface that surrounds at least a portion of the first object in the three-dimensional environment.

FIGS. 1-6 provide a description of example computer systems for providing XR experiences to users. The user interfaces in FIGS. 7A-7AE are used to illustrate the processes in FIGS. 8-12, respectively.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended-reality: In contrast, a extended-reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
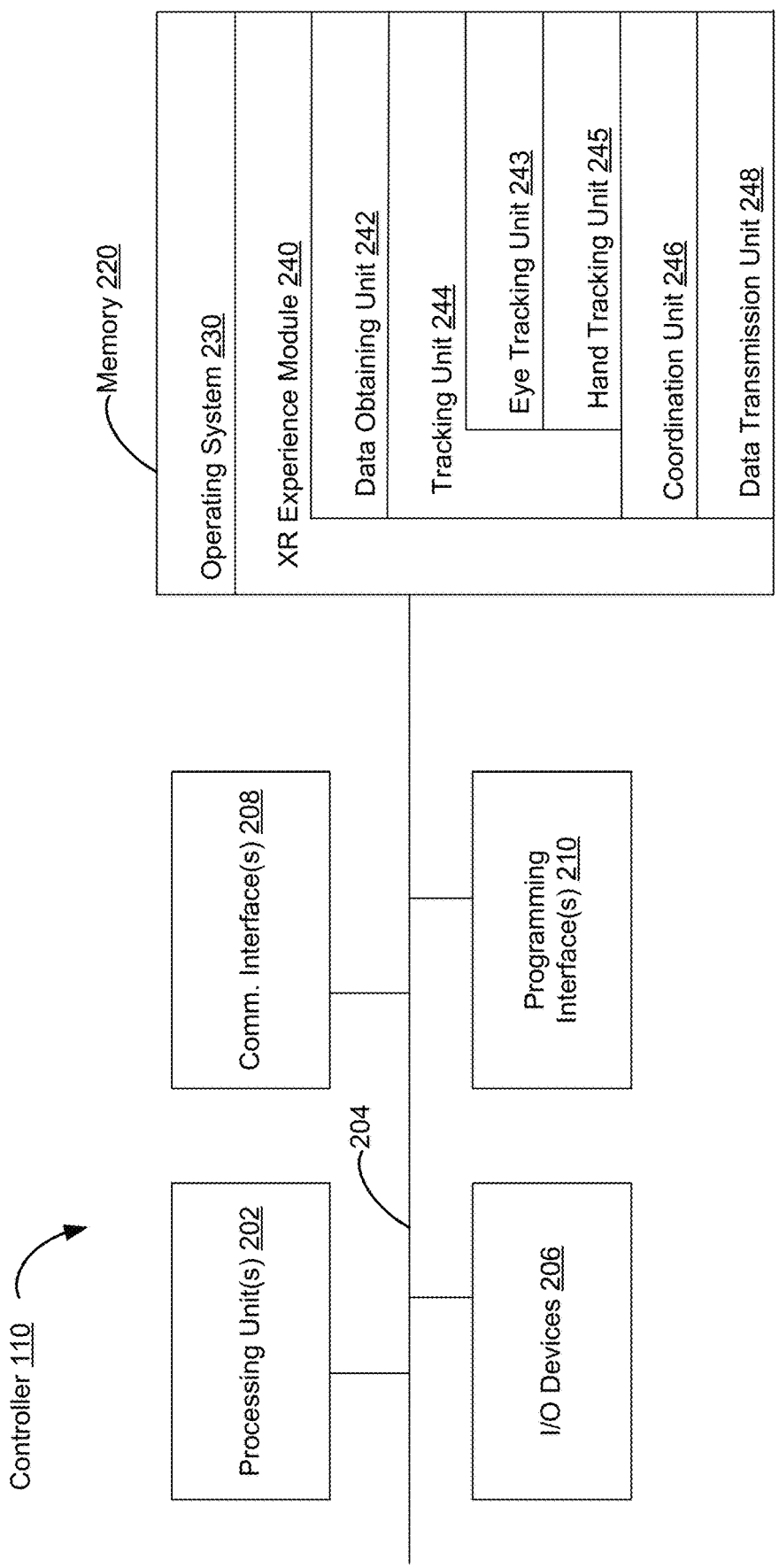
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
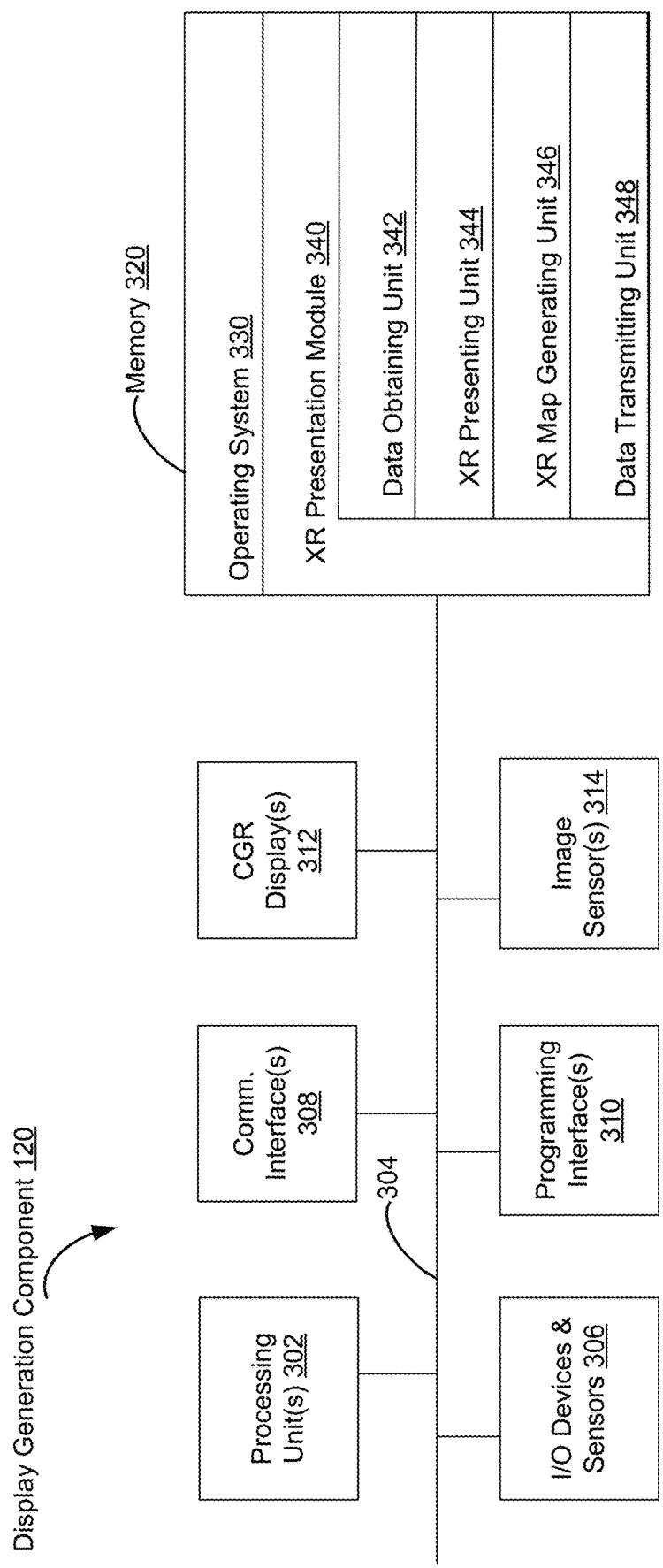
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the HMD 120 includes a single XR display. In another example, the HMD 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
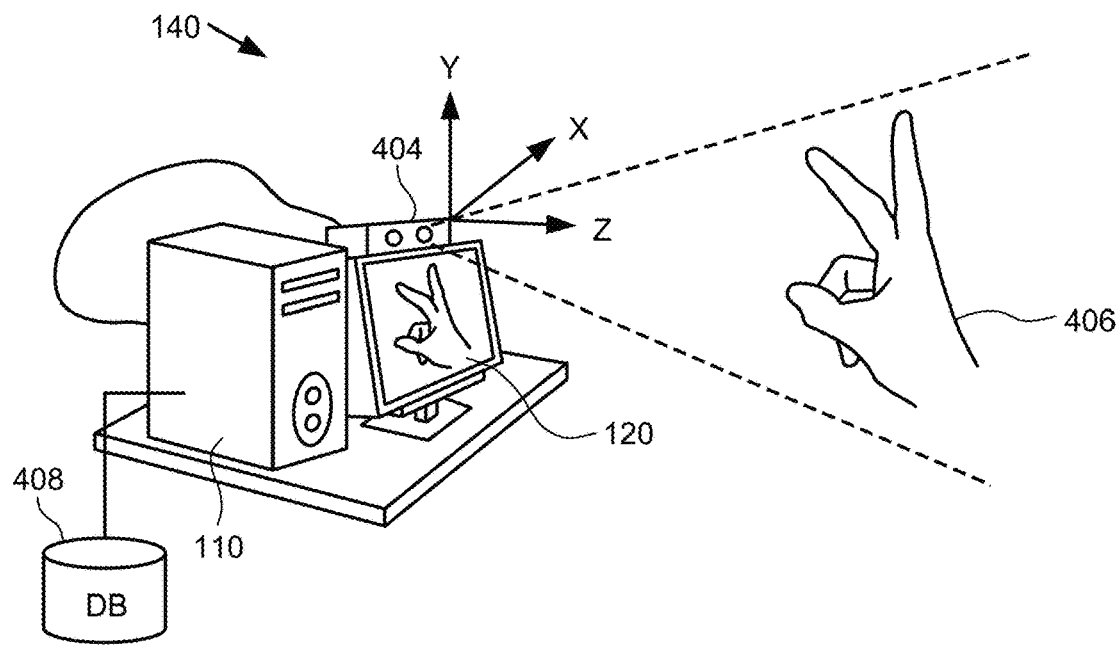
FIG. 4 is a block diagram illustrating a hand tracking unit of a computer system that is configured to capture gesture inputs of the user in accordance with some embodiments.
Figure 4:
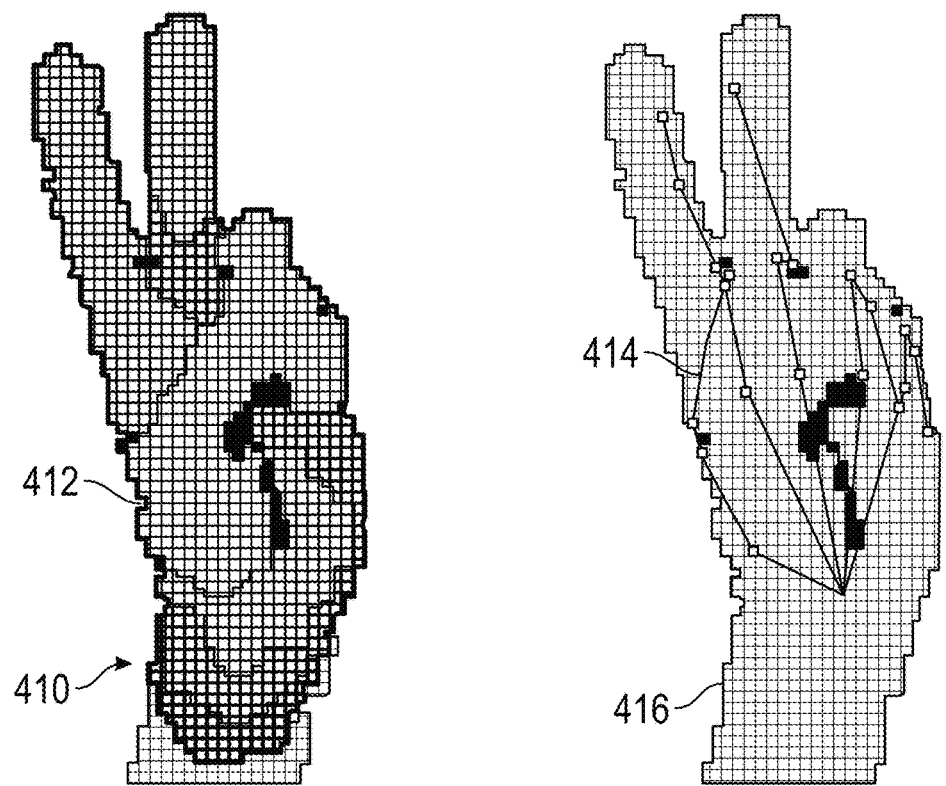

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
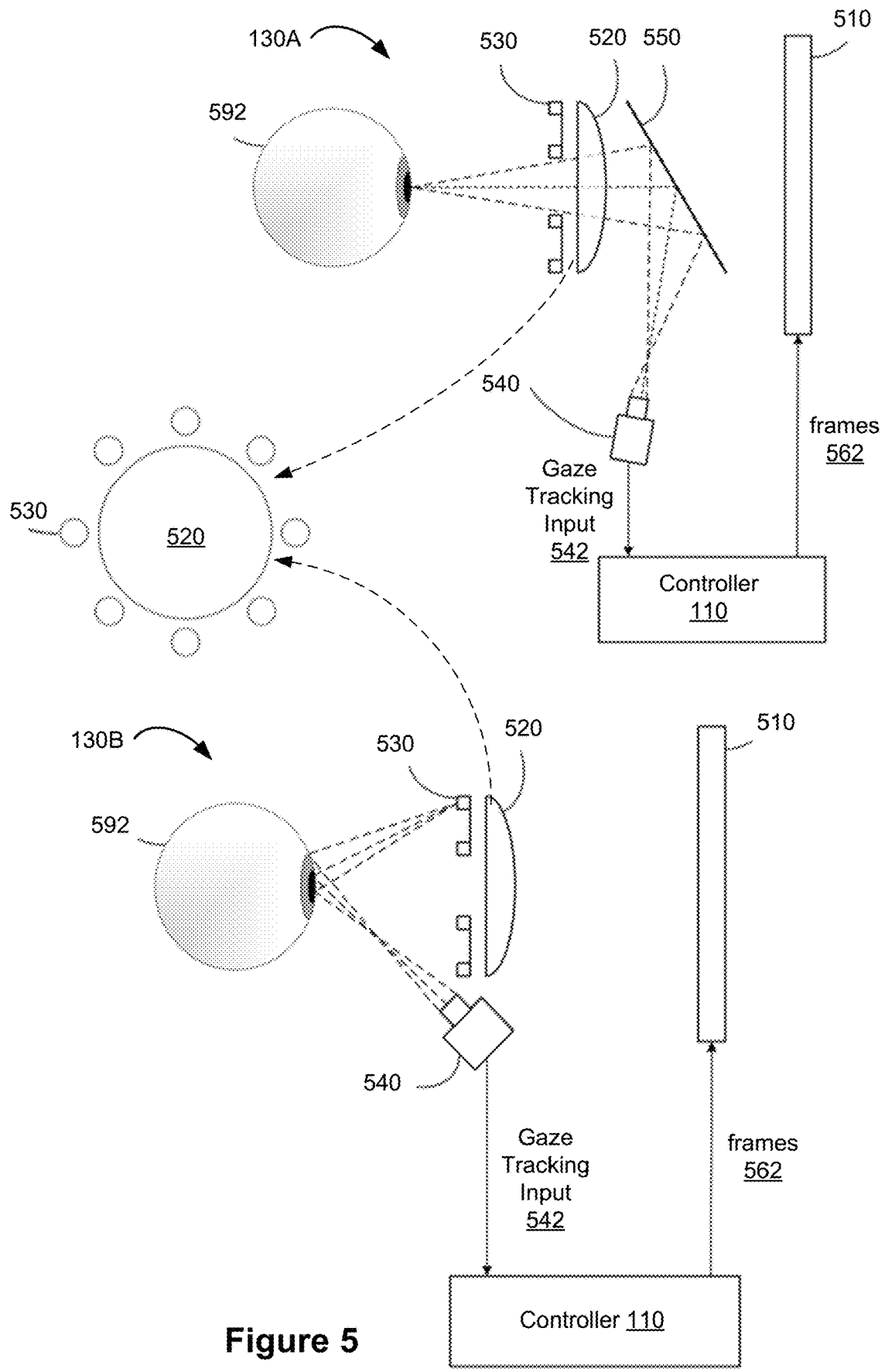
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in extended-reality (e.g., including virtual reality, and/or mixed reality) applications to provide extended-reality (e.g., including virtual reality, augmented reality, and/or augmented virtuality) experiences to the user.

Figure 6:
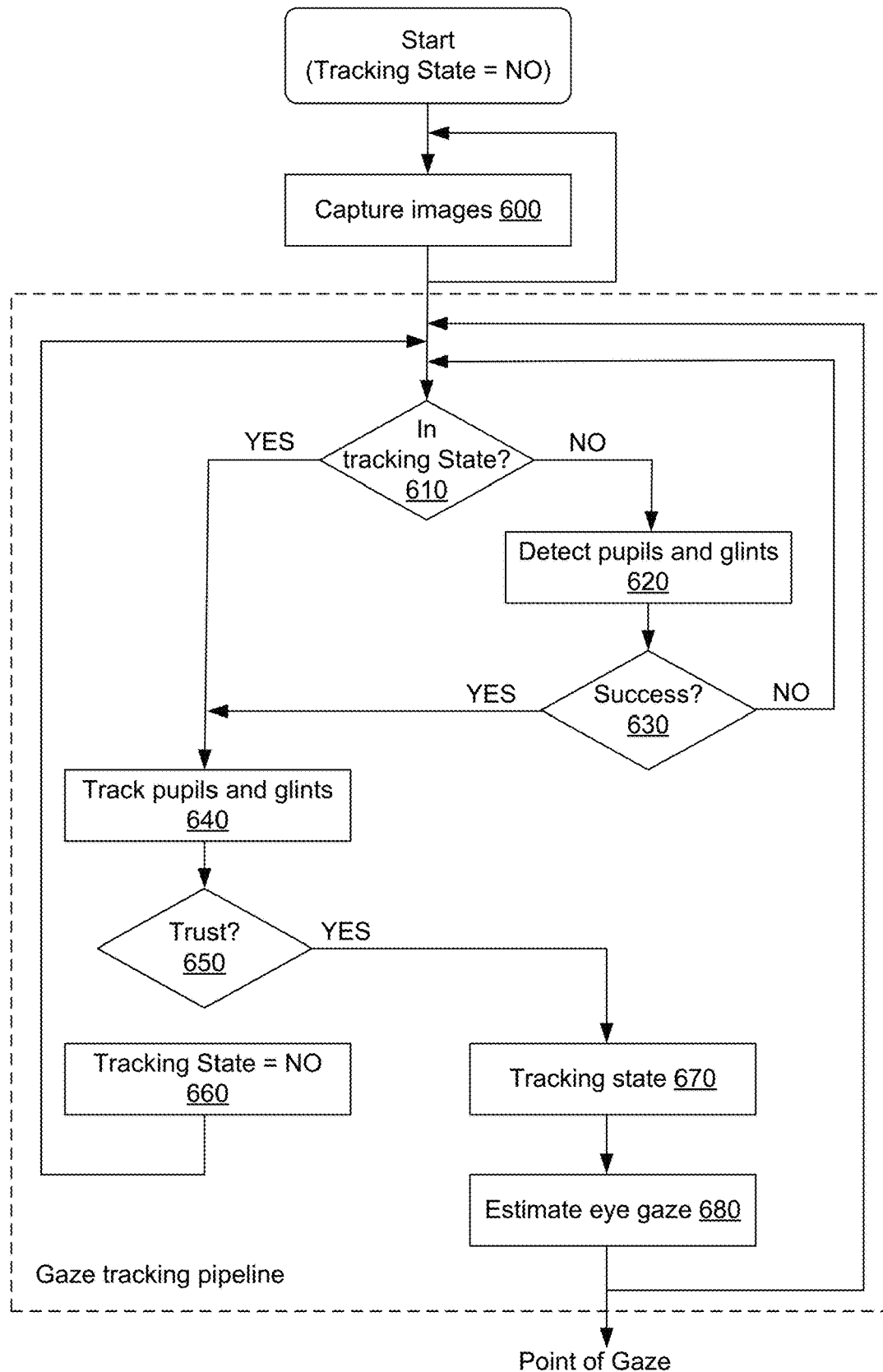
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

Figures 7A, 7B:
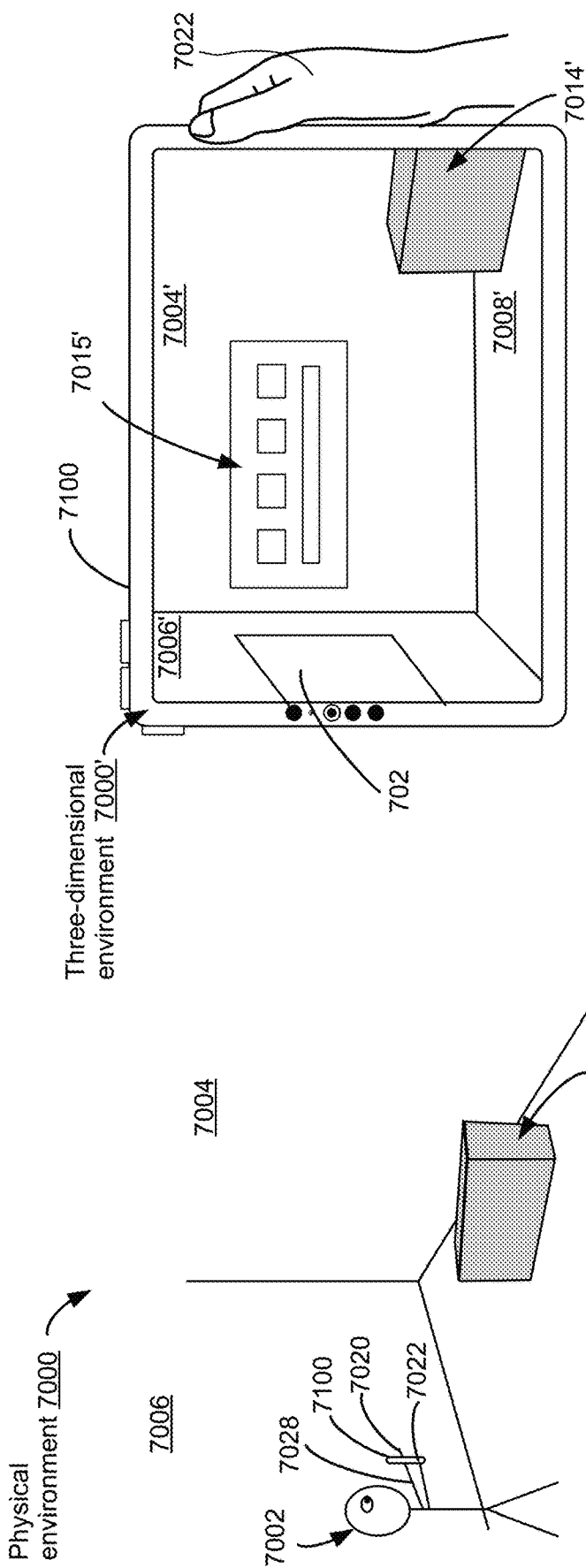

FIGS. 7A-7AE illustrate three-dimensional environments displayed via a display generation component (e.g., a display generation component 7100, a display generation component 120, etc.) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, selected by a concurrently and/or previously detected gesture input, etc.). In some embodiments, an input is directed to a virtual object within a three-dimensional environment by an input device that has positioned a focus selector object (e.g., a pointer object, selector object, etc.) at the position of the virtual object. In some embodiments, an input is directed to a virtual object within a three-dimensional environment via other means (e.g., voice, control button, etc.). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and moving relative to the physical object). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, or virtual scenery) in accordance with inputs from sensors that detects movement of other persons and objects and movement of the user that may not quality as a recognized gesture input for triggering an associated operation of the computer system.

In some embodiments, a three-dimensional environment that is displayed via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion, adjusting the relative prominence of audio/visual sensory inputs from the virtual content and from the representation of the physical environment, etc.) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., at positions in a virtual reality environment, a mixed reality environment, an augmented reality environment, etc.), at least some of the virtual objects are displayed in placed of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component, etc.). In some embodiments, at least some of the virtual objects and virtual content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7B-7AE, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylize representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency, simulated reflective index, etc.) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole, etc.

Figure 7D:
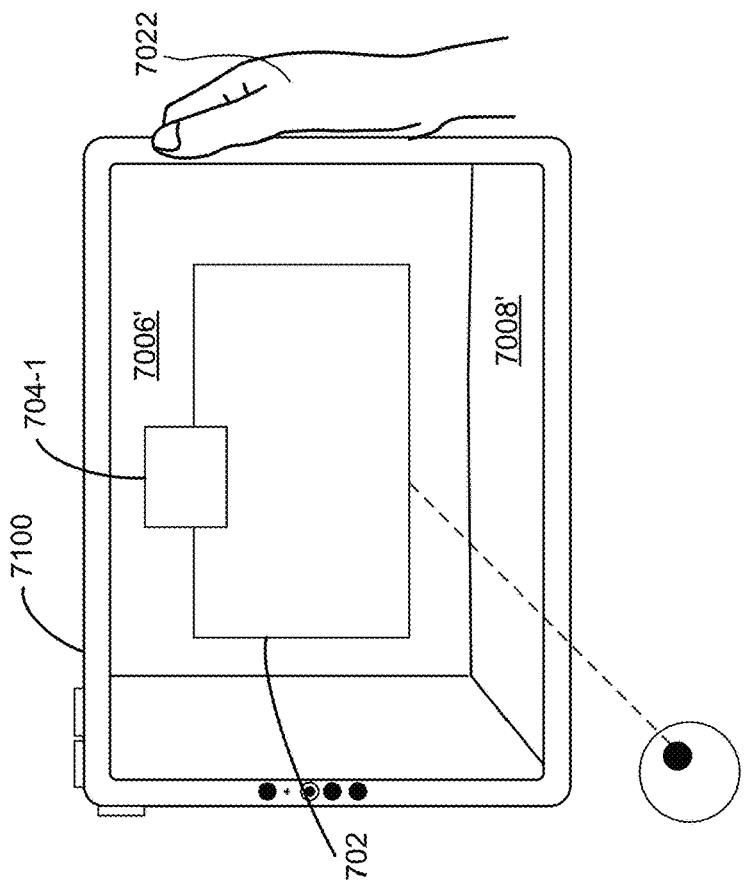

FIGS. 7A-7H are block diagrams illustrating displaying representations of alerts concurrently with user interface objects displayed in a three-dimensional environment, in accordance with some embodiments. FIGS. 7I-7L are block diagrams illustrating changing states of representations of alerts that are displayed in accordance with the user paying attention to the alerts. FIGS. 7M-7O are block diagrams illustrating interacting with representations of applications (e.g., notifications and/or application icons) that are displayed in a three-dimensional environment. FIGS. 7P-7W are block diagrams that illustrate navigating through a first user interface object to a second user interface object, in accordance with some embodiments. FIGS. 7X-7AE are block diagrams that illustrate displaying a virtual object in association with an object in a three-dimensional environment while updating a view of the three-dimensional environment in accordance with movement of a viewpoint of a user, in accordance with some embodiments. Behaviors described with reference to FIGS. 7A-7AE (and FIGS. 8-12) with respect to user interface objects and representations of alerts in some examples are applicable to user interface objects and representations of alerts in other examples, in accordance with various embodiments, unless stated otherwise in the descriptions.

FIGS. 7A-7AE show an exemplary computer system (e.g., device 101, or another computer system) that is in communication with a display generation component (e.g., a first display generation component, display generation component 7100, or another display generation component). In some embodiments, the display generation component is a heads-up display. In some embodiments, the display generation component is a head-mounted display (HMD). In some embodiments, the display generation component is a standalone display, a touchscreen, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, etc. of the user. In some embodiments, the one or more input devices include an eye tracking component that detects location and movement of the user's gaze. In some embodiments, the display generation component, and optionally, the one or more input devices and the computer system, are parts of a head-mounted device (e.g., an HMD, or a pair of goggles) that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the first display generation component. In some embodiments, the display generation component is optionally moved and rotated by the user's hand relative to the physical environment or relative to the user's head, and changes the viewpoint of the user in the three-dimensional environment in accordance with the movement of the display generation component relative to the user's head or face or relative to the physical environment.

FIGS. 7A-7H are block diagrams that illustrate displaying a user interface object (e.g., user interface object 7015', or user interface object 702 (e.g., an application window for a first application)) at a respective position in a three-dimensional environment that corresponds to a location relative to a user 7002 (e.g., the user's viewpoint)) in a physical environment.

For example, FIG. 7A illustrates a physical environment 7000 that includes the user 7002 interacting with display generation component 7100. In the examples described below, the user 7002 uses one or both of their two hands, hand 7020 and hand 7022 to provide inputs or instructions to a computer system. In some of the examples described below, the computer system also uses the position or movement of an arm of the user, such as the user's left arm 7028, which is connected to the user's left hand 7020, as part of an input provided by the user to the computer system. The physical environment 7000 includes a physical object 7014, and physical walls 7004 and 7006. The physical environment 7000 further includes a physical floor 7008.

As shown in FIG. 7B, the computer system (e.g., display generation component 7100) displays a view of a three-dimensional environment (e.g., environment 7000', a virtual three-dimensional environment, an augmented reality environment, a pass-through view of a physical environment, or a camera view of a physical environment). In some embodiments, the three-dimensional environment is a virtual three-dimensional environment without a representation of a physical environment 7000. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects (e.g., user interface object 702, user interface object 7015') and a representation of at least a portion of a physical environment (e.g., representations 7004', 7006' of walls, representation 7008' of a floor, and/or representation 7014' of a physical object) surrounding the display generation component 7100. In some embodiments, the representation of the physical environment includes a camera view of the physical environment. In some embodiments, the representation of the physical environment includes a view of the physical environment through a transparent or semitransparent portion of the first display generation component.

Figure 7C:
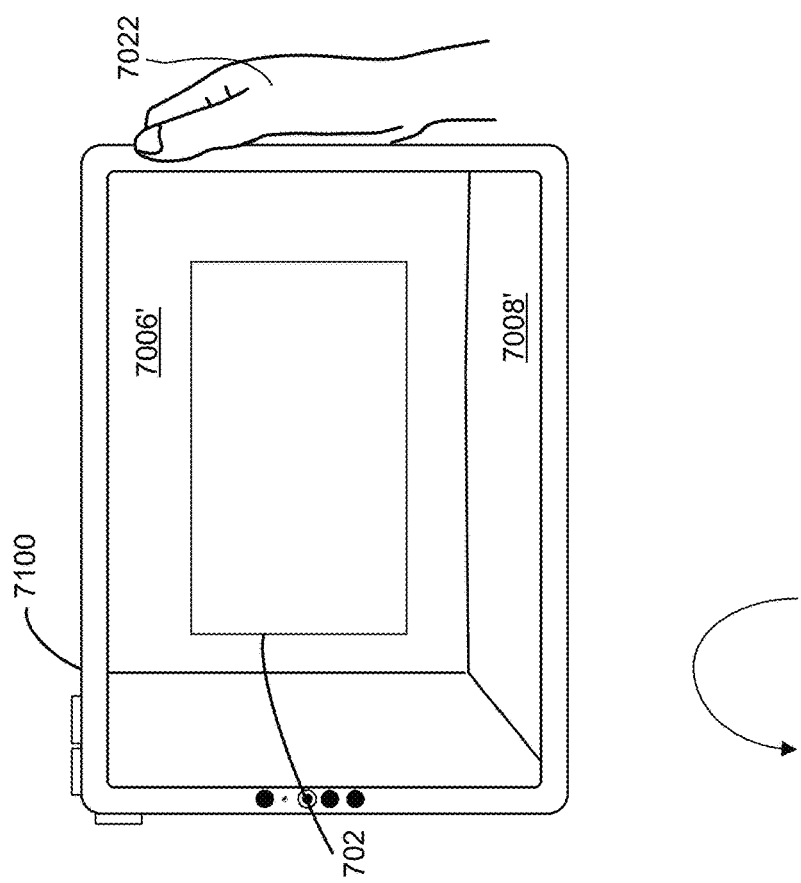

FIG. 7C illustrates a current view of the user that is displayed via display generation component 7100. For example, the user has turned (e.g., to the left) in the physical environment (e.g., relative to the user's position/orientation in the physical environment in FIG. 7B) to view the representation of the wall 7006'. In some embodiments, the display generation component 7100 displays a first user interface object 702. In some embodiments, the first user interface object 702 is an application window for a first application with which the user interacts. In some embodiments, the first user interface object 702 is a virtual object that is associated with a first application (e.g., a chess piece for a chess game application). In some embodiments, the first user interface object 702 is a physical object (e.g., a pair of headphones) in the physical environment that is displayed as pass-through content or as a stylized (e.g., animated, computer-generated) representation of the physical object. It will be understood that the first user interface object 702 can correspond to any number of objects, virtual or real, that are displayed via display generation component 7100. In some embodiments, user interface object 702 is anchored to the three-dimensional environment. For example, as the user changes the user's current view of the three-dimensional environment, user interface object 702 is displayed in a same position within the three-dimensional environment, relative to other objects displayed in the three-dimensional environment, even as the user's current view changes (e.g., as the user moves in the physical environment).

In some embodiments, as illustrated in FIG. 7D, the user is paying attention (e.g., gazing at, and/or gazing at for at least a threshold amount of time and/or with less than a threshold of movement) the first user interface object 702. For example, the user's attention is indicated by the dashed line from the user's eye (e.g., to the first user interface object 702). In some embodiments, while the user is paying attention to the first user interface object 702, an alert is received by the computer system.

In some embodiments, an alert is either a system alert (e.g., a persistent alert that is associated with the computer system and/or an operating system of the computer system) or an application-specific alert (e.g., associated with one or more applications, including applications that the user is not currently viewing/interacting with), also referred to herein as a notification for a respective application. In some embodiments, the computer system receives (and/or generates) alerts in accordance with settings selected by the user. For example, the user selects which applications are enabled to provide notifications (e.g., notifications that are pushed to the display generation component 7100).

In some embodiments, a representation of a system alert includes content and/or one or more selectable user interface objects (e.g., buttons) that are enabled to be selected by the user using gaze and/or gestures (e.g., air gestures) and a representation of an application-specific alert does not include content and/or one or more selectable user interface objects. For example, the system alert includes an option to dismiss the system alert and/or an option to view additional information about the alert. In some embodiments, both types of alerts include content and/or one or more selectable user interface objects.

FIG. 7D illustrates that, in response to receiving an alert (e.g., a system alert or a notification for an application), the computer system displays a representation of the alert 704-1 in a current view of the three-dimensional environment. In some embodiments, while the user is paying attention to the first user interface object 702, the representation of the alert 704-1 is displayed at least partially overlapping the first user interface object 702.

In some embodiments, the representation of the alert 704-1 at least partially overlaps a user interface object that is related to the alert and that is displayed in the current view of the three-dimensional environment. For example, an alert that is related to a particular application is displayed at least partially overlapping an application window, or other virtual object, for the particular application that is related to the alert (e.g., if an application window for the particular application is displayed in the current view of the three-dimensional environment). In some embodiments, the representation for an alert is related to an application (e.g., an alert for a news article that was published on a news application), and the representation for the alert is displayed over a currently active (e.g., displayed) application window for the application (e.g., the news application).

In some embodiments, the representation of the alert 704-1 at least partially overlaps a physical object (e.g., a representation of a physical object) in the physical environment that is related to the alert. For example, a representation for an alert that indicates a charge state (e.g., a level of charge) for a set of headphones is displayed at least partially overlapping the headphones (e.g., at least partially overlapping a representation of the headphones) while the headphones are in the current view of the three-dimensional environment (e.g., wherein the set of headphones is displayed as a virtual object or as a physical object as pass-through content).

In some embodiments, the representation of the alert 704-1 is displayed (e.g., initially) at a position in the three-dimensional environment that is determined relative to a current viewpoint of the user (e.g., and is, optionally, not displayed over a virtual and/or physical object that relates to the alert). For example, the representation of the alert 704-1 is displayed in a top-center portion of the user's current view of the three-dimensional environment (e.g., regardless of what object the user is currently paying attention to when the alert is received).

In some embodiments, displaying the representation of the alert causes the computer system to visually deemphasize other content (e.g., other than the representation of the alert) that is displayed in the three-dimensional environment. In some embodiments, the computer system visually deemphasizes virtual content that is displayed in the three-dimensional environment. For example, a currently displayed application window (e.g., user interface object 702) is dimmed (e.g., faded) and/or pushed backwards (e.g., farther away from the user) within the three-dimensional environment, relative to the representation of the alert (e.g., to draw attention to the representation of the alert), e.g., in a manner analogous to that illustrated in and/or described with respect to FIGS. 7P-7R where a currently displayed window 708 is pushed backwards in the three-dimensional environment as a new window 720 is displayed in response to an input directed to an interactive element 710-2 of the currently displayed window 708. In some embodiments, physical content from the physical environment that is displayed as pass-through content in the three-dimensional environment is visually deemphasized.

In some embodiments, the visual deemphasis of other content displayed in the three-dimensional environment is based at least in part on the type of alert. For example, if the alert is a system alert, all application windows and/or virtual objects that are displayed in the current view of the three-dimensional environment are visually deemphasized (e.g., without visually deemphasizing features of the physical environment, such as the representations of the walls), and, if the representation of the alert is a notification for an application, only a currently viewed application window (e.g., and/or virtual object) is visually deemphasized relative to the notification for the application, without visually deemphasizing other virtual content that is displayed within the current view of the three-dimensional environment.

In some embodiments, a plurality of representations for a plurality of alerts are concurrently displayed. For example, a first alert (e.g., a system alert) is received, and a representation of the first alert is displayed in the three-dimensional environment. In some embodiments, while displaying the representation of the first alert, a second alert (e.g., a notification) is received for an application. In some embodiments, both the first and second alerts are concurrently displayed. In some embodiments, respective predefined positions of the alerts at which the representations of the alerts are displayed is based on the type of alert. For example, system alerts are displayed at a predefined portion of the three-dimensional environment that appears lower (relative to the user's viewpoint) than the predefined portion of the three-dimensional environment in which notifications for applications are displayed (e.g., or vice-versa). For example, notifications for applications appear above (e.g., closer to a top of the current view of the three-dimensional environment than) system alerts in the three-dimensional environment.

In some embodiments, system alerts are displayed at a portion of the three-dimensional environment that appears closer to the user than the portion of the three-dimensional environment in which notifications for applications are displayed. For example, representations for system alerts are displayed within an arm's reach of the user, while representations for notifications for applications are displayed outside of an arm's reach of the user.

In some embodiments, in response to receiving a third alert for a same application as the second alert (e.g., while displaying the representation of the second alert), the representation of the second alert and a representation of the third alert are combined into a single alert (e.g., with a numeric indicator that indicates a number of alerts received for the same application).

In some embodiments, in response to receiving a fourth alert for a different application than the second alert (e.g., while displaying the representation of the first alert and the representation of the second alert), a representation of the fourth alert is displayed concurrently (e.g., side-by-side) with the already displayed representations of alerts (e.g., with the representations of the first and second alerts). In some embodiments, the representation of the fourth alert covers (e.g., overlaps) at least a portion of the representation of the second alert (e.g., the representation of the fourth alert appears stacked over the representation of the second alert). In some embodiments, the plurality of representations for alerts that are pending (e.g., have been received but not viewed and/or dismissed by the user), are minimized (e.g., combined) into a single representation of alerts (e.g., a representation of a stack of alerts) until the user pays attention to the representations of the alerts (e.g., by gazing at the representations of the alerts).

In some embodiments, in accordance with the representation of the alert 704-1 being a system alert (e.g., generated by the computer system, related to an operating system of the computer system), the representation of the alert 704-1 is maintained at its current position relative to the user's current view of the three-dimensional environment (e.g., and/or relative to a body part of the user), even as the user moves in the physical environment, as illustrated in FIG. 7E. For example, in FIG. 7E, the user has turned away from the user's view in FIG. 7D that faces the representation of wall 7006' (e.g., the user turns to the right in the physical environment), and the user's current view in FIG. 7E faces the representation of wall 7004'. In response to the user changing the user's current viewpoint (e.g., by turning and/or rotating in the physical environment, and/or by moving in position (e.g., laterally) in the physical environment), the display generation component 7100 continues to display the representation of the alert 704-1 at the same relative position to the user's current viewpoint in the three-dimensional environment (e.g., the representation of the alert 704-1 is maintained at a top-center portion of the user's current view of the three-dimensional environment). In some embodiments, while the user is moving in the physical environment, the representation of the alert is visually deemphasized (e.g., faded or disappears), and is redisplayed (e.g., without being visually deemphasized) after the user has stopped moving.

In some embodiments or in some circumstances, the user does not pay attention to (e.g., gaze at) the alert 704-1. For example, in FIGS. 7E-7F, the user is paying attention to a representation of object 7014' and is not paying attention to the representation of the alert 704-1. In some embodiments, after a predetermined time period (e.g., 0.25 seconds, 2 seconds, 5 seconds, or a time period in the range 0.25-5 seconds), if the user has not paid attention to the representation of the alert 704-1, the representation of the alert 704-1 is automatically removed from display in the user's current view. In some embodiments, the predetermined time period is determined based on the type of alert. For example, a system alert is not subject to a predetermined time period (e.g., the system alert continues to be displayed until the user dismisses the system alert), while a notification for an application automatically ceases to be displayed in accordance with the user not interacting with (e.g., paying attention to) the notification within the predetermined time period (e.g., 0.25 seconds, 2 seconds, 5 seconds, or a time period in the range 0.25-5 seconds).

In some embodiments, as illustrated in FIG. 7F, in accordance with the representation of the alert 704-1 being a notification for an application (e.g., an application related to the user interface object 702, or another application that the user is not currently viewing or interacting with), in response to the user changing the user's current viewpoint (e.g., by turning to the right in the physical environment from FIG. 7D to FIG. 7F), the representation of the alert 704-1 is not maintained at the same relative position to the user's current viewpoint in the three-dimensional environment (e.g., at a top-center portion of the user's current view of the three-dimensional environment). In some embodiments, the representation of the alert is optionally displayed as representation of the alert 704-2 at a position within the user's current view that continues to at least partially overlap the first user interface object 702. In some embodiments, in response to the user changing the user's current viewpoint, the representation of the alert 704-1 is not displayed in the user's current viewpoint (e.g., the representation of the alert 704-2 is optionally not displayed at all in the user's current view in FIG. 7F).

For example, if the alert (e.g., notification) is related to the first user interface object 702 (e.g., the first user interface object 702 is an application window for a first application, and the alert is a notification for the first application), the alert is not anchored to a user's current viewpoint (e.g., instead, the alert is anchored to the first application). In some embodiments, the representation of the alert 704-1 (e.g., a representation of a notification for an application) is displayed as moving within the three-dimensional environment as the user moves in the physical environment. In some embodiments, the representation of a notification for an application moves with a smaller amount of movement than the user (e.g., the representation of the notification appears to lag behind the user and move at a slower rate than the rate of movement of the user).

Thus, depending on a type of the alert (e.g., a system alert versus a notification for an application), in response to the user changing the user's viewpoint (e.g., by moving and/or rotating within the physical environment 7000), the representation of the alert 704-1 is either maintained at a same relative position to the user's current viewpoint (in the case of a system alert), as illustrated in FIG. 7E, or is not displayed at the same relative position to the user's current viewpoint (in the case of a notification for an application), as illustrated in FIG. 7F. Further, in some embodiments, the manner in which the alert moves within the three-dimensional environment is determined based on the type of alert. For example, a system alert is moved to its updated position in the user's current view without maintaining display of the system alert while the user is moving (e.g., the representation for a system alert disappears during the user's movement), and a notification for an application is, optionally, continued to be displayed in the three-dimensional environment (e.g., over a related application window) as the user's current view changes.

In some embodiments, while the user is moving in the three-dimensional environment, the representation of the alert is displayed as farther away from the user in the three-dimensional environment. For example, in response to the user moving in the physical environment, the representation of the alert is updated to be displayed at a position in the three-dimensional environment that appears farther away from the user (e.g., out of arm's reach of the user) than the position of the representation of the alert while the user is stationary. For example, the representation of the alert is displayed closer to the user (e.g., such that the user is enabled to reach the representation of the alert with the user's arm) while the user is not moving in the physical environment.

In some embodiments, the representation of the alert is displayed at an angle that is relative to other objects displayed in the three-dimensional environment, based on a current position (e.g., location and/or orientation) of the user in the physical environment. For example, as the user changes the user's perspective of the three-dimensional environment (e.g., by turning the user's head and/or by moving locations), the representation of the alert is updated to be displayed at a predefined angle relative to the user (e.g., the angle of the representation of the alert is updated as the user moves in the physical environment to appear straight-on to the user). In some embodiments, while the angles, relative to the user's current viewpoint, of other objects displayed in the three-dimensional environment, change as the user moves in the physical environment, the angle of the representation of the alert does not change relative to the user. Instead, the representation of the alert is displayed to follow the user as the user moves in the physical environment, including displaying the alert at same angle to be viewed by the user.

In some embodiments, two or more user interface objects (e.g., virtual and/or physical objects) that are related to a same application are displayed in a current view of the three-dimensional environment. In some embodiments, the two or more user interface objects that are related to the same application are not concurrently displayed in a same current view of the three-dimensional environment, but the two or more user interface objects are displayed within different views (e.g., anchored to different portions) of the three-dimensional environment (e.g., the first user interface object is displayed in a first view of the three-dimensional environment and the second user interface object is displayed in a second view of the three-dimensional environment). For example, as illustrated in FIG. 7G, the first user interface object 702 and (at least a portion of) a second user interface object 712 are concurrently displayed in the current view of the three-dimensional environment. In some embodiments, the first user interface object 702 and the second user interface object 712 are associated with (e.g., instances of) a same application. For example, the user interface objects comprise two or more application windows for the same application. In some embodiments, the user interface objects comprise application windows (e.g., user interface object 702) for the application and/or virtual (e.g., or physical) objects (e.g., user interface object 712) that are associated with the same application.

Figure 7H:
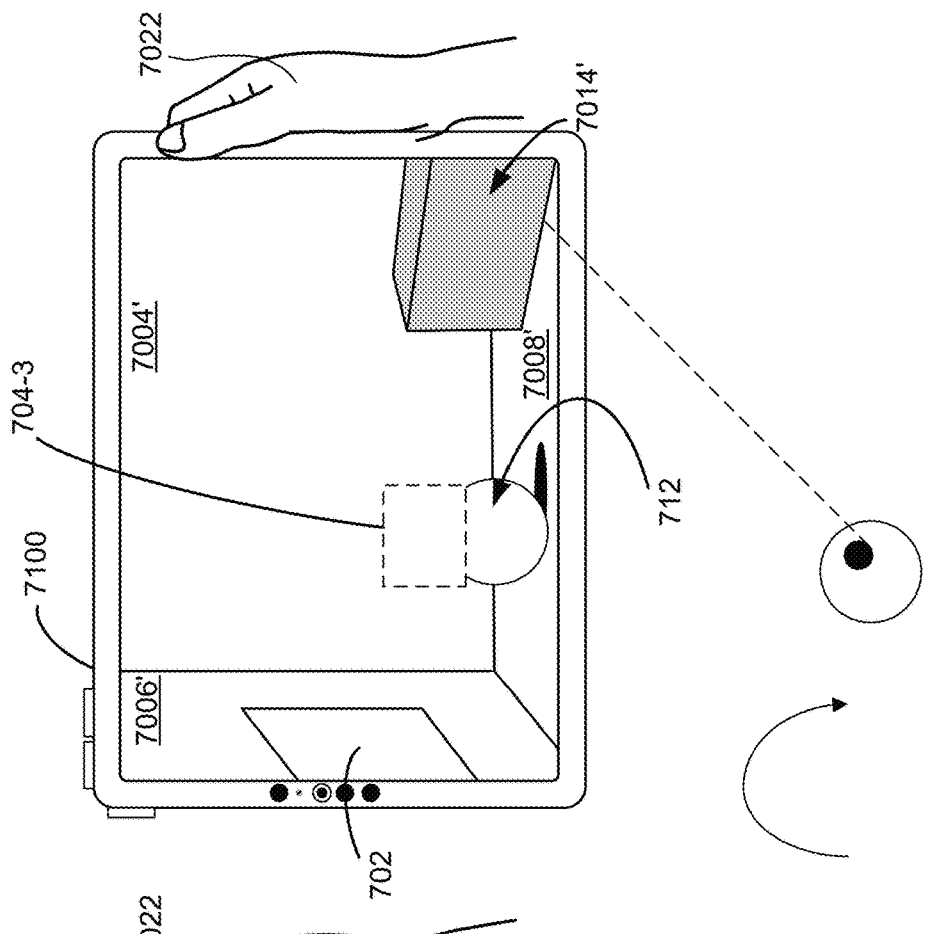
Figure 7G:
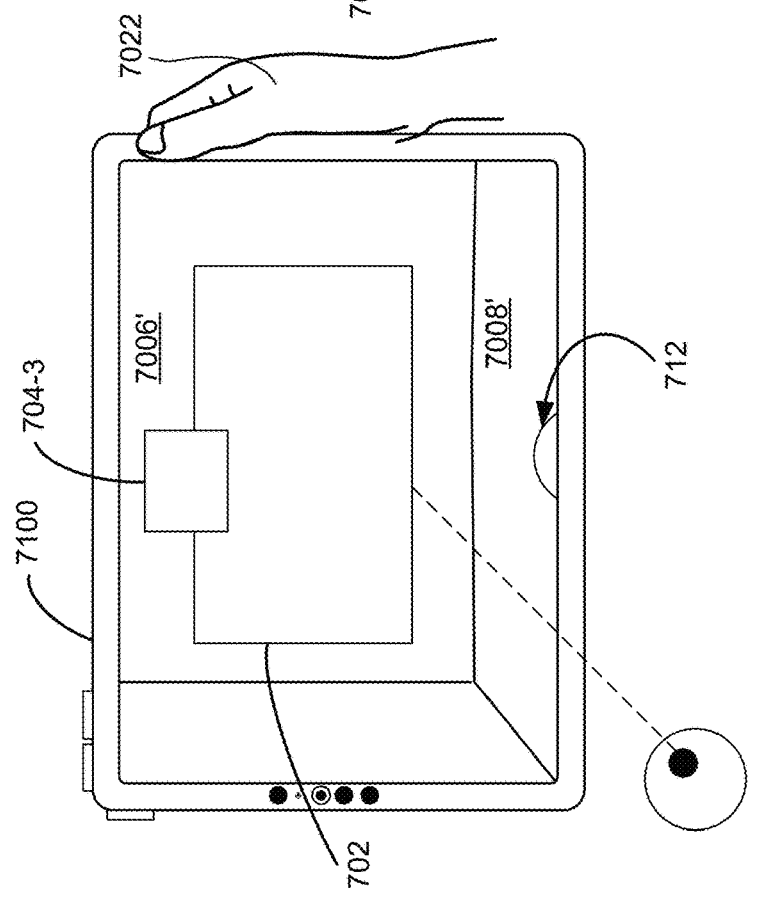

In some embodiments, in accordance with the alert being a notification for an application that is associated with the two or more user interface objects (e.g., user interface object 702 and user interface object 712), in response to the user changing the user's current view (e.g., by moving position and/or orientation in the physical environment) from the user's view in FIG. 7G to the user's current view in FIG. 7H (e.g., the user turns to the right in the physical environment), the representation of the alert 704-3 is displayed, after the user has moved, at a position that at least partially overlaps the second user interface object 712. In some embodiments, the computer system determines which user interface object, of the two or more user interface objects that are associated with the application, is most prominent (e.g., most centered, takes the most space, is closest to a position of the user's current attention) in a current view of the three-dimensional environment, and displays the representation of the alert 704-3 at least partially overlaying the most prominent user interface object related to the application in the current view. As such, in some embodiments, the representation of an alert for an application is positioned in the three-dimensional environment based on currently displayed application windows and/or objects for the application related to the alert.

In some embodiments, a portion of the three-dimensional environment does not include virtual content. For example, the user is enabled to move (e.g., or turn) in the physical environment to a portion (e.g., a predefined area) of the three-dimensional environment that does not display virtual content, and instead only displays pass-through content of the physical environment. In some embodiments, while the user's current view corresponds to the portion of the three-dimensional environment that does not display virtual content, the representations of alerts are not displayed in the portion of the three-dimensional environment that does not display virtual content. In some embodiments, certain types of alerts (e.g., notifications for applications) are displayed (e.g., follow the user) even as the user moves to view the portion of the three-dimensional environment that does not include virtual content, while other types of alerts (e.g., system alerts) are not displayed (e.g., any pending system alerts cease to be displayed and do not follow the user) in response to the user's current view including the portion of the three-dimensional environment that does not include virtual content.

FIGS. 7D and 7I-7L are block diagrams illustrating a representation of an alert in a plurality of states (e.g., the representation of alert 704-1 (FIG. 7D) displayed in a first state, the representation of alert 704-4 (FIG. 7I) displayed in a second state, and the representation of alert 704-5 (FIG. 7K) displayed in a third state).

In some embodiments, the representation of the alert 704-1 is initially displayed in a first state, as illustrated in FIG. 7D. In some embodiments, the first state of the representation of the alert 704-1 comprises an icon indicating information about the alert. For example, the first state of the representation of the alert 704-1 comprises an application icon for an application associated with the alert. In some embodiments, the representation of the alert 704-1 is displayed at a predefined position relative to the user's current view of the three-dimensional environment.

In some embodiments, the representation of the alert 704-1 is initially displayed at a position relative to a current position of the user's hand. For example, the representation of the alert is displayed near the user's hand (e.g., in the user's palm, or above the back of the user's hand) while the user's hand is in the current view of the three-dimensional environment. In some embodiments, a sound and/or haptic is provided in response to receiving the alert. In some embodiments, the computer system outputs a sound (e.g., an audio indication) that is simulated as coming from the user's hand (e.g., or from the position in the three-dimensional environment at which the alert is displayed). As such, the sound and/or haptic is provided to indicate to the user that a new alert has been received, and makes it intuitive for the user to view the alert by turning toward the position of the simulated sound (e.g., the user looks at the user's hand).

Figure 7I:
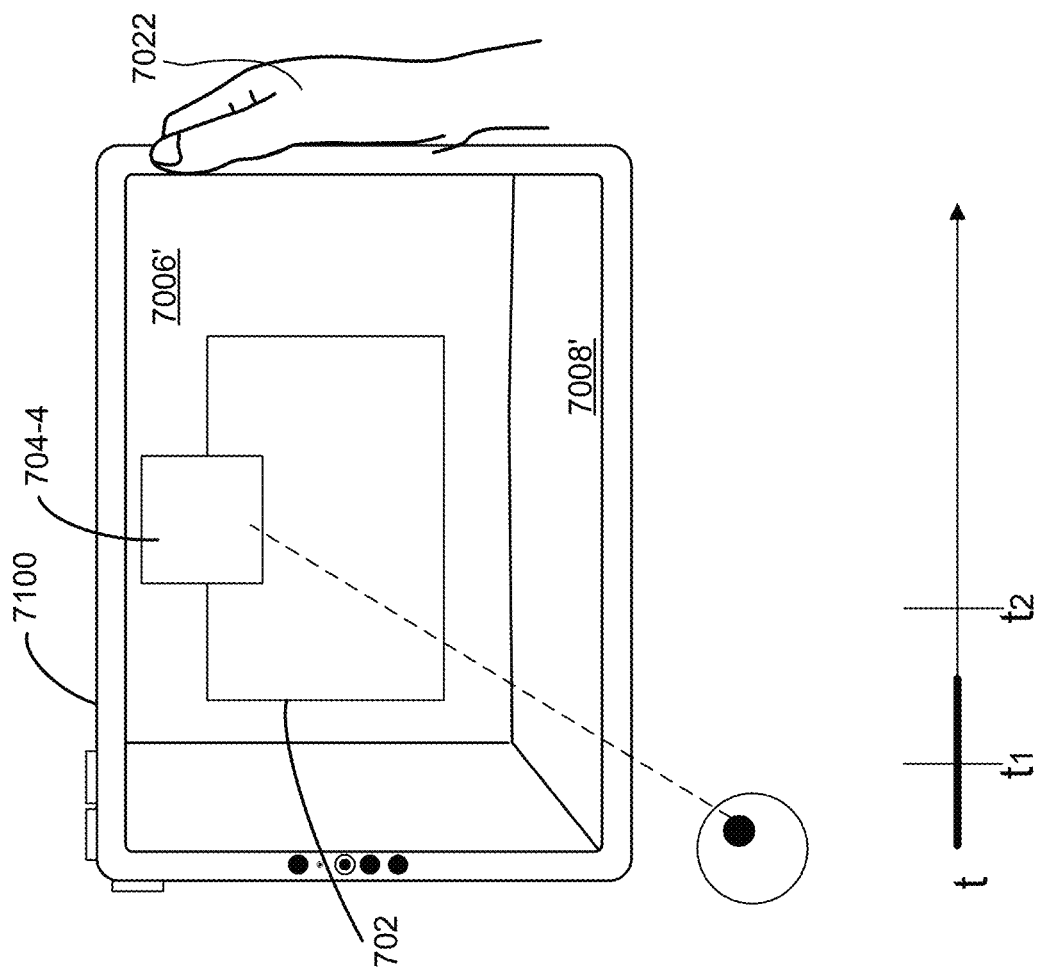
Figures 7L, 7M:
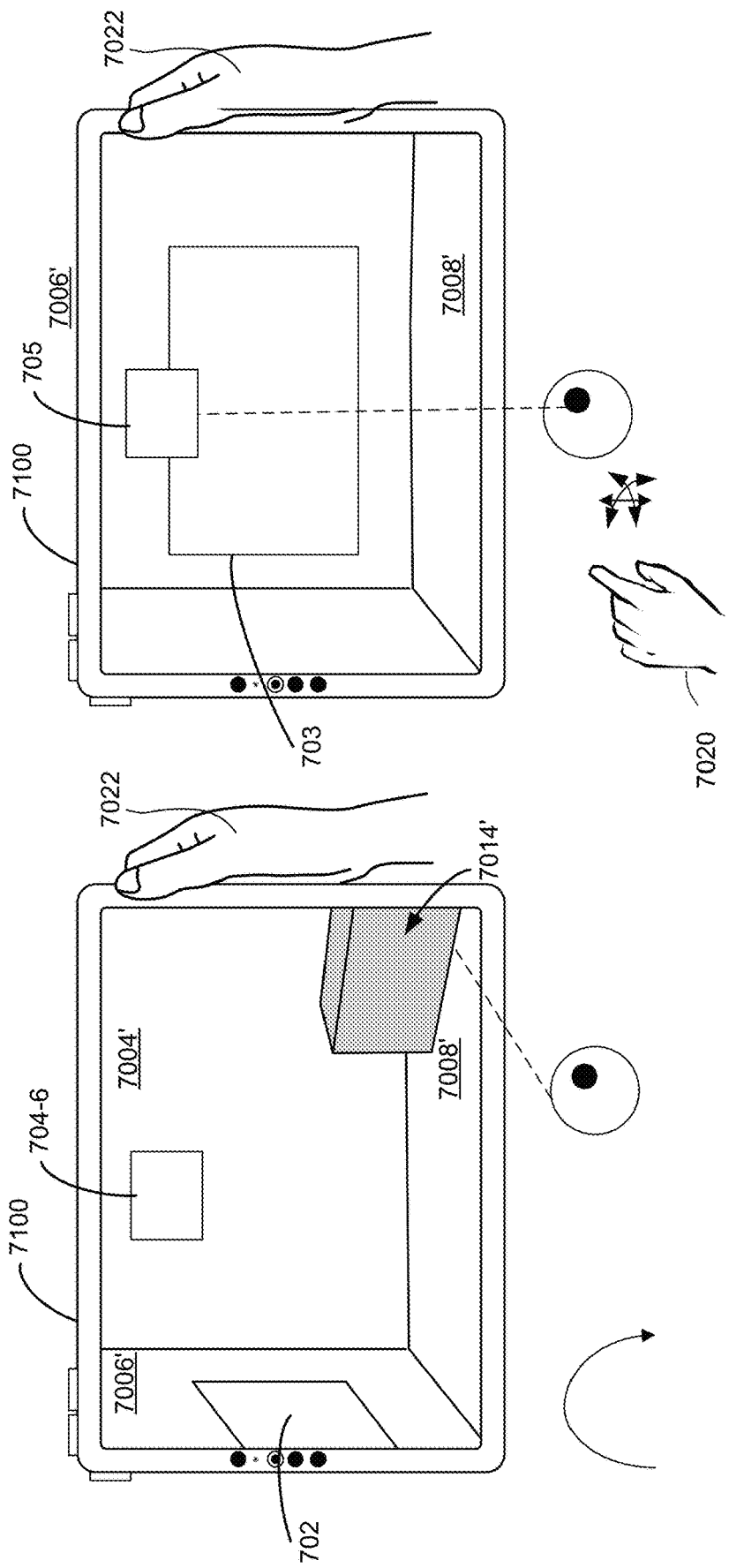
Figure 7O:
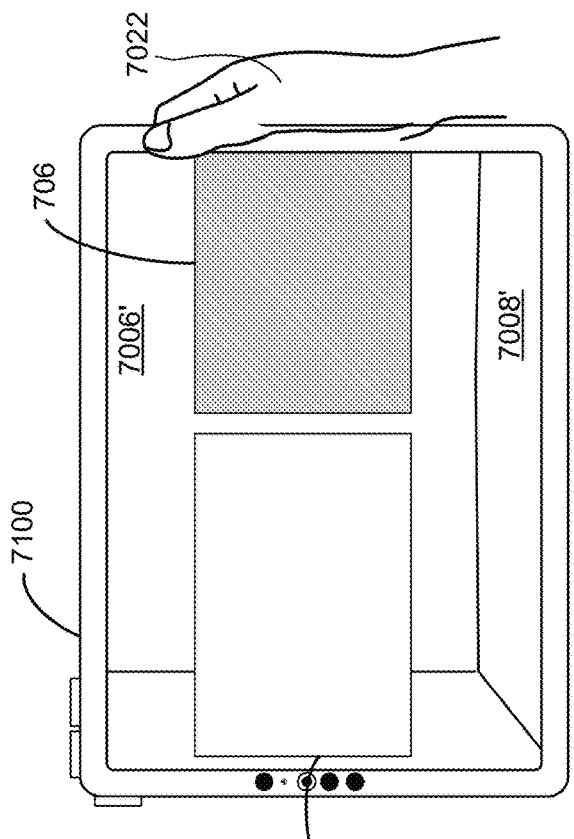
Figure 7N:
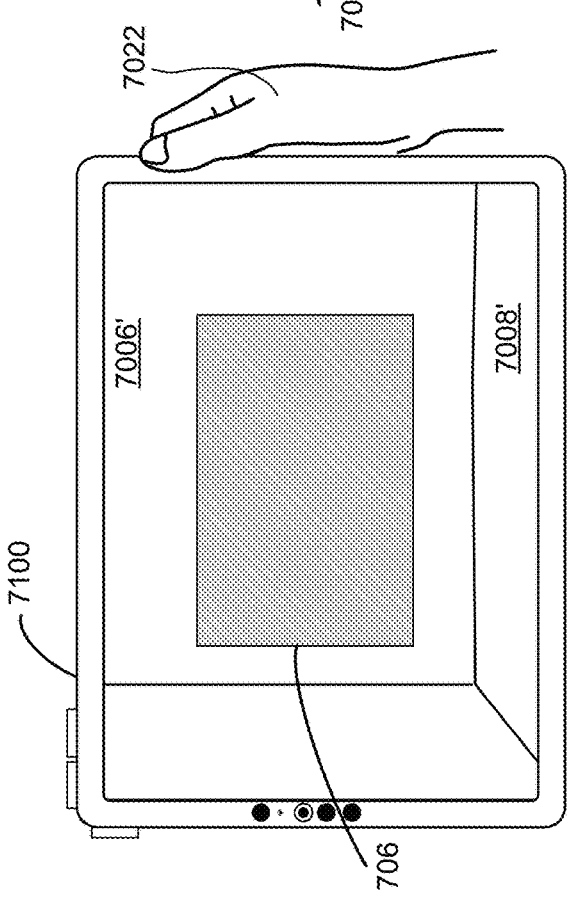
Figure 7Q:
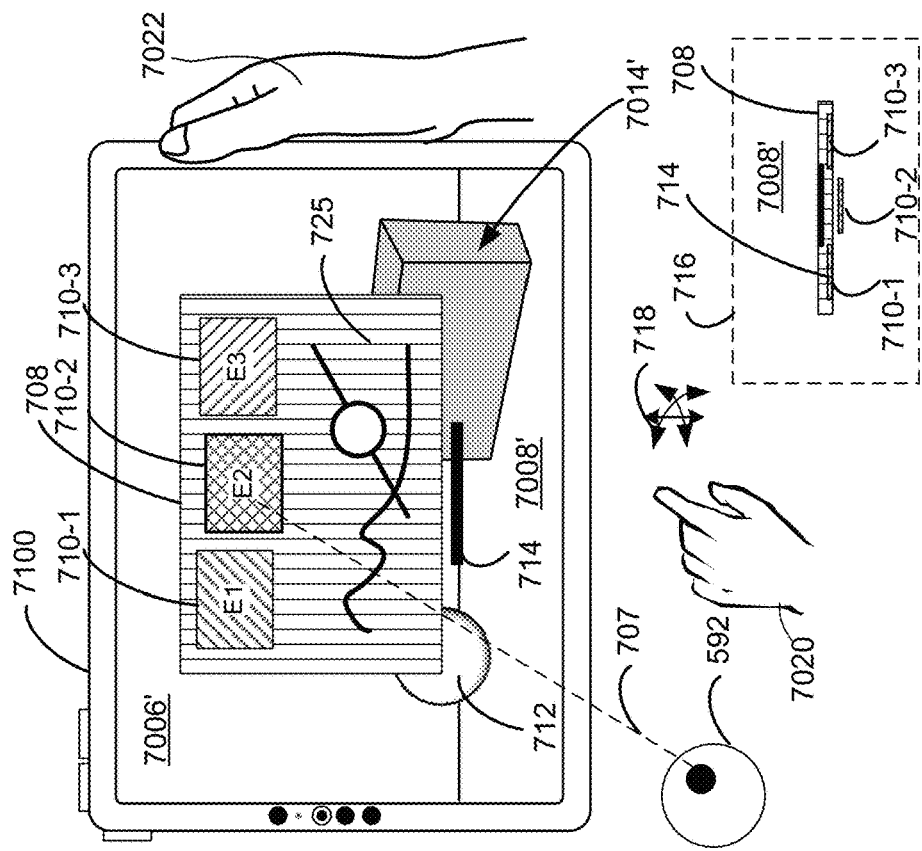
FIGS. 7P-7W are block diagrams that illustrate navigating through a first user interface object to a second user interface object, in accordance with some embodiments.

In some embodiments, as illustrated in FIG. 7I, the user pays attention (e.g., looks at, turns the user's head toward) the representation of the alert. In response to detecting the user paying attention to the representation of the alert, the representation of the alert 704-4 is displayed in a second state distinct from the first state (e.g., the representation of the alert 704-4 is the second state of the representation of the alert 704-1 shown in the first state (FIG. 7D)).

In some embodiments, the second state of the representation of the alert includes the icon that is also displayed in the first state and additional information about the alert. For example, the representation of the alert 704-4 in the second state, displays an indication of an application name (e.g., a textual indication) below the application icon. In some embodiments, the representation of the alert in the second state includes content for an application associated with the alert.

In some embodiments, as indicated by the timeline in FIG. 7I, before displaying the representation of the alert in the second state, the computer system determines that the user has paid attention to the representation of the alert (e.g., displayed in the first state) for a first threshold amount of time (e.g., $t_1$). In some embodiments, the first threshold amount of time is less than one second (e.g., 0.1 second, 0.25 seconds, or 0.5 seconds). For example, after (e.g., in response to) the user has looked at (e.g., gazed at) the representation of the alert 704-1 in the first state for the first threshold amount of time, the representation of the alert is displayed in the second state (e.g., as representation of the alert 704-4). In some embodiments, the computer system updates display of the representation of the alert from the first state to the second state in response to detecting (e.g., automatically, and optionally immediately) that the user has looked at the representation of the alert.

In some embodiments, after the representation of the alert 704-4 is displayed in the second state, in accordance with a determination that the user stops paying attention to the alert (e.g., turns away, or otherwise changes the user's position in the physical environment), as illustrated in FIG. 7J (e.g., the user turns to the right), the representation of the alert is no longer displayed in the user's current view of the three-dimensional environment. For example, in FIG. 7J, the user is paying attention to the representation of object 7014', having turned away from the representation of the alert 704-4 in the second state, and the representation of the alert 704-4 ceases to be displayed. In some embodiments, as described above, if the representation of the alert 704-1 remains in the first state (e.g., without updating to the second state) (e.g., because the user has not looked at the alert for the first threshold amount of time, $t_1$), and a threshold amount of time passes before the user looks at the representation of the alert (e.g., and/or the user turns away from the representation of the alert 704-1 in the first state), the representation of the alert 704-1 ceases to be displayed.

In some embodiments, as illustrated in FIG. 7K, in accordance with a determination that the user pays attention to (e.g., gazes at and/or turns the user's head towards) the currently displayed representation of the alert for at least a second threshold amount of time (e.g., $t_2$), the representation of the alert is displayed in a third state, distinct from the first and second states. In some embodiments, the representation of the alert is displayed in the third state in response to the user performing a gesture (e.g., in addition to, or instead of, gazing at the representation of the alert for at least the second threshold amount of time). For example, the user's hand 7020 performing a gesture (e.g., a pinch gesture, a tap gesture, or another gesture of a predetermined gesture type, detected by one or more sensors of the computing device) in conjunction with the user gazing at the alert causes the device to update display of the representation of the alert 704-5 to the third state.

In some embodiments, the representation of the alert in the third state includes additional information (e.g., content related to the alert) and/or one or more user-selectable objects (e.g., buttons or other control options), as compared to the first and second states of the representation of the alert. For example, the representation of the alert 704-5 in the third state is enlarged (e.g., larger than the representation of the alert in the first and second states). For example, the representation of the alert in the third state includes a user-selectable option to dismiss the alert (e.g., and in response to the user selecting (e.g., with a gesture, such as a gaze and pinch gesture) the option to dismiss the alert, the representation of the alert is ceased to be displayed in the three-dimensional environment (e.g., in any of the first, second or third states)).

In some embodiments, the representation of the alert in the third state includes a user-selectable option to open an application window for an application associated with the alert (e.g., wherein, in response to detecting the user selecting the option to open the application window, the application window is displayed with content relating to the alert). For example, if the alert is an alert with a headline for a news article, in response to the user selecting the option to open the application window, the news article associated with the headline is displayed in the application window (e.g., instead of displaying an initial home display of the application window). Accordingly, in response to a request to open the application from the representation of the alert in the third state, the displayed application window displays content related to the alert.

For example, for an alert of a new message in a messaging application, the representation of the alert 704-1 in the first state comprises an application icon for the messaging application, the representation of the alert 704-4 in the second state comprises the application icon and a textual label of the title of the messaging application (e.g., "Messages") and/or a contact name of a sender of an incoming message, and the representation of the alert 704-5 in the third state comprises a preview of the incoming message that is received in the messaging application (e.g., at least a portion of the incoming message).

In some embodiments, the representation of the alert 704-5 in the third state includes one or more user-selectable options (e.g., displayed buttons that are enabled to be selected via a gaze input and/or air gesture). For example, the one or more user-selectable options include an option to open the application (e.g., open the messaging application), an option to dismiss the alert, and/or options particular to the application (e.g., an option to input text to reply to the message directly from the representation of the alert 704-5 in the third state without opening the messaging application).

Accordingly, as the user pays more attention to the representation of the alert (e.g., gazes at the representation of the alert for a threshold period of time and/or performs a gesture directed to the representation of the alert), the representation of the alert is updated from a first and/or second state to a third state that includes additional information related to the alert. For example, in response to detecting a user input (e.g., a user input directed to the representation of the alert), such as the user the user raising the user's hand (e.g., while gazing at the alert), performing another gesture with the user's hand 7020 (e.g., a pinch input or a tap input), and/or in response to detecting the user raising the user's hand in a predefined pose (e.g. at a predefined orientation, and/or with a predefined shape of the user's hand), the representation of the alert is updated to the third state. For example, performing a gesture with the user's hand 7020 comprises an air gesture (e.g., the pinch input and/or the tap input are air gestures, as described with more detail below.

In some embodiments, after the representation of the alert is displayed 704-5 in the third state (e.g., FIG. 7K), the user turns away (e.g., moves in the physical environment) from the representation of the alert, as illustrated in FIG. 7L. In some embodiments, in accordance with the representation of the alert being displayed in the third state (e.g., by the user paying attention to the representation for at least the second threshold amount of time (e.g., $t_2$) and/or in response to a gesture directed to the representation of the alert), after the user changes the user's current viewpoint in the three-dimensional environment, the representation of the alert 704-6 continues to be displayed (e.g., because it was activated to the third state). In some embodiments, after the user moves in the physical environment, the representation of the alert 704-6 is maintained with the same size and/or content as the representation of the alert 704-5 in the third state (e.g., the enlarged representation of the alert that includes content for the application and/or user-selectable options). In some embodiments, after the user moves in the physical environment, the representation of the alert 704-6 continues to be displayed in the three-dimensional environment, but is not displayed in the third state. For example, the representation of the alert is redisplayed in the first or second state (e.g., the representation of the alert decreases in size from the third state in response to the user paying attention to a different portion of the three-dimensional environment (e.g., the user moving in the physical environment)).

In some embodiments, if the user does not pay attention to the representation of the alert while the representation of the alert is displayed in the first state (and/or the second state), the representation of the alert automatically disappears after a predefined time period (e.g., 3 seconds, 5 seconds, or a period of time in the range of 1.5 to 5 seconds). In some embodiments, if the user has paid attention to the alert (e.g., and/or performed a gesture directed to the alert), that causes the representation of the alert to update to the third state, the representation of the alert does not automatically disappear (e.g., the user must request to dismiss the representation of the alert after the representation of the alert has been displayed in the third state).

In some embodiments, in response to receiving a second alert (e.g., while displaying a representation of a first alert in the first state), the representation of the first alert in the first state is at least partially replaced with a representation of the second alert.

In some embodiments, in response to receiving a second alert while displaying a representation of a first alert in the third state, the representation of the second alert is displayed without replacing the representation of the first alert in the third state. For example, after the representation of the first alert is displayed in the third state (e.g., with the additional content and/or selectable user interface objects), the representation of the first alert in the third state is maintained (e.g., so that the user is enabled to continue interacting with the first alert in the third state) until the user dismisses the first alert (e.g., by selecting a dismiss option).

In some embodiments, in response to receiving multiple alerts (e.g., concurrently or subsequently within a predefined amount of time of each other), representations for the multiple alerts are concurrently displayed (e.g., as stacked alerts or side-by-side) in the first state. In some embodiments, in response to the user paying attention to any one of the representations for an alert of the multiple alerts (e.g., the first alert), the representations for the multiple alerts are updated to be displayed in the second state. Accordingly, in response to the user paying attention to any alert in the multiple alerts, all of the currently displayed representations of the alerts are updated to be displayed in the second state. This makes it easy for the user to see all of the currently pending (e.g., not yet dismissed) alerts, such that the user can then select (using a gesture, such as a gaze and/or hand gesture) one or more of the multiple alerts to view in the third state (to see additional information and/or user selectable options for the selected alert(s)). For example, while the multiple alerts are displayed in the second state, the user selects the representation of the first alert, by gazing at the representation of the first alert in conjunction with a hand gesture performed with hand 7020, which causes the representation of the first alert to be displayed in the third state.

In some embodiments, before the user selects a representation of an alert from the multiple alerts (e.g., the user is gazing at the multiple alerts), a currently selected alert is emphasized relative to the other representations of alerts. For example, as the user moves the user's gaze to different representations of alerts in the representations of the multiple alerts, the alert that the user is currently gazing at is indicated to the user by enlarging and/or highlighting the representation of the alert relative to the other displayed representations of alerts. This makes it easy for the user to know which alert the user is selecting before requesting to display the alert in the third state (by performing a gesture to select the alert).

In some embodiments, after selecting the first alert from the multiple alerts that are displayed in the second state, the representations for the alerts that were not selected of the multiple alerts are no longer displayed. For example, the first alert is displayed in the third state without displaying representations for any of the multiple alerts. In some embodiments, the multiple alerts are automatically dismissed after the user selects the first alert.

In some embodiments, if the representation of the first alert is the only representation of an alert that is displayed (e.g., any other alerts have already been dismissed), the user is enabled to raise the user's hand to transition the alert to the third state (e.g., as described above). However, if representations for multiple alerts are displayed concurrently, in response to the user raising the user's hand, none of the alerts are transitioned to the third state (e.g., the representations for the multiple alerts are maintained in the first or second state). In some embodiments, before the user raises the user's hand, the multiple alerts are displayed in the first state or the second state.

FIG. 7M-7O are block diagrams illustrating opening an application from a displayed application icon. In some embodiments, an application icon 705 is displayed at a first position in the three-dimensional environment. In some embodiments, the application icon 705 is a representation of a notification (e.g., a representation of an alert 704-1, described above). In some embodiments, the application icon 705 is an application icon displayed in a set of application icons, for example within a portion of the three-dimensional environment that enables the user to launch (e.g., open) applications from the set of application icons (e.g., an application dock or a set of application icons displayed in an array or menu within a home display).

In some embodiments, the application icon 705 is displayed concurrently with an application window 703, as illustrated in FIG. 7M. In some embodiments, the application window 703 is another type of user interface object (e.g., a virtual object), such as user interface object 702, described above. In some embodiments, the application icon 705 is associated with an application distinct from the application of the currently displayed application window 703.

In some embodiments, the application icon 705 is displayed at a predefined position relative to the user's current viewpoint within the three-dimensional environment. For example, the application icon 705 is displayed at a top-center portion of the user's current view of the three-dimensional environment (e.g., such that as the user moves within the physical environment and the user's current viewpoint changes, the application icon 705 is displayed at a same position relative to the user).

In some embodiments, in response to a user input directed to the representation of the displayed application icon 705, an application associated with the application icon is opened (e.g., displayed). In some embodiments, the user input comprises a gaze input directed to the representation of the displayed application icon. In some embodiments, the user input comprises an air gesture directed to the representation of the displayed application icon 705 (e.g., in conjunction with a gaze input directed to the application icon).

In some embodiments, the type of user input directed to the representation of the displayed application icon controls how the application is opened. For example, in response to a first type of user input (e.g., a pinch input) directed to the application icon 705, an application window 706 for the application that is associated with the application icon 705 is opened and replaces display of the application window 703 (e.g., or other virtual object) that is displayed in the three-dimensional environment while receiving the first type of user input. For example, the pinch input is an air gesture. In some embodiments, in response to the first type of user input, the application window 706 snaps to a position corresponding to the previously displayed application window 703 (e.g., without maintaining display of application window 703), as described in more detail below. For example, in FIG. 7N, application window 706 replaces display of application window 703 (shown in FIG. 7M).

In some embodiments, in response to the first type of user input (e.g., the pinch input performed by the user's hand 7020), the application window 706 is snapped into the position at which application window 703 was displayed. For example, in response to the user providing a pinch input directed to the application icon 705, the computer system automatically, without additional user input, opens and displays the application window 706 at a position that is snapped to a predefined position of the previously displayed application window 703 (e.g., without requiring the user to fully align the application icon or application window with the predefined position). In some embodiments, in accordance with the application window 706 snapping into place in the predefined position, the computer system outputs an audio and/or haptic indication.

In some embodiments, the option for the user to open an application window from the displayed application icon is available in accordance with the application icon being a representation of an alert that is displayed in the third state (e.g., representation of alert 704-5, as described above with reference to FIGS. 7I-7L). For example, if the displayed application icon 705 is a representation of an alert that is displayed in the first state or the second state, the user is not enabled to open the application window (e.g., using a pinch input) until the representation of the alert is displayed in the third state.

In some embodiments, in response to a second type of user input (e.g., an air gesture) (e.g., distinct from the first type of user input), directed to the application icon 705, an application window 706 that is associated with the application icon 705 is opened while continuing to display the application window 703 (e.g., or other virtual object) that is displayed while receiving the second type of user input, as illustrated in FIG. 7O.

For example, in response to the user performing a pinch and drag input (e.g., or other air gesture) directed to application icon 705, the application window 706 is displayed at a position in accordance with the drag input (e.g., wherein the drag input has a start position and an end position of the drag, and the application window 706 is displayed at a position that corresponds to the end position of the drag). For example, the user drags the application icon 705 next to the already displayed application window 703. In another example, a direction of the user drag gesture is used by the computer system to determine a position for application window 706 relative to the already displayed application window 703 (e.g., above, below, to the left or to the right of the already displayed application window 703). In some embodiments, the application icon 705 is displayed as moving while the user performs the drag gesture. For example, the application icon 705 is updated based on the movement of the user's hand that is performing the drag input. As the user moves the user's hand, the position of the application icon 705 is updated in the three-dimensional environment (e.g., to follow the movement of the user's hand during the drag gesture). As such, in some embodiments, application window 703 is concurrently displayed with application window 706 in the three-dimensional environment. In some embodiments, application window 703 and application window 706 are displayed side-by-side (e.g., without overlap). In some embodiments, in response to detecting the second type of user input, application window 706 is displayed at a position that at least partially overlaps the application window 703 (e.g., while continuing to display at least a portion of application window 703).

Accordingly, if the user performs a pinch gesture selecting the application icon 705, the application window 706 is opened to replace display of a currently displayed application window 703, but if the user performs a pinch and drag gesture selecting and moving the application icon 705, the application window 706 is opened in the three-dimensional environment without replacing display of the currently displayed application window 703.

In some embodiments, the computer system displays a plurality of (e.g., at least two) application icons (e.g., a plurality of representations of alerts and/or a plurality of application icons in an application dock), and the user is enabled to select an application icon from the plurality of application icons (e.g., by gazing at the application icon the user intends to select). In response to a user input (e.g., an air gesture, such as a pinch and/or a pinch and drag) directed to the selected application icon (e.g., a second application icon), an application window for the application associated with the selected application icon is displayed, either concurrently with any previously displayed application windows (e.g., by dragging the application icon to a portion of the three-dimensional environment), or by replacing any previously displayed application windows (e.g., by pinching the application icon without a drag input).

In some embodiments, the user is enabled to open (e.g., select) multiple application windows for more than one of the plurality of application icons, to be displayed concurrently. In some embodiments, the user is enabled to open multiple windows for a same application (e.g., multiple instances of a same application).

In some embodiments, while displaying the application window for the application associated with the selected application icon (e.g., the second application icon), the application icons from the plurality of application icons (e.g., or a subset of the applications from the plurality of application icons) that were not selected continue to be displayed in the three-dimensional environment (e.g., such that the user is enabled to also open application windows for the remaining application icons). For example, the user is enabled to select a third application icon (distinct from the second application icon), and in response to the user performing a pinch and drag input directed to the third application icon, an application window for the application associated with the third application icon is opened and concurrently displayed with the application window for the second application icon (e.g., and with any previously displayed application windows).

In some embodiments, certain types of application icons have different behaviors in accordance with the application icon being for a predefined set of applications (e.g., a messaging application, or another predefined type of application). For example, for a messaging application, instead of a pinch input directed to an application icon (e.g., a notification) for the messaging application causing an application window for the messaging application to open (and replace display of the previously displayed application window), an application window for the messaging application is displayed as an overlaid application window that overlays the previously displayed application window 703 without dismissing (e.g., closing or exiting) the application window 703. As such, the user is enabled to interact with the application window for the messaging application (e.g., to read and/or reply to messages) and quickly return to the previously displayed application window 703 because the application window 703 has remained active in the background (e.g., behind the application window for the messaging application).

FIGS. 7P-7W are block diagrams that illustrate navigating through a first user interface object to a second user interface object, in accordance with some embodiments. In some embodiments, the first user interface object is displayed in a three-dimensional environment (e.g., an augmented reality environment, or a virtual reality environment) and includes one or more selectable user interface elements (e.g., buttons, selectable options, controls, and/or hyperlinks), and selection of a respective one of the one or more selectable user interface elements causes the computer system to display, in the three-dimensional environment, the second user interface object which corresponds to the selected user interface element. In some embodiment, the second user interface object is a modal user interface object that requires the user's input and/or attention in order to be dismissed from the three-dimensional environment. In some embodiments, the first user interface object and the second user interface objects are windows that include a background platter and/or material (e.g., texture, color, gradient, blurred layer, and/or other background materials), and include foreground content and/or user interface objects overlaying the background platter and/or material. In some embodiments, the first user interface object and/or the second user interface object are displayed with respective handles that, when dragged by a user's input, moves the first user interface object and/or the second user interface object in the three-dimensional environment in accordance with the user's input. In some embodiments, the first user interface object has some or all of properties, appearance, states, and/or interactions that are described with respect to user interface objects 702 and/or 703 in FIGS. 7A-7O, and the second user interface object has some or all of the properties, appearance, states, and/or interactions that are described with respect to user interface objects 704-1, 704-3, 704-4, 704-5, and/or 704-5 in FIGS. 7A-7O.

Figure 7P:
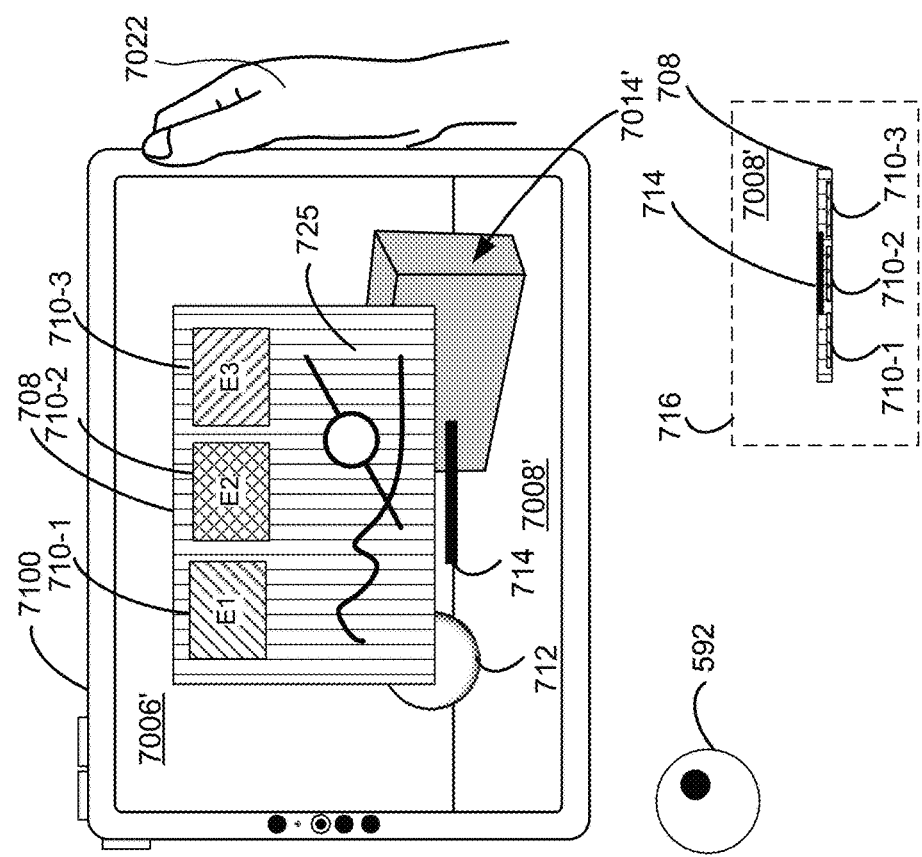

In FIG. 7P, the computer system displays a first view of a three-dimensional environment that corresponds to a first viewpoint of a user, in accordance with some embodiments. In some embodiments, the first view of the three-dimensional environment includes virtual content (e.g., a virtual object 712, window 708, virtual wallpaper, virtual decal, and/or other graphical elements and/or visual effects) and a representation of the physical environment (e.g., representation 7006' of the wall 7006, representation 7008' of the floor 7008, representation 7014' of the physical object 7014, and/or representation of other portions of the physical environment in the field of view provided by the display generation component 7100). As shown in FIG. 7P, the virtual content displayed by the computer system includes a first user interface object 708, such as a window or an interactive user interface element that provides access to and/or causes display of a second user interface object different from the first user interface object (e.g., second user interface object 720 in FIG. 7R, or another user interface object), in accordance with some embodiments. In some embodiments, the first user interface object 708 includes a plurality of interactive user interface elements (e.g., user interface elements 710-1, 710-2, and 710-3) and, optionally, non-interactive content (e.g., video content, images, and/or graphics) overlaying or embedded in a background 725. In some embodiments, the first user interface object 708 is displayed at a first position in the three-dimensional environment and, optionally, facing toward the first viewpoint of the user. In some embodiments, the first position in the three-dimensional environment is at a first distance away from the first viewpoint of the user (e.g., an arm's length, a comfortable viewing distance for the user, or a distance between one to three feet chosen by the computer system or application that provides the first user interface object). In some embodiments, the first user interface object 708 is displayed with a grabber 714 (e.g., at the bottom of the first user interface object 708, or at a position proximate to a corner or another side of the first object) with which the first user interface object 708 is repositionable in the three-dimensional environment in accordance with a user's input (e.g., a select and drag input provided through an air gesture, through a trackpad, and/or through a pointing device). In some embodiments, the first user interface object 708 is a window that includes controls and/or hyperlinks that, when selected, cause the computer system to display another window or a dialogue box that were not concurrently displayed in the three-dimensional environment with the first user interface object prior to the selection.

In some embodiments, as shown in the inset 716 in FIG. 7P, the first user interface object 708 has a finite, non-negligible thickness in the direction that is substantially perpendicular to the front surface of the first user interface object 708 (e.g., along the line of sight of the user from the first viewpoint of the user). In some embodiments, as shown in the inset 716, the front surface of the first user interface object 708 is substantially parallel to the direction of gravity, substantially perpendicular to the surface of the floor 7008, and/or substantially parallel to the plane of the viewport provided by the display generation component 7100. In some embodiments, the user interface elements 710-1, 710-2, and 710-3 of the first user interface object 708 are displayed closer to the front surface of the first user interface object 708 than to the back surface of the first user interface object 708. In some embodiments, the user interface elements 710-1, 710-2, and 710-3 have a thickness that is less than the thickness of the first user interface object 708 in the direction of the line of sight of the user, and are embedded at least partially within the background material 725 of the first user interface object 708.

In some embodiments, the background material 725 of the first user interface object 708 is translucent and has visual characteristics (e.g., color, luminance, and/or variations) that are generated based on the visual characteristics of the physical and/or virtual objects surrounding the first user interface object 708. In some embodiments, the first user interface object 708 is displayed with highlighted portions on its edges to simulate optical properties of the background material 725 under the virtual illumination of virtual and/or physical lighting. In some embodiments, the grabber 714 is displayed below the bottom edge of the first user interface object 708, optionally, closer to the back surface of the first user interface object 708 than to the front surface of the first user interface object 708.

In FIG. 7Q, while the first user interface object 708 is displayed at the first position in the three-dimensional environment that is the first distance away from the first viewpoint of the user, the computer system detects a first user input that is directed to at least a portion of the first user interface object 708. In this example, the first user input is directed to one of the interactive user interface elements included in the first user interface object 708, e.g., user interface element 710-2. In some embodiments, detecting the first user input includes detecting a user's gaze 707 directed to the user interface element 710-2 that, optionally, remained on the user interface element 710-2 for at least a threshold amount of time. In some embodiments, the computer system displays a visual indication (e.g., animating the user interface element 710-2, enlarging, shrinking, and/or otherwise visually enhancing the user interface element 710-2 relative to other user interface elements in the first user interface object 708) that the user interface element 710-2 is ready to be selected when the user's gaze 707 is detected on the user interface element 710-2 for at least a threshold amount of time. In some embodiments, the computer system displays the visual indication that the user interface element 710-2 is ready to be selected when the computer system detects a user's hand in a ready state posture (e.g., raised, and/or not in a relaxed pose) in conjunction with (e.g., while or within a threshold amount of time of) detecting the gaze input 707 directed to the user interface element 710-2. As shown in the inset 716 in FIG. 7Q, in some embodiments, the computer system displays the user interface element 710-2 at a position raised away from the background material 725 of the first user interface object 708 (e.g., in the direction toward the viewpoint of the user, and/or away from the front and back surfaces of the first user interface object) to indicate that the user interface element 710-2 is ready to be selected with a gesture or other selection input provided by the user. In some embodiments, in response to detecting an air gesture 718, such as an air tap gesture, a pinch gesture, or another predetermined gesture, in conjunction with detecting the gaze input 707 directed to the user interface element 710-2, the computer system activates the user interface element 710-2 (e.g., displays another visual effect (e.g., displays an animation of the user interface element 710-2, changing the size and/or color of the user interface element 710-2, and/or displays a highlighted border around the user interface element 710-2) to indicate selection of the user interface element 710-2), and performs an operation corresponding to selection of the user interface element 710-2, namely, displaying a second user interface object 720 in the three-dimensional environment (as shown in FIG. 7R). In some embodiments, the air gesture 718 is a long pinch gesture that includes maintaining contact between two fingers (e.g., thumb and index finger, or thumb and middle finger) for at least a threshold amount of time, and breaking the contact after the time threshold has been met.

In FIG. 7R, the computer system, in response to detecting the first user input, including detecting a gaze input 707 directed to a portion of the first user interface object 708 (e.g., user interface element 710-2) in conjunction with detecting an air gesture 718, displays the second user interface object 720. In some embodiments, the second user interface object 720 is a window that includes one or more interactive user interface elements (e.g., user interface elements 722-1, 722-2, and 722-3) and/or non-interactive content (e.g., video, images, and/or graphics) overlaying or embedded in a background 727. In some embodiments, the second user interface object 720 is a modal user interface element that requires a user's explicit input and/or attention (e.g., as represented by a gesture, gaze, and/or voice command) before the model user interface element can be dismissed from the three-dimensional environment.

In some embodiments, the second user interface object 708 is displayed at a second position in the three-dimensional environment and, optionally, facing toward the first viewpoint of the user. In some embodiments, the second position in the three-dimensional environment is also at the first distance away from the first viewpoint of the user (e.g., an arm's length, a comfortable viewing distance for the user, or a distance between one to three feet chosen by the computer system or application that provides the first user interface object). In some embodiments, the computer system pushes the first user interface object 708 that was previously displayed at the first distance away from the first viewpoint to a third position that is farther away from the first viewpoint, so that the second user interface object 720 can be displayed at the first distance away from the first viewpoint and/or closer to the first viewpoint than the first user interface object 708. In some embodiments, when the first user interface object 708 is pushed away from the first viewpoint in the three-dimensional environment, its spatial relationships with other objects (e.g., virtual object 712, representation 7014' of the physical object 7014, and/or representation of the walls and floor 7008) also change accordingly.

In some embodiments, the second user interface object 720 is displayed with a grabber 724 (e.g., at the bottom of the second user interface object 720, or at a position proximate to a corner or another side of the second user interface object) with which the second user interface object is repositionable in the three-dimensional environment in accordance with a user's input (e.g., a select and drag input provided through an air gesture, through a trackpad, and/or through a pointing device). In some embodiments, the second user interface object 720 is a window that includes controls and/or hyperlinks that, when selected, causes the computer system to display another window or a dialogue box that were not concurrently displayed in the three-dimensional environment with the second user interface object 720 prior to the selection.

In some embodiments, as shown in the inset 716 in FIG. 7R, the second user interface object 720 has a finite, non-negligible thickness in the direction that is substantially perpendicular to the front surface of the second user interface object 720 (e.g., along the line of sight of the user from the first viewpoint of the user). In some embodiments, as shown in the inset 716, the front surface of the second user interface object 720 is substantially parallel to the direction of gravity, substantially perpendicular to the surface of the floor 7008, and/or substantially parallel to the plane of the viewport provided by the display generation component 7100. In some embodiments, as shown in the inset of FIG. 7R, the front surfaces of the first user interface object 708 and the second user interface object 720 are approximately parallel to each other in the three-dimensional environment. In some embodiments, the user interface elements 722-1, 722-2, and 722-3 of the second user interface object 720 are displayed closer to the front surface of the second user interface object 720 than to the back surface of the second user interface object 720. In some embodiments, the user interface elements 722-1, 722-2, and 722-3 have a thickness that is less than the thickness of the second user interface object 720, and are embedded at least partially within the background material 727 of the second user interface object 720.

In some embodiments, the background material 727 of the second user interface object 720 is translucent and has visual characteristics (e.g., color, luminance, and/or variations) that are generated based on the visual characteristics of the physical and/or virtual objects surrounding the second user interface object 720. In some embodiments, the second user interface object 720 is displayed with highlighted portions on its edges to simulate optical properties of the background material 727 under the virtual illumination of virtual or physical lighting. In some embodiments, the grabber 724 is displayed below the bottom edge of the second user interface object 720, optionally, closer to the back surface of the second user interface object 720 than to the front surface of the second user interface object 720. In some embodiments, as shown in the inset 716 in FIG. 7R, the second user interface object 720 is displayed at a depth that was previously occupied by the first user interface object 708, while the first user interface object 708 is pushed to a plane that is farther away from the first viewpoint. In some embodiments, the computer system, optionally, shifts the first user interface object 708 sideways by a suitable amount so that the first user interface object 708 is not completely or partially blocked by the second user interface object 720 in the first view of the three-dimensional environment. In some embodiments, the first user interface object 708 and/or the second user interface object 720 are viewpoint locked and moves in the three-dimensional environment in accordance with the movement of the viewpoint. In some embodiments, while the first user interface object 708 and the second user interface object 720 move in the three-dimensional environment in accordance with the movement of the viewpoint of the user, the first user interface object 708 and the second user interface object 720 maintain their respective distances away from the viewpoint during the movement of the viewpoint. In some embodiments, in response to detecting movement of the viewpoint in the direction toward the first user interface object and/or the second user interface object, the first user interface object and/or the second user interface object are moved in the same direction as the movement direction of the viewpoint, in order to keep the first user interface object and/or the second user interface object at their respective distances away from the viewpoint. In some embodiments, the first user interface object and the second user interface object move and rotate around respective vertical axes (e.g., axes in the direction of gravity, or a downward direction defined by the user's posture) in accordance with movement of the viewpoint around the first and/or second user interface object, such that the first user interface object and the second user interface object continue to face toward the viewpoint of the user.

In some embodiments, when the second user interface object 720 is displayed, the input focus that was previously on the first user interface object 708 is automatically shifted to the second user interface object 720; and in some embodiments, the grabber 714 that were previously displayed below the bottom edge of the first user interface object 708 is moved below the bottom edge of the second user interface object 720 and becomes the grabber 724 of the second user interface object 720. The grabber 724 is used to reposition the second user interface object 720 (e.g., by a pinch and drag input detected in conjunction with a gaze input directed to the grabber 724, and/or by a pinch and drag input detected at the position of the grabber 724) while the second user interface object has input focus.

In some embodiments, in response to detecting the first user input, in addition to displaying the second user interface object 720 and pushing the first user interface object 708 away from the first viewpoint, the computer system reduces the visual prominence of the first user interface object 708 relative to the second user interface object 720, e.g., by dimming the first user interface object 708, blurring the first user interface object 708, and/or making the first user interface object 708 more translucent.

In some embodiments, the computer system, in response to detecting the first user input, displays an animated transition in which the portion of the first user interface object (e.g., user interface element 710-2) that was activated by the first user input transforms into the second user interface object 720. In some embodiments, the animated transition shows the second user interface object 720 emerges from the position of the portion of the first user interface object 708 that was activated by the first user input, as the first user interface object 708 recedes away from the first viewpoint of the user.

Figure 7S:
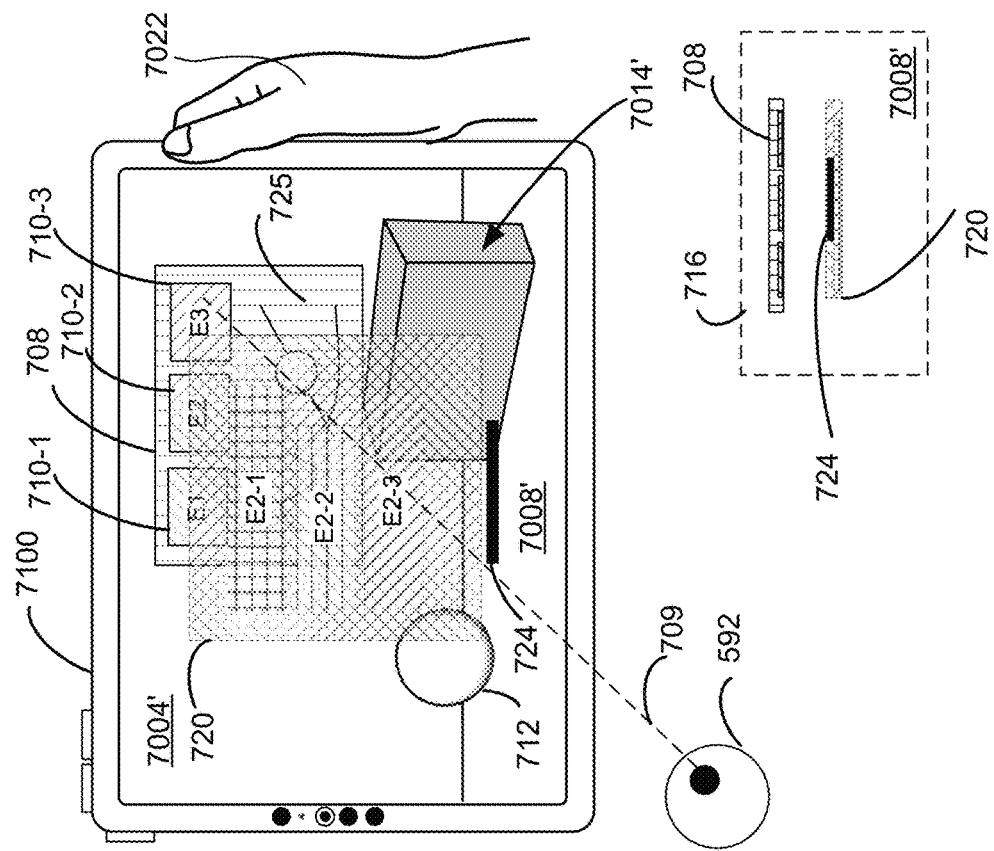
Figure 7R:
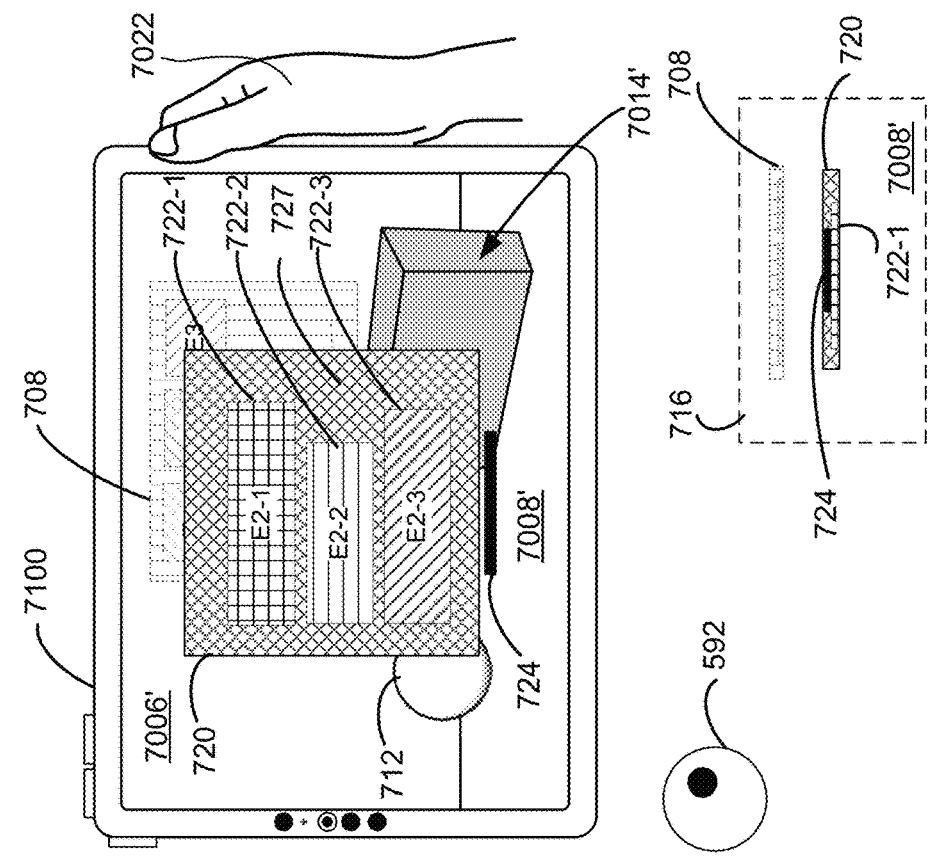
Figure 7U:
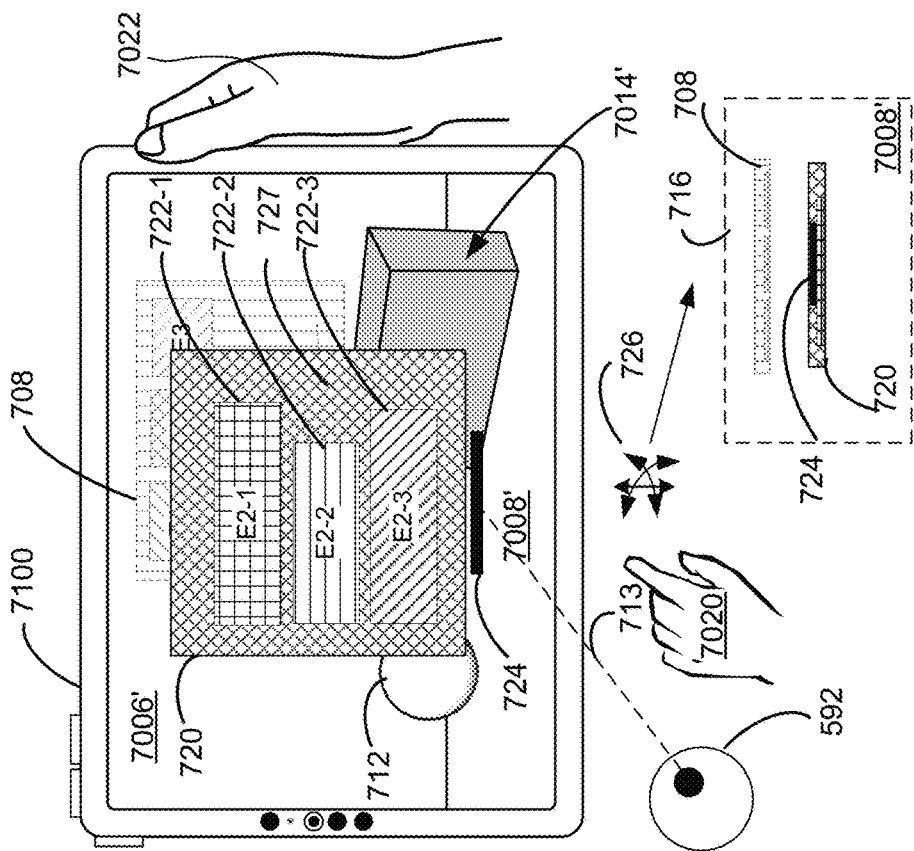

In FIG. 7S, after the second user interface object 720 is displayed in response to the first user input, e.g., while the second user interface object 720 is displayed at the second position that is the first distance away from the first viewpoint and the first user interface object 708 is displayed at the third position that is more than the first distance away from the first viewpoint, the computer system detects that the user's attention is directed to the first user interface object 708. In some embodiments, detecting the user's attention being directed to the first user interface object 708 includes detecting a gaze input 709 directed to least a portion of the first user interface object (e.g., a portion of the first user interface object that is still visible in the first view and/or not blocked by the presence of the second user interface object or other objects in the three-dimensional environment). In some embodiments, in response to detecting that the user's attention is directed back to the first user interface object 708, the computer system restores the visual prominence of the first user interface object 708 to a level comparable to its previous level at the first position, and/or to that of the second user interface object 720. For example, in some embodiments, the computer system restores the luminance level, clarity, and/or opacity of the first user interface object 708 if the first user interface object 708 had been darkened, blurred, and/or made more translucent in response to the first user input. In some embodiments, the computer system keeps the first user interface object 708 at the third position and the second user interface object 720 at the second position, and reduces the visual prominence of the second user interface object 720 by darkening the second user interface object, blurring the second user interface object, and/or making the second user interface object more translucent. In some embodiments, the computer system makes the second user interface object 720 transparent, optionally, leaving an outline or some indication of its presence in the first view, so that the first user interface object can be seen more clearly as the user's attention is directed to the first user interface object 708. As shown in FIG. 7S, in some embodiments, the first user interface object 708 and the second user interface object 720 maintain their respective distances from the first viewpoint, as the user's attention moves from the second user interface object 720 to the first user interface object 708, and vice versa. In some embodiments, the computer system brings the first user interface object 708 back to the first position and/or to a position that is the first distance away from the first viewpoint, when the user's attention is directed to the first user interface object 708. In some embodiments, the computer system optionally moves the second user interface object 720 temporarily out of the way (e.g., to the side, or behind the first user interface object), when the user's attention is directed to the first user interface object 708, so that the first user interface object 708 is no longer visually obscured by the second user interface object 720. In some embodiments, without an explicit input to move input focus back to the first user interface object 708, the computer system does not pass any input to the first user interface object 708, and the first user interface object 708 is displayed for viewing only. For example, if the user needed to see the information in the first user interface object 708 again before providing input to the second user interface object 720, the user may look at the unobscured portion of the first user interface object 708 to bring its entire content back into view at the first or the third position. In some embodiments, the computer system detects a required user input (e.g., an air tap gesture, a pinch gesture, or another predetermined gesture) while the gaze input 709 is maintained on the first user interface object 708; and in response, the computer system returns input focus to the first user interface object 708, and, optionally, dismisses the second user interface object 720 from the three-dimensional environment. In some embodiments, the computer system returns the first user interface object 708 back to the first position that is the first distance away from the first viewpoint or to another position that is the first distance away from the current viewpoint (e.g., if the viewpoint has moved in the meantime). For example, in response to detecting the user's gaze on the first user interface object 708 and detecting a pinch gesture at substantially the same time, the computer system ceases to display the second user interface object 720 and brings the first user interface object 708 toward the first viewpoint to the first position again. In some embodiments, if the computer system merely detects the gaze input being moved to the first user interface object 708 or other portions of the three-dimensional environment, the computer system does not dismiss the second user interface object 720 from the three-dimensional environment.

Figure 7T:
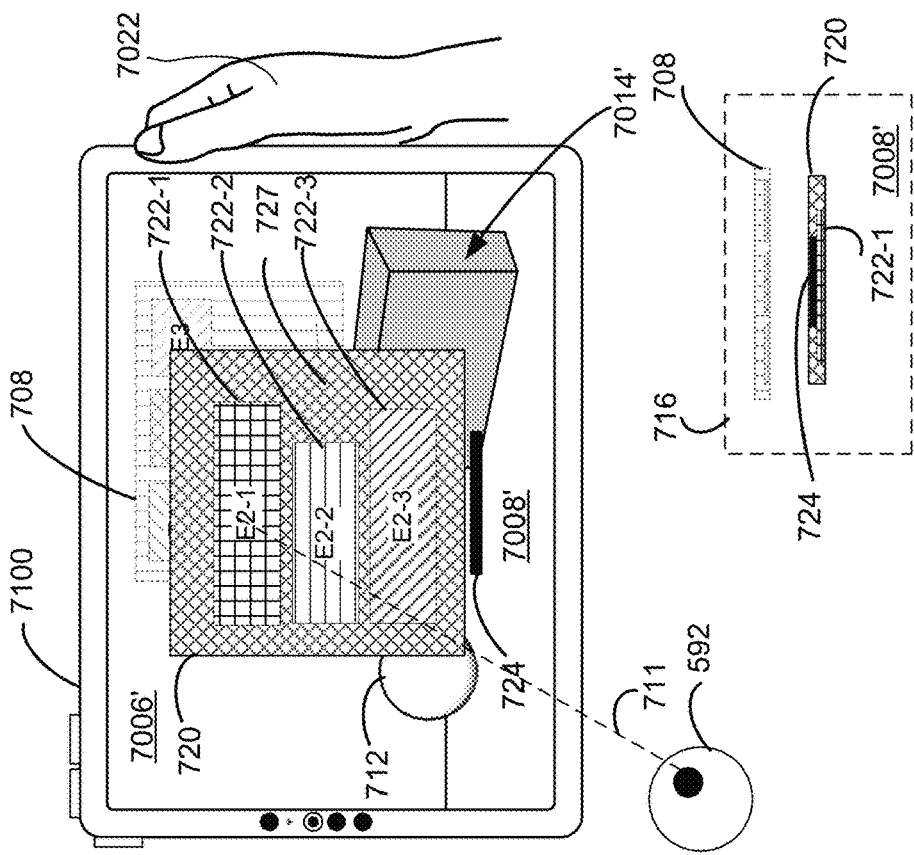

In FIG. 7T, after detecting the user's attention being directed to the first user interface object 708 (and, not having detected the required gesture input to return input focus back to the first user interface object 708), the computer system detects that the user's attention is turned away from the first user interface object 708 and back to the second user interface object 720. For example, the computer system detects a gaze input 711 directed to at least a portion of the second user interface object 720 (e.g., at a position of the user interface element 722-1, at the position of another user interface element within the second user interface object 720, or at a background portion of the second user interface object 720), and in response, the computer system increases the visual prominence of the second user interface object 720 if it had been reduced before the detection of the gaze input on the second user interface object 720, and/or decreases the visual prominence of the first user interface object 708 if it had been increased before the detection of the gaze input 711 on the second user interface object 720. As shown in FIG. 7T, in some embodiments, detecting the user's attention being redirected to the second user interface object 720 includes detecting a gaze input 711 directed to least a portion of the second user interface object 720 (e.g., a portion of the second user interface object that is still visible in the first view and/or not blocked by the presence of the first user interface object or other objects in the three-dimensional environment). In some embodiments, in response to detecting that the user's attention is directed back to the second user interface object 720, the computer system restores the visual prominence of the second user interface object to a level comparable to its previous level at the first position. For example, in some embodiments, the computer system restores the luminance level, clarity, and/or opacity of the second user interface object 720 if the second user interface object 720 had been darkened, blurred, and/or made more translucent when it lost the user's attention to the first user interface object 708 earlier. In some embodiments, the computer system also restores the second user interface object 720 back to the first position if it had been shifted away from the first position when it lost the user's attention to the first user interface object 708 earlier. In some embodiments, the computer system pushes the first user interface object 708 back to the third position, if the first user interface object 708 had been brought to the first position when the first user interface object 708 had the user's attention. In some embodiments, the computer system reduces the visual prominence of the first user interface object 708 by darkening the first user interface object 708, blurring the first user interface object 708, and/or making the first user interface object 708 more translucent again. In some embodiments, the computer system makes the first user interface object 708 transparent, optionally, leaving an outline or some indication of its presence in the first view, so that the second user interface object 720 can be seen with less distraction as the user's attention is on the second user interface object 720. As shown in FIG. 7T, in some embodiments, the first user interface object 708 and the second user interface object 720 maintain their respective distances from the first viewpoint, as the user's attention moves from the first user interface object 708 to the second user interface object 720, and vice versa.

In some embodiments, without an explicit input to move input focus back to the first user interface object 708, the computer system does not pass any input to the first user interface object 708, as a result, when the user's attention is shifted back to the second user interface object 720, the second user interface object 720 already has input focus and will respond to user's inputs (e.g., gesture inputs, voice commands, and/or input from other input devices) right away. For example, if the user needed to see the information in the first user interface object 708 again before providing input to the second user interface object 720, the user may look at the unobscured portion of the first user interface object 708 to bring its entire content back into view at the first or the third position, and then look back at the second user interface object 720 to provide the input to the second user interface object 720 (e.g., filling in some textual information, making a selection, adjusting a control, navigating to another user interface object, and/or dismissing the second user interface object). In some embodiments, the computer system may switch the visual prominence between the first user interface object 708 and second user interface object 720 back and forth multiple times in response to the user's gaze moving back and forth between the first user interface object 708 and the second user interface object 720. In some embodiments, the computer system keeps the input focus on the second user interface object 720 while switching the visual prominence back and forth between the first user interface object 708 and second user interface object 720, unless an explicit gesture input (e.g., a pinch gesture in conjunction with a gaze input directed to the first user interface object 708) is used to dismiss the second user interface object 720 and/or to return the input focus back to the first user interface object 708.

In some embodiments, the computer system dismisses the second user interface object 720 in response to detecting a predetermined dismissal gesture while the user's gaze is directed to the second user interface object 720. In some embodiments, the predetermined dismissal gesture is a drag and release gesture (e.g., thumb and index fingers making contact, followed by movement of the hand without breaking the contact between the thumb and index fingers, followed by breaking of the contact after a threshold amount of movement has been made by the hand in a predetermined direction (e.g., downward, or another predetermined direction)). In some embodiments, the second user interface object 720 is displayed with a corresponding closing affordance, which, when selected (e.g., by a gaze input in conjunction with a pinch gesture, or by another type of selection input), causes the computer system to cease to display the second user interface object 720. In some embodiments, in conjunction with dismissing the second user interface object 720, the computer system also moves the first user interface object 708 back to the first position or to another position that is the first distance away from the current viewpoint (if the viewpoint had moved in the meantime), and restores the visual prominence of the first user interface object 708 (e.g., increases luminance, clarity, and/or opacity of the first user interface object 708 if the first user interface object 708 had been dimmed, blurred, and/or made translucent due to displayed of the second user interface object 720).

In FIG. 7U, while the computer system concurrently displays the first user interface object 708 and the second user interface object 720, e.g., while the second user interface object 720 is displayed at the first position and has the input focus, the computer system detects a second user input directed to the grabber 724 of the second user interface object 720. In some embodiments, detecting the second user input includes detecting a gaze input 713 directed to a position of the grabber 724 in conjunction with detecting a pinch and drag gesture. In some embodiments, the computer system moves the grabber 724 and the second user interface object 720 (e.g., while maintaining a spatial relationship between the grabber 724 and the second user interface object 720) in accordance with the movement of the hand 7020 during the drag gesture, while the hand maintains its pinching posture. In some embodiments, the movement of the pinch and drag gesture is optionally a translational movement in any direction in the three-dimensional environment. In some embodiments, the movement of the grabber 724 and the second user interface object 720 is a translational movement in any direction in the three-dimensional environment that corresponds to the movement of the pinch and drag gesture. In some embodiments, the movement of the grabber 724 and the second user interface object 720 causes the first user interface object 708 to be moved with the second user interface object 720, such that a spatial relationship between the first user interface object 708 and the second user interface object 720 is maintained during the movement of the grabber 724 and the second user interface object 720 in accordance with the movement of the pinch and drag gesture, as shown in FIGS. 7U-7V. In some embodiments, the movement of the grabber 724 and the second user interface object 720 does not cause the movement of the first user interface object 708, and the first user interface object 708 is optionally maintained at the second position in the three-dimensional environment.

In some embodiments, as shown in FIG. 7V, the computer system detects user inputs respectively directed to user interface elements 722-1, 722-2, and/or 722-3, and performs respective operations corresponding to the user interface elements. For example, in response to detecting a gaze input 715-1 directed to user interface element 722-1 in the second user interface object 720, in conjunction with detecting a predetermined gesture (e.g., a pinch gesture, a tap gesture, or another predetermined gesture), the computer system performs an operation corresponding to the user interface element 722-1. In some embodiments, the operation corresponding to the user interface element 722-1 includes opening a window, launching an application, displaying a dialogue box, selecting a value for a control, activating or deactivating a device control (e.g., flashlight, WiFi receiver, media player and/or Bluetooth), and/or activating or deactivating a preconfigured setting or mode (e.g., Do Not Disturb, airplane mode, quiet mode, locked mode, and/or private mode). In another example, in response to detecting a gaze input 715-2 directed to user interface element 722-2 in the second user interface object 720, in conjunction with detecting another predetermined gesture (e.g., a pinch and drag gesture, a twisting gesture, or another predetermined gesture), the computer system performs another operation corresponding to the user interface element 722-2. In some embodiments, the operation corresponding to the user interface element 722-2 includes adjusting a value of a control (e.g., volume, brightness, color gradient, opacity, sizes, and/or temperature), changing a setting, scrubbing through a slider control (e.g., scrubber for media playback, and/or playlist), scrolling through a list or pages, and/or gradually changing levels of immersion.

Figure 7W:
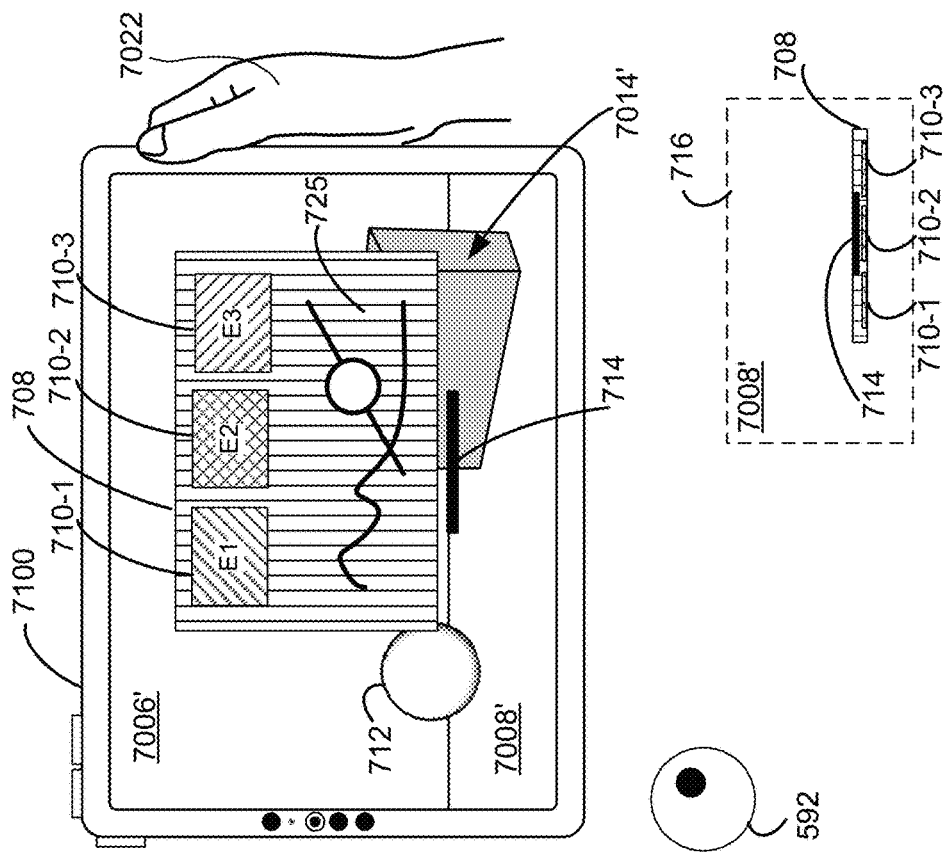
Figure 7V:
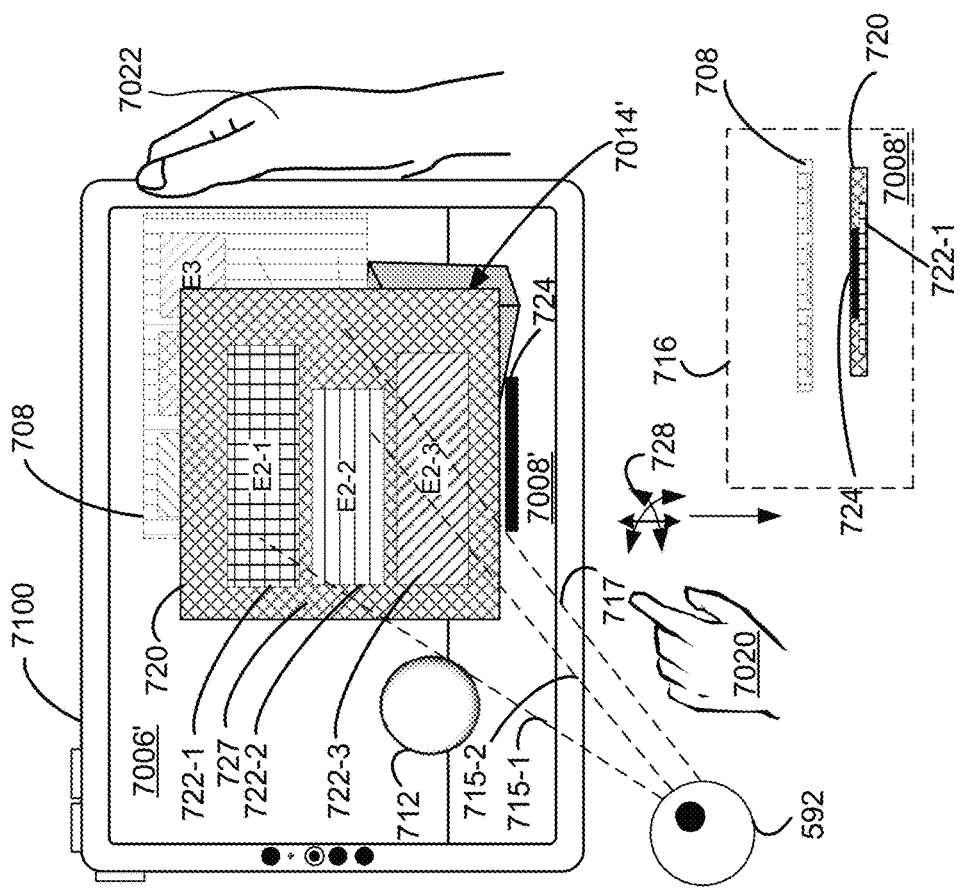

In some embodiments, as shown in FIG. 7V-7W, the computer system detects a gaze input 717 directed to the second user interface object 720 in conjunction with detecting a predetermined dismissal gesture (e.g., a gesture 728, a pinch and drag gesture in the downward direction, or a pinch and flick gesture (e.g., breaking contact between thumb and index finger while flicking the wrist)) (e.g., as shown in FIG. 7V), and in response, the computer system ceases to display the second user interface object 720 in the three-dimensional environment and redisplays the first user interface object 708 at the position of the second user interface object 720 (e.g., at the first distance away from the current viewpoint) (e.g., as shown in FIG. 7W). In some embodiments, if the second user interface object 720 has not been moved since it was initially displayed at the first position, the computer system restores the first user interface object 708 back to the first position after the second user interface object 720 is dismissed.

In some embodiments, when the second user interface object 720 is dismissed, the grabber 724 shifts upward to below the bottom edge of the first user interface object 708 and becomes the grabber 714 of the first user interface object 708 (as shown in FIG. 7W). For example, the grabber 724 in FIG. 7V and the grabber 714 in FIG. 7W are the same distance away from the current viewpoint of the user. The computer system will move the grabber 714 and the first user interface object 708 in the three-dimensional environment in accordance with a user input in an analogous manner as described with respect to the grabber 724 and the second user interface object 720 in FIGS. 7U-7V.

In some embodiments, when navigating from the first user interface object 708 to a third user interface object that is smaller than the first user interface object 708 in the vertical direction (e.g., the direction of gravity, or the downward direction as defined by the user's posture or the orientation of the display generation component), the position of the grabber 714 will remain unchanged when the third user interface object is displayed at the first position. For example, in response to detecting selection of the user interface element 710-2, the computer system displays a third user interface object at the first position (e.g., the position of the first user interface object 708 in FIG. 7P) or the current position of the first user interface object 708 (e.g., the position of the first user interface object 708 in FIG. 7W), while pushing the first user interface object 708 to a position that is farther away from the current viewpoint. In addition, in accordance with a determination that the third user interface object has a smaller spatial extent than the first user interface object 708 in the vertical direction, the computer system maintains the grabber 714 at its current position, and the grabber 714 becomes the handle for the third user interface object and the computer system moves the third user interface object in response to a pinch and drag input directed to the grabber 714.

FIGS. 7X-7AE are block diagrams that illustrate displaying a virtual object in association with an object in a three-dimensional environment while updating a view of the three-dimensional environment in accordance with movement of a viewpoint of a user, in accordance with some embodiments. In FIGS. 7X-7AE, a user interface object, such as a modal window, a control panel, an alert, a notification, or an status window, is placed on a smooth surface enclosing the object (e.g., a physical object, or a virtual object) to which the user interface object corresponds, and when a user changes his/her position relative to the object, the user interface object is shifted and turned based on the smooth surface and the viewing perspective of the user. The smooth surface that encloses the object, e.g., fully or partially, is optionally, not visually displayed in the view of the three-dimensional environment, but its spatial characteristics (e.g., curvature, shape, size, and/or position) are used to determine the potential positions and orientations of the user interface object that is displayed in association with the object, in accordance with some embodiments.

In FIG. 7X, the computer system displays a first view of a three-dimensional environment (e.g., an augmented reality view that includes a representation of a physical environment 7000, or a virtual three-dimensional environment). In this example, the first view of the three-dimensional environment includes a representation 7006' of wall 7006, a representation 7008' of the floor 7008, and a representation 7014' of a physical object 7014. In the first view of the three-dimensional environment, an object 732 is visible at a first position in the three-dimensional environment. In some embodiments, the object 732 is a virtual object, such as a virtual three-dimensional object, such as a virtual ball, a virtual sculpture, or a virtual landmark. In some embodiments, the object 732 is a user interface object, such as a window, a control panel, a user interface of an application, a document, a media player window, and/or window of a communication session, or any of the user interface objects (e.g., user interface object 702, 705, or other user interface objects) described with respect to FIGS. 7A-7W. In some embodiments, the object 732 is a representation of a physical object, such as a home control device, an appliance, a media player device, an electronic device, a person, a sculpture, a piece of furniture, an animal, and/or a piece of artwork. In some embodiments, the representation of the physical object is a portion of a camera feed that corresponds to the physical object in the physical environment. In some embodiments, the representation of the physical object is the physical object as viewed through a transparent or semi-transparent portion of the display generation component 7100. It is to be understood that the above examples of the object 732 are merely illustrative and do not constitute an exhaustive and complete listing of objects that the object 732 may represent, in accordance with various embodiments.

In FIG. 7X, the computer system detects an event that corresponds to the object 732; and in response, the computer system displays a second object 740 that corresponds to the event and/or the first object 732. In some embodiments, the second object 740 is a user interface object, such as a window including one or more interactive user interface elements (e.g., buttons, sliders, dials, selection boxes, selectable options, and/or input fields) and/or information related to the event and/or the second object (e.g., media content, text, status indicators, and/or graphics) and/or any of the user interface objects (e.g., user interface object 702, 704-1, 704-3, 704-5, and 705) described with respect to FIGS. 7A-7W. In some embodiments, the first event is the arrival of a notification or alert, the generation of a system request, the arrival of a communication request, a change in system state, and/or satisfaction of a preset condition associated with the first object. In some embodiments, detecting the first event includes detecting a predetermined user input directed to the first object 732, such as detecting a gaze input 721 directed to the first object 732 in conjunction with detecting a gesture 730 (e.g., a pinch gesture, a tap gesture, or another predetermined gesture).

In some embodiments, as shown in FIG. 7X, the first object 732 has a respective position and a respective orientation in the three-dimensional environment, which is anchored to the physical environment or to three-dimensional environment. For example, as the user moves in the physical environment, the viewpoint of the user changes relative to the representation of the physical environment and to first object 732 in the three-dimensional environment, while the spatial relationship between the first object 732 and the representation of the physical environment remains unchanged.

Figure 7Y:
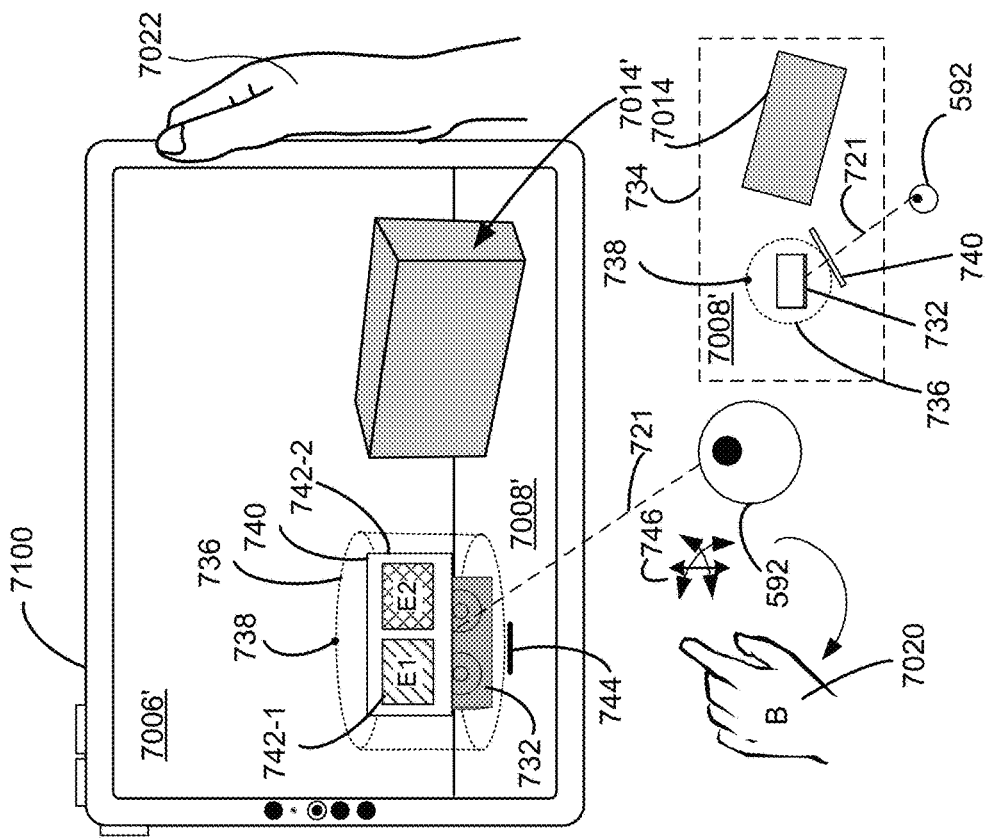
Figure 7X:
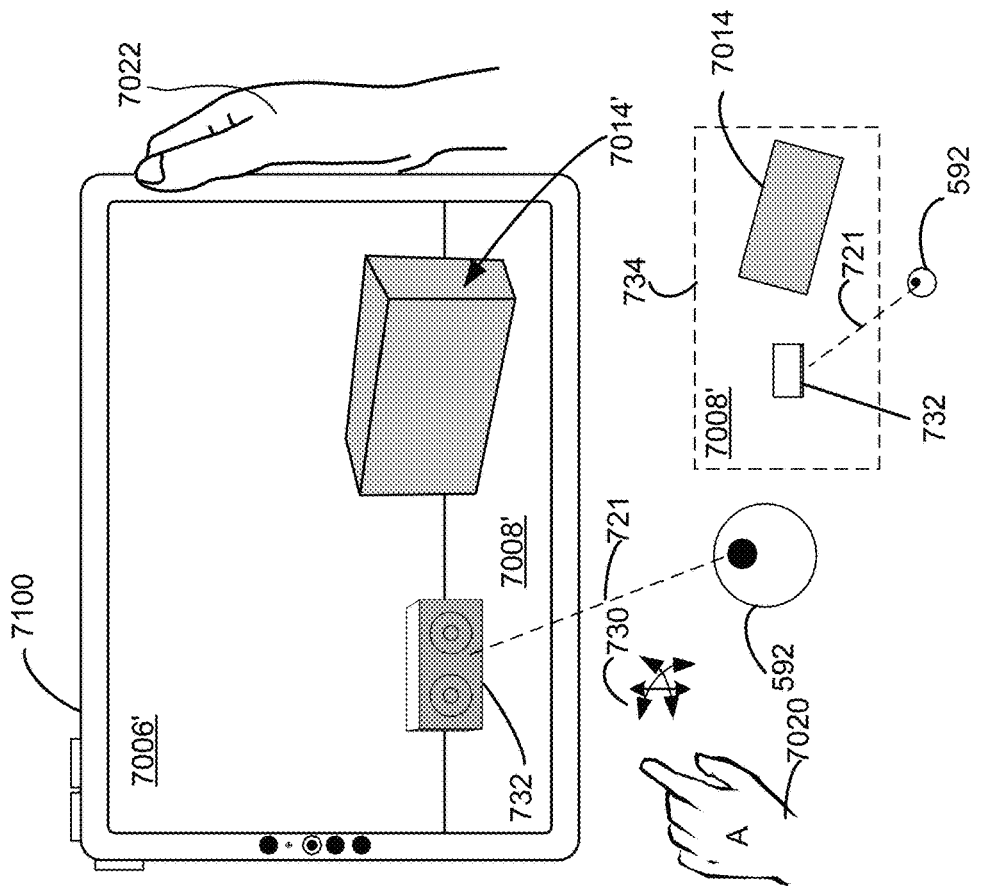
Figure 7A:
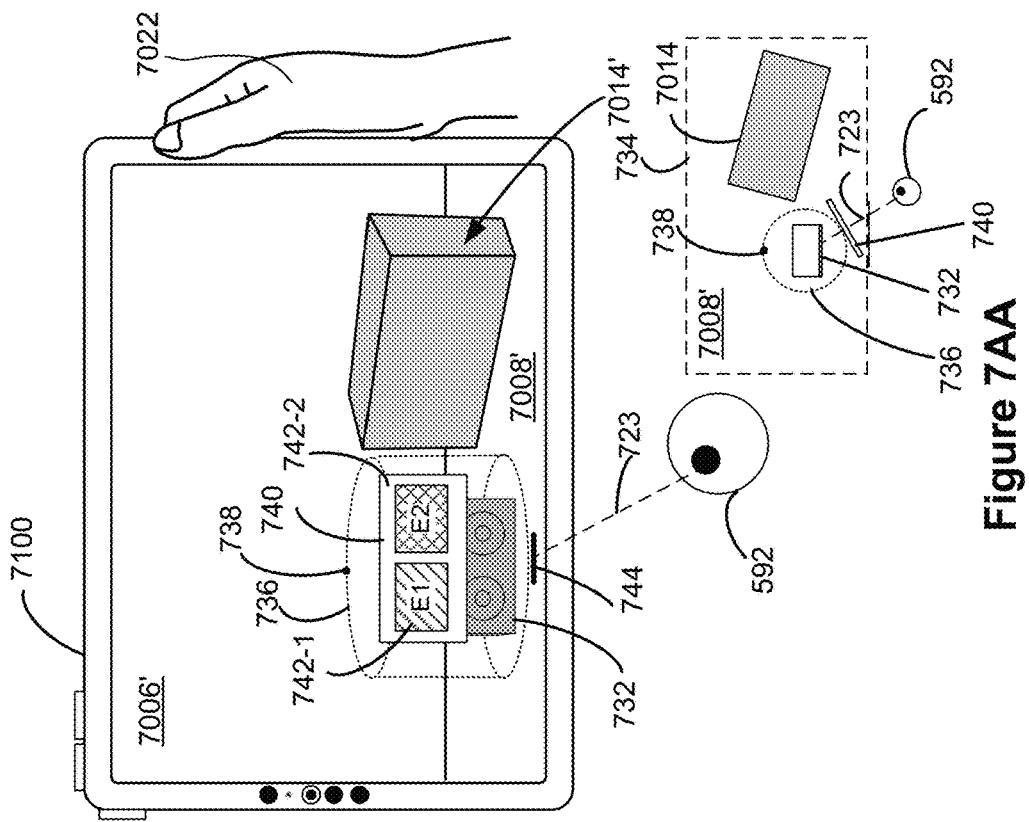

In FIG. 7Y, in response to detecting the first event that corresponds to the first object 732, the computer system displays a second object 740 that corresponds to the first object 732. In some embodiments, the second object is a window that includes one or more interactive user interface elements (e.g., buttons, icons, controls, input fields, drop-down menus, and/or selectable options) (e.g., user interface elements 742-1 and 742-2, and/or other user interface elements) and/or content (e.g., indicators, status information, graphics, movie, video, visual effects, wallpaper, and/or images). In some embodiments, the second object 740 is a modal window that requires the user attention or input of information before the second object can be dismissed from the three-dimensional environment (e.g., such as the second user interface object 720 described with respect to FIGS. 7P-7W). In some embodiments, the first object 732 is a smart home appliance and the second object 740 provides a control panel user interface that includes controls to adjust one or more device functions controlled by the smart home appliance (e.g., lights, locks, cameras, speaker, thermostat, and/or media players). In some embodiments, the first object 732 is a digital assistant hub and the second object 740 provides an interaction interface that provides information and interactive options in response to the user's gesture and/or voice requests. In some embodiments, the first object 732 is an application icon or a window of an application, and the second object 740 is a user interface or modal window of the application corresponding to the application icon. In some embodiments, the first object 732 is an application window, and the second object 740 is an alert generated by the application corresponding to the application window. In some embodiments, the first object 732 is an application window, and the second object 740 is a system alert generated by the computer system, irrespective of which application provided the application window.

As shown in FIG. 7Y, the second object 740 is displayed at a first position with a first orientation in the three-dimensional environment, where the second object displayed at the first position with the first orientation faces toward the first viewpoint that corresponds to the first view of the three-dimensional environment. In some embodiments, the first position and first orientation of the second object 740 are consistent with placement of the second object 740 on a curved surface that surrounds at least a portion of the first object 732 in the three-dimensional environment. In this illustrative example, the curved surface is a cylindrical surface that encloses the first object 732. For example, as shown in inset 734 in FIG. 7Y, the top view of the three-dimensional environment shows the cylindrical surface (dashed circle 736) enclosing the rectangular shape of the first object 732. In some embodiments, the curved surface is a cylindrical surface with a circular base. In some embodiments, the curved surface is a cylindrical surface with an elliptical base. In some embodiments, the curved surface does not fully enclose the first object 732 and may be open on one side, such as the case with a hyperbolic surface or a parabolic surface partially enclosing the first object 732. In some embodiments, the curved surface is a spherical or ellipsoidal surface enclosing at least a portion of the first object 732. In some embodiments, the second object 740 is positioned on the curved surface at the first position and oriented to be tangential to the curved surface and facing toward the first viewpoint of the user. In some embodiments, the curved surface is continuous and convex (e.g., curved away from the first object).

In some embodiments, in accordance with a determination that the second object 740 is larger than the first object 732, the computer system aligns the bottom edge of the second object 740 with the bottom edge of the first object 732 when displaying the second object 740; and in accordance with a determination that the second object 740 is smaller than the first object 732, the computer system aligns the center of the second object 740 with the center of the first object 732 when displaying the second object 740.

Figure 7Z:
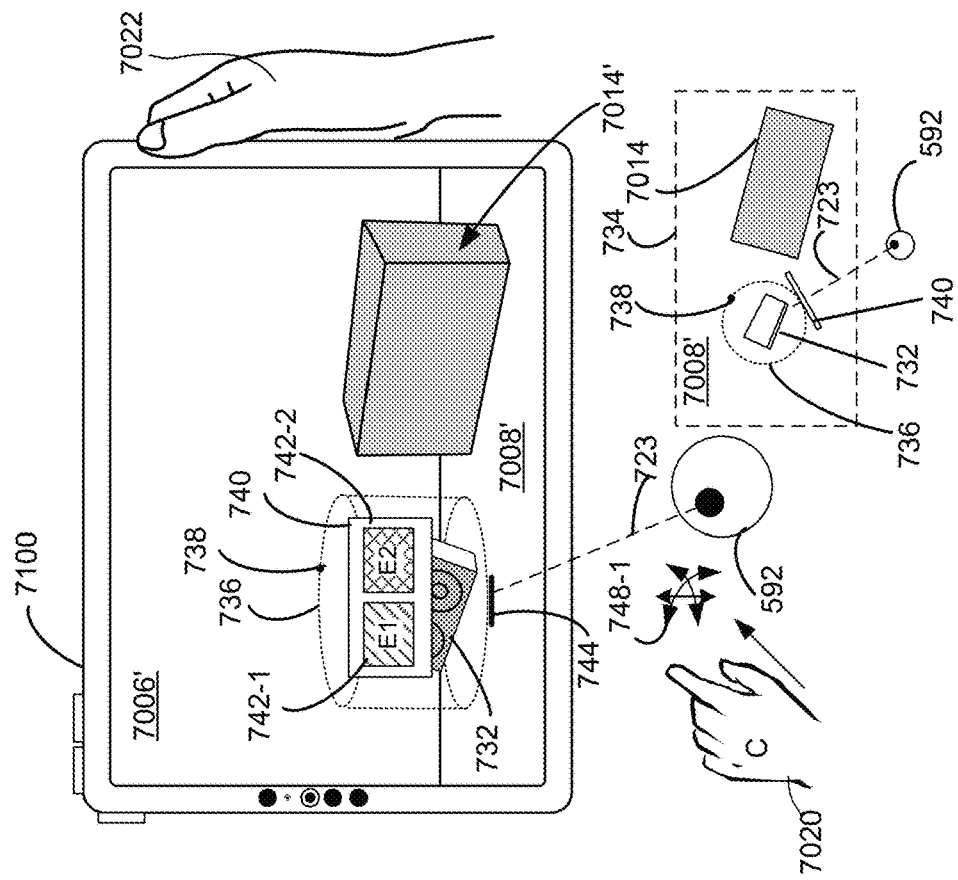
Figure 7A:
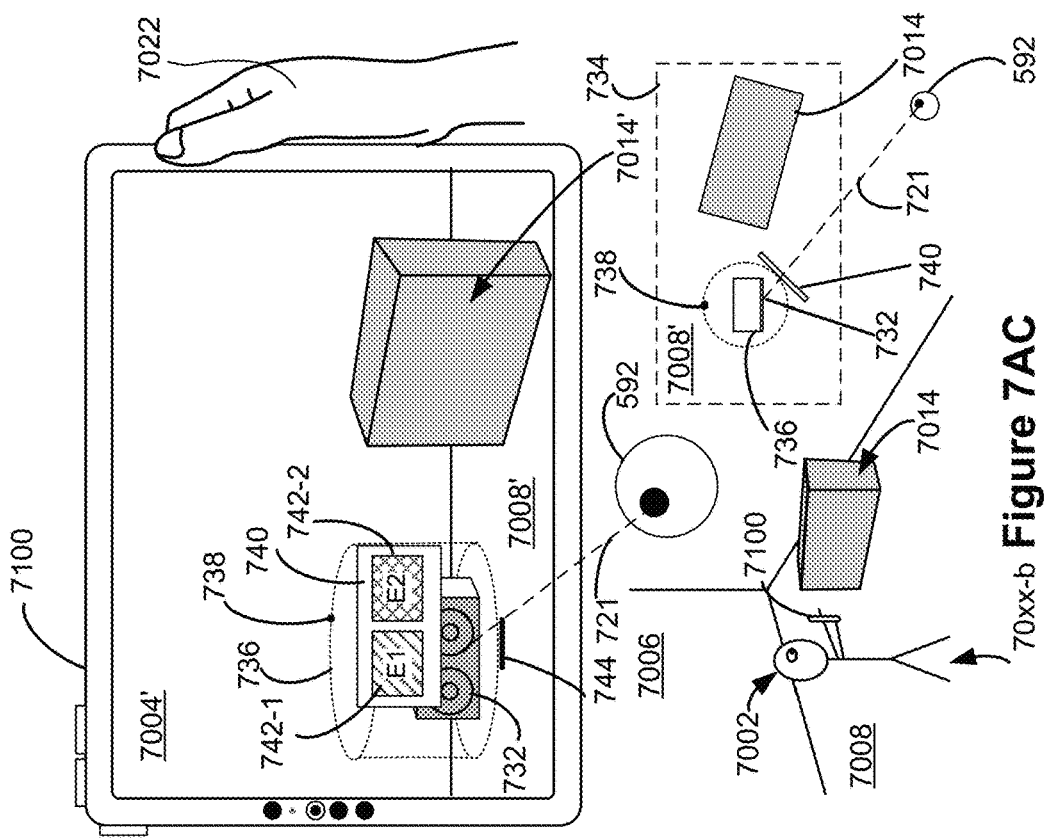
Figure 7A:
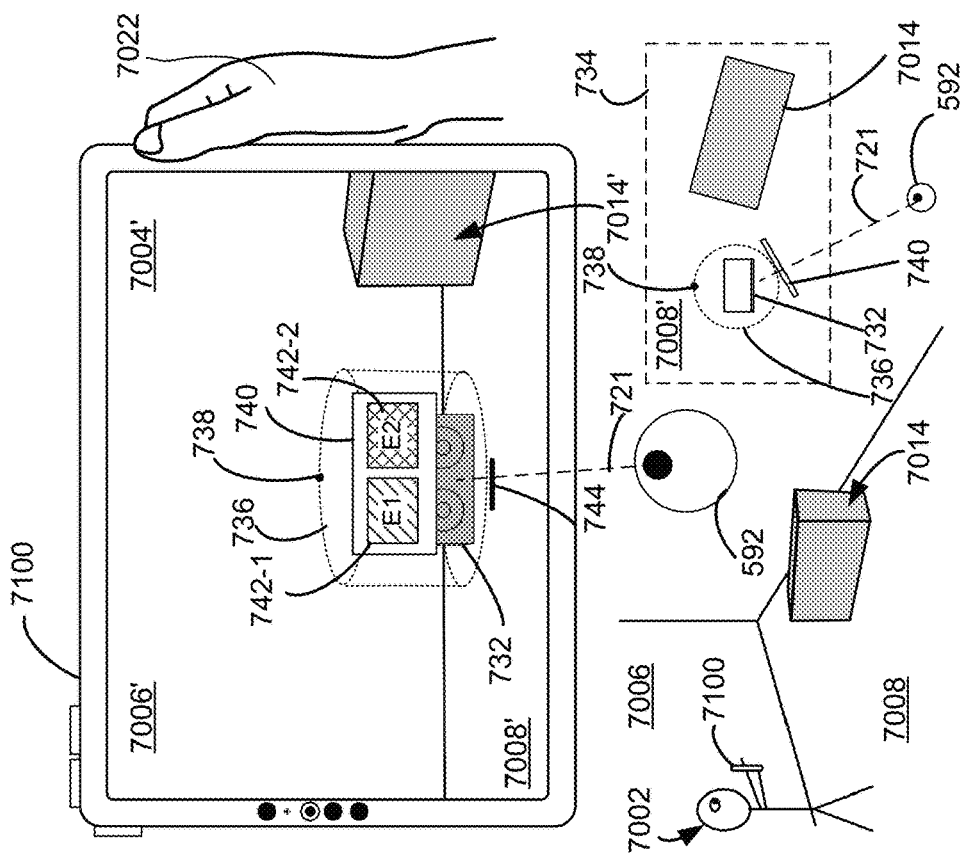
Figure 7A:
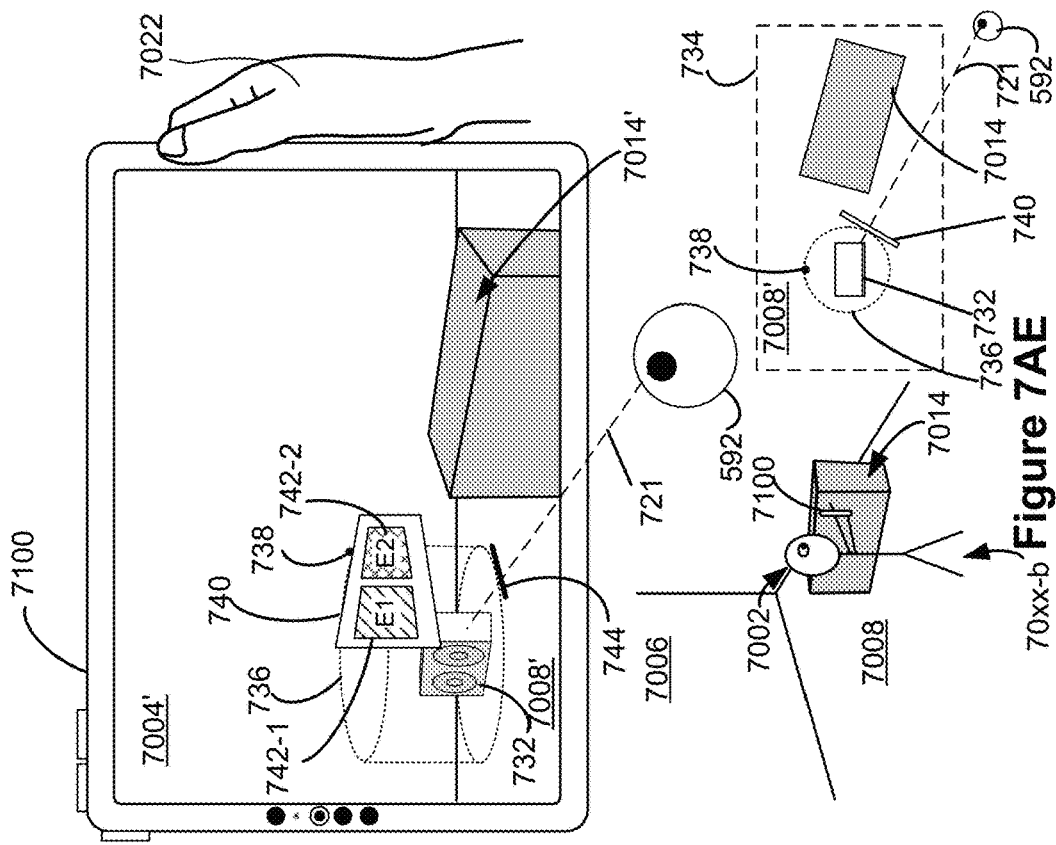
Figure 7A:
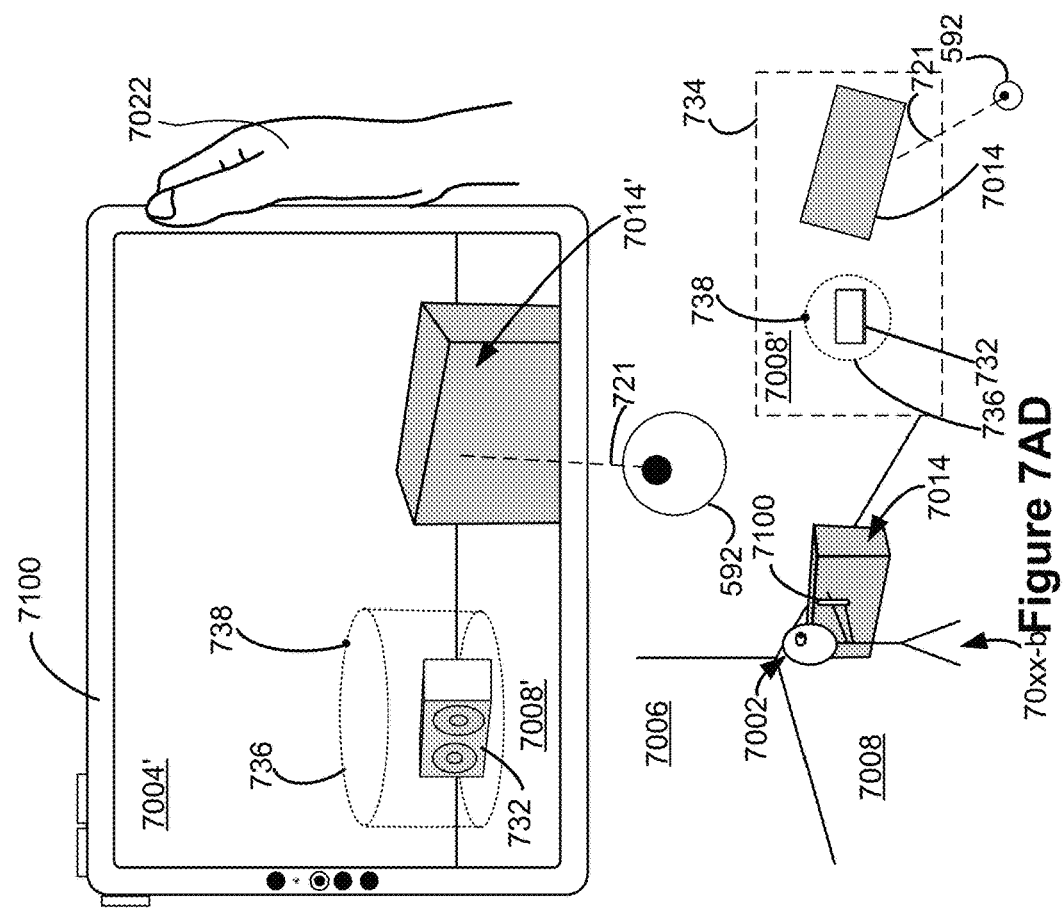

In some embodiments, the second object 740 is world locked to the three-dimensional environment, in particular to the curved surface and the first object 732. In some embodiments, when the first object 732 is moved in the three-dimensional environment, the curved surface moves in accordance with the movement of the first object 732, and as a result, the second object 740 moves with the curved surface and the first object 732 in the three-dimensional environment. In some embodiments, the computer system determines the new position and orientation of the second object 740 based on the new position and orientation of the curved surface relative to the current viewpoint. In some embodiments, only some of the movement of the first object 732 would cause changes to the position and orientation of the curved surface. As shown in FIG. 7Y, while displaying the first object 732 and displaying the second object 740 on the curved surface surrounding the first object 732, the computer system detects a user input (e.g., a gaze input 721 directed to the first object 732 in conjunction with a gesture input 746, or another type of user input) that corresponds to a request to rotate the first object 732 in the three-dimensional environment. In response to detecting the user input, the computer system rotates the first object 732 (e.g., lifting the left side of the first object 732 above the horizontal plane, tilting the first object 732 backward, and/or turns the first object 732 leftward by forty-five degrees) in the three-dimensional environment, as shown in FIG. 7Z. As a result of the manipulation of the first object 732, the curved surface surrounding the first object 732 is also re-oriented (e.g., as indicated by the movement of a fixed point 738 on the top edge of the curved surface 736 shown in FIGS. 7Y and 7Z).

In accordance with the rotation of the first object 732 and the rotation of the curved surface, the computer system also repositions the second object 740 on the curved surface and reorients the second object 740 such that the second object 740 continues to face toward the first viewpoint of the user. In FIG. 7Z, the second object 740 is placed at a second position and has a second orientation, where the second position and second orientation of the second object 740 are consistent with placement of the second object 740 on the curved surface 736. As shown in the inset 734 in FIG. 7Z, the position and orientation of the second object 740 have changed relative to the position and orientation of the second object 740 shown in FIG. 7Y, as a result of the movement of the first object 732 and, optionally, the movement of the curved surface 736 surrounding the first object 732.

In FIG. 7Z, while displaying the first object 732, and displaying the second object 740 on the curved surface surrounding the first object, the computer system detects a user input (e.g., a gesture input 748-1 detected in conjunction with a gaze input 721 directed to the first object 732 and/or a gaze input 723 directed to the grabber 744, or another type of user input) that corresponds to a request to translate and/or rotate the first object in the three-dimensional environment. In response to detecting the user input, the computer system translates and/or rotates the first object 732 (e.g., moving the first object 732 toward the user's viewpoint, dropping the left side of the first object 732 on the horizontal plane, tilting the first object 732 forward, and turns the first object 732 right by forty-five degrees) in the three-dimensional environment. As a result of the manipulation of the first object 732, the curved surface surrounding the first object 732 is also re-oriented (e.g., as indicated by the movement of a fixed point 738 on the top edge of the curved surface 736 shown in FIGS. 7Z and 7AA).

In accordance with the translation and rotation of the first object 732 and the translation and rotation of the curved surface 736, the computer system also repositions the second object 740 on the curved surface 736 and reorients the second object 740 such that the second object 740 continues to face toward the first viewpoint of the user. In FIG. 7AA, the second object 740 is placed at a third position and has a third orientation, where the third position and third orientation of the second object 740 are consistent with placement of the second object 740 on the curved surface 736. As shown in the inset 734 in FIG. 7AA, the position and orientation of the second object 740 have changed relative to the position and orientation of the second object 740 in FIG. 7Y and the position and orientation of the second object 740 in FIG. 7Z, as a result of the movement of the first object 732 and the movement of the curved surface 736 surrounding the first object 732.

In FIGS. 7AB-7AC, the computer system detects that the current viewpoint of the user has moved (e.g., changed from the first viewpoint in FIGS. 7X-7AA to a second viewpoint in FIG. 7AB, and then to a third viewpoint in FIG. 7AC) in the three-dimensional environment (e.g., as the user moves in the physical environment, and/or as the display generation component moves in the physical environment). In this example, in FIG. 7AB, the current viewpoint of the user has moved farther away from the first object 732, and in FIG. 7AC, the current viewpoint of the user has rotated around the first object 732 (e.g., in the counterclockwise direction as viewed from above). In FIG. 7AB, as the viewpoint of the user moves in the three-dimensional environment, the computer system changes the position and orientation of the second object 740, the position and orientation of the second object 740 continue to remain on the curved surface 736, and the second object 740 continues to face toward the current viewpoint of the user. Similarly, in FIG. 7AC, as the viewpoint of the user moves in the three-dimensional environment, the computer system changes the position and orientation of the second object 740, the position and orientation of the second object 740 continue to remain on the curved surface 736, and the second object 740 continues to face toward the current viewpoint of the user. In contrast to the second object 740, the first object 732 maintains its original position and orientation in the three-dimensional environment, and the view of the first object 732 changes (e.g., between that shown in FIGS. 7AA, 7AB, and 7AC) as the viewpoint of the user changes. In some embodiments, the movement and reorientation of the second object 740 is continuous and smooth based on the continuous and smooth curvature of the curved surface 736.

In some embodiments, as shown in FIG. 7AD, the computer system detects that the user's gaze shifted outside of the region of the first object 732 (outside of the range of the curved surface for at least a threshold amount of time without returning to the range), and/or onto another region or object different from the first object 732 (e.g., physical object 7014, and/or another object or region in the three-dimensional environment); and in response, the computer system ceases to display the second object 740 or reduces the visual prominence of the second object 740 (e.g., dims, darkens, blurs, and/or making the second object more translucent) in the view of the three-dimensional environment. As shown in FIG. 7AD, after the current viewpoint of the user has moved further, the user's gaze (e.g., gaze input 731) is shifted to the physical object 7014' in the three-dimensional environment, and the view of the first object 732 is changed based on the movement of the viewpoint, and the second object 740 ceases to be displayed in the current view of the three-dimensional environment. It is to be noted that, at this time, the second object 740 has not been dismissed from the three-dimensional environment because the user's input for clearing the second object 740 has not been detected. In some embodiments, an indicator of the existence of the second object 740 in the three-dimensional environment is displayed (e.g., in the top center region of the user's field of view, or another region of the user's field of view). In FIG. 7AE, the computer system detects that the user's gaze (e.g., gaze input 733) is shifted back into the region of the first object 732; and the computer system redisplays the second object 740 at a fourth position with a fourth orientation, where the second object 740 displayed at the fourth position and the fourth orientation is consistent with placement of the second object 740 on the curved surface 736 with an orientation facing toward the current viewpoint of the user. As shown in FIG. 7AE, the relative position of the second object 740 and the fixed point 738 on the top edge of the curved surface 736 indicates that the second object 740 has been moved on the curved surface 736 to a different position as compared to those shown in FIGS. 7Y, 7Z, 7AA, 7AB, and 7AC, and continues to face toward the current viewpoint of the user which has been moved to a different position as compared to those shown in FIGS. 7Y, 7Z, 7AA, 7AB, and 7AC. In contrast to the second object 740, the first object 732 maintains its position and orientation in the three-dimensional environment, irrespective of the movement of the current viewpoint of the user, in accordance with some embodiments.

In some embodiments, in accordance with a determination that the first object 732 is two-dimensional content, e.g., a two-dimensional window, an application icon, a document window, a media window, and/or a control panel, and the computer system shifts the first object 732 away from the current viewpoint of the user when displaying the second user object 740 in response to the occurrence of the first event; and in accordance with a determination that the first object 732 is three-dimensional content, e.g., a three-dimensional virtual object, a three-dimensional shape, an object that has non-negligible depth in the direction away from the user, a representation of a three-dimensional physical object (e.g., a smart home appliance, a digital assistant device, an electronic device, and/or an physical artifact or other items of interest), the computer system does not shift the first object 732 away from the current viewpoint. In some embodiments, when the computer system shifts the first object 732 away from the viewpoint, the computer system, optionally, reduces the visual prominence of the first object 732. In some embodiments, more details on how the computer system shifts the first object 732 away from the viewpoint of the user and how the appearances of the first object 732 and the second object 740 change in response to user's interaction (e.g., interaction via gaze, gesture, and/or movement of the viewpoint) are disclosed in FIGS. 7P-7W and accompanying descriptions (e.g., the first object 732 is the first user interface object 708, and the second object 740 is the second user interface object 720 in the examples in FIGS. 7P-7W).

In some embodiments, the first object 732 is an object corresponding to an application (e.g., application icon, a window of an application, or a user interface of an application), and the second object 740 is displayed in the three-dimensional environment with a first spatial relationship to the first object 732 (e.g., aligned with the bottom of the first object and displayed in front of the first object; or aligned with the center of the first object and displayed above the first object) in response to detecting the first event. In some embodiments, the first object 732 is an object corresponding to a product or service (e.g., application icon, physical product, a kiosk, and/or a service station), and the second object 740 is a user interface of a payment application that enables payment for the product or service.

In some embodiments, the first object 732 is an object corresponding to a system-level function of the computer system (e.g., a system alert, an operating system user interface, or a notification, as opposed to an application icon, a window of an application, or a user interface of an application), and the second object 740 is displayed in the three-dimensional environment with a first spatial relationship to the current viewpoint (e.g., displayed in the middle of the field of view, and/or displayed in the upper left quadrant of the field of view) in response to detecting the first event. In some embodiments, the first object 732 is a smart home object or a representation of a control panel, and the second object 740 is a user interface of a control panel that includes a plurality of controls for adjusting a plurality of system-level functions of the computer system (e.g., WiFi, operating modes, volume, brightness, and so on).

In some embodiments, depending on a determination of whether the first object is an object corresponding to an application or an object corresponding to a system-level function, the computer system selectively displays the second object as world locked (e.g., to the first object 732 and/or the curved surface 736, as described earlier with respect to FIGS. 7X-7AD), or viewpoint locked to the current viewpoint of the user (e.g., able to move away from the first object and the curved surface, in accordance with the translational movement of the viewpoint, different from that described earlier with respect to FIGS. 7X-7AD). In some embodiments, when the second object 740 is displayed as world locked to the first object 732 and the curved surface 736, the position and orientation of the second object 740 is adjusted under the constraint of the curved surface 736 to face toward the current viewpoint of the user (e.g., as described with respect to FIGS. 7X-7AD).

In some embodiments, input gestures used in the various examples and embodiments described herein (e.g., with respect to FIGS. 7A-7AE, and FIGS. 8-12) include air gestures performed by movement of the user's finger(s) relative to other finger(s) or part(s) of the user's hand) for interacting with a virtual or mixed-reality environment, in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

Typically, in implementations in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's gaze to determine the target of the user input (e.g., for direct inputs, as described below). Thus, in implementations involving air gestures, the input gesture is, for example, a gaze toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's gaze on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein (e.g., with respect to FIGS. 7A-7AE, and FIGS. 8-12) include pinch inputs and tap inputs, for interacting with a virtual or mixed-reality environment, in accordance with some embodiments. For example, the pinch inputs and tap inputs described below are performed as air gestures.

In some embodiments, a pinch input is one or more of: a pinch gesture, a long pinch gesture, a pinch and drag gesture, or a double pinch gesture. For example, a pinch gesture includes movement of two or more fingers of a hand to make contact with one another, that is, optionally, followed by an immediate (e.g., within 0-1 seconds) break in contact from each other. A long pinch gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input is performed by the same hand (e.g., the user pinches two or more fingers to make contact with one another and moves the same hand to the second position with the drag gesture). In some embodiments, the pinch input is performed by a first hand of the user and the drag input is performed by the second hand of the user (e.g., the user's second hand moves from the first position to the second position while the user continues the pinch input with the user's first hand. In some embodiments, an input gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand.

In some embodiments, input gestures used in the various examples and embodiments described herein (e.g., with respect to FIGS. 7A-7AE, and FIGS. 8-12) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device or an HMD)) that includes a display generation component (e.g., display generation component 120 in FIGS. 1, 3, and 4 (e.g., a touch-screen display that serves as a display and a touch-sensitive surface, a stereoscopic display, and/or a display with a pass-through portion). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads-up device (such as a heads-up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for triggering the same type of operation in other embodiments.

Additional descriptions regarding FIGS. 7A-7AE are provided below in references to methods 800, 900, 1000, 1100, and 1200 described with respect to FIGS. 8-12 below.

Figure 8:
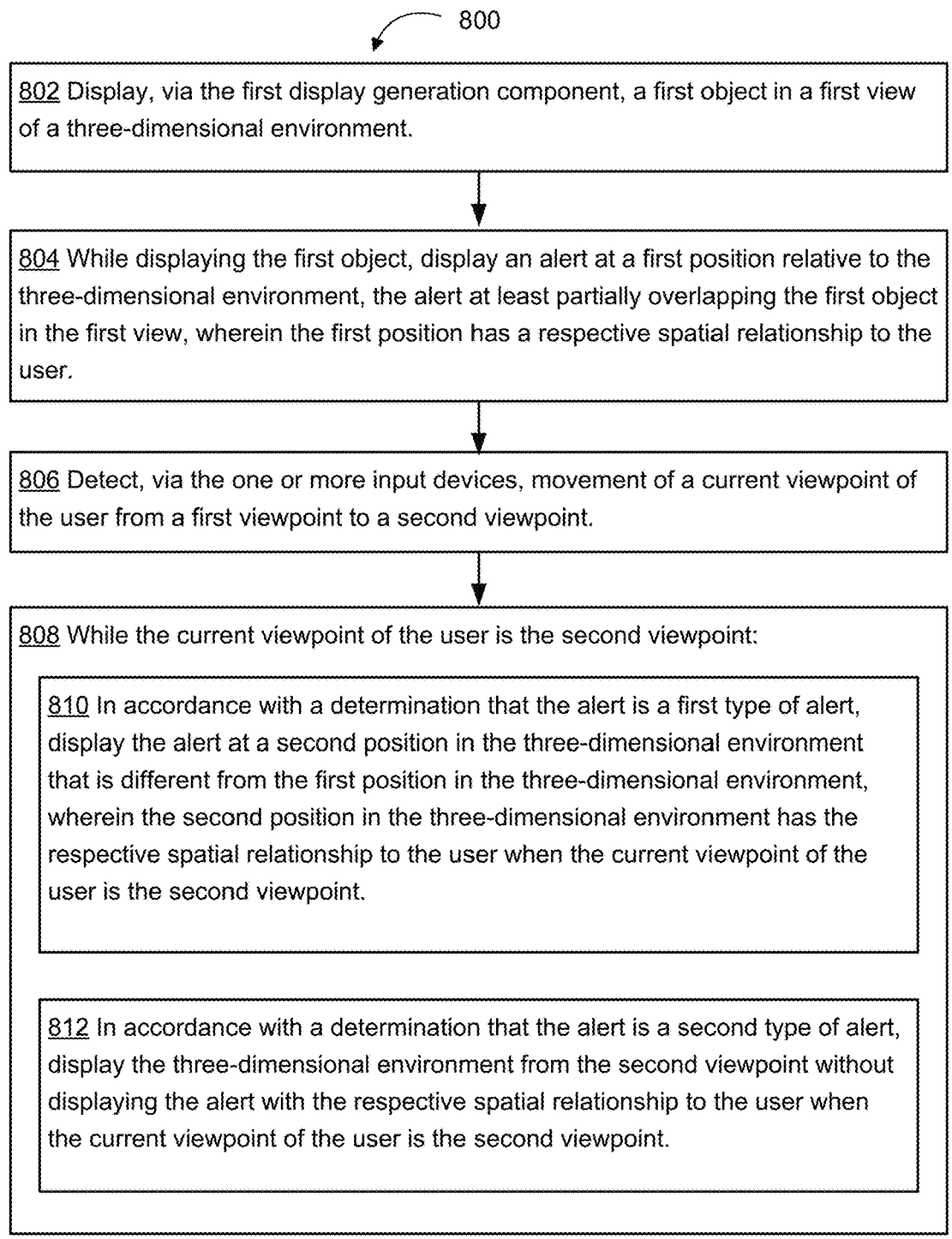
FIG. 8 is a flowchart of a method of changing a displayed location of certain types of alerts as the user moves around in the physical environment, in accordance with some embodiments.

FIG. 8 is a flowchart of a method of displaying an alert in front of an object (e.g., a virtual object or real object), and, in response to the user turning away from the object, if the alert is a system alert, the alert is displayed at a location that is away from the object (e.g., at a same relative location to the user's current viewpoint as before the user turned), and if the alert is an object alert (e.g., an application alert related to the object), the alert is not displayed at the location that is away from the object, in accordance with some embodiments.

In some embodiments, the method 800 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, optionally, one or more input devices (e.g., a camera (e.g., cameras, color sensors, infrared sensors, and/or other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, the method 800 is performed at a computer system (e.g., the computer system 101 in FIG. 1, the computer system 101 described with respect to FIGS. 7A-7AE). In some embodiments, the computer system is in communication with a first display generation component (e.g., the first display generation component is a heads-up display, a head-mounted display (HMD), a display, a touch-screen, and/or a projector) and one or more input devices (e.g., cameras, controllers, touch-sensitive surfaces, joysticks, buttons, gloves, watches, motion sensors, and/or orientation sensors). In some embodiments, the first display generation component is a first display generation component 7100 described with respect to FIGS. 7A-7AE. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the first display generation component and/or the one or more input devices. In some embodiments, the first display generation component and the one or more input devices are integrated and enclosed in the same housing. Many of the features of the method 800 are described with respect to FIGS. 7A-7H, in accordance with some embodiments.

The method 800 relates to displaying different types of alerts with different properties, such that as a user moves in a physical environment, a persistent type of alert (e.g., a system alert) follows the user in a three-dimensional environment that corresponds to the physical environment, in order to maintain a same relative position between the alert and the user in the three-dimensional environment, whereas a non-persistent type of alert (e.g., a notification) is not maintained at a same relative position to the user in the three-dimensional environment. Automatically changing a displayed location of certain types of alerts as the user moves around in the physical environment, where the displayed location is determined based on the type of alert, provides real-time visual feedback as the user moves in the physical environment, thereby changing the user's viewpoint of the three-dimensional environment. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In performing the method 800, the computer system displays (802), via the first display generation component, a first object (e.g., a user-interface object that is associated with an application, an application view (e.g., window), a virtual object, or a physical object in the physical environment) in a first view of a three-dimensional environment. In some embodiments, the first view of the three-dimensional environment corresponds to the first viewpoint or a current viewpoint of the user (e.g., the first view is what the user sees at the first viewpoint). In some embodiments, the three-dimensional environment includes a portion of a physical environment (e.g., in an AR view).

While displaying the first object, the computer system displays (804) an alert at a first position relative to the three-dimensional environment, the alert at least partially overlapping the first object in the first view, wherein the first position has a respective spatial relationship to the user (e.g., to a predefined portion of the user or to a current viewpoint of the user). For example, the alert (e.g., a system alert or an application notification) is displayed at least partially overlaying the first object (e.g., in front of the object, or in front of an application window). In some embodiments, the alert is displayed at a predefined position within a current view of the three-dimensional environment (e.g., a top-center portion of the current view).

The computer system detects (806), via the one or more input devices, movement of a current viewpoint of the user from a first viewpoint to a second viewpoint. In some embodiments, detecting movement from the first viewpoint to the second viewpoint includes detecting a change in user's pose and/or orientation in the physical environment. In some embodiments, the first viewpoint corresponds to a first location of the user in the physical environment and the second viewpoint corresponds to a second location of the user in the physical environment (e.g., wherein the user moves from the first location to the second location). In some embodiments, the second viewpoint that corresponds to a change from the first viewpoint as the user turns away from the first object (e.g., the viewpoint is updated as the user turns the user's head and/or torso (e.g., without moving from a first location to a second location in the physical environment)).

While the current viewpoint of the user is the second viewpoint (808), in accordance with a determination that the alert is a first type of alert (e.g., a system alert and/or an alert that is not related to the first object, or to a particular application), the computer system displays (810) the alert at a second position in the three-dimensional environment that is different from the first position in the three-dimensional environment. The second position in the three-dimensional environment has the respective spatial relationship to the user when the current viewpoint of the user is the second viewpoint. In some embodiments, the computer system further, fades the alert out while the user moves from the first position to the second position, and/or moves the alert to maintain the first spatial relationship to a first anchor position that corresponds to the location of the user in the physical environment as the user moves from the first viewpoint to the second viewpoint. In some embodiments, the alert at the second viewpoint does not overlap the first object (e.g., the alert is continued to be displayed in a top-center portion of the user's current view. For example, the representation of the alert 704-1 at the first viewpoint illustrated in FIG. 7D is moved from the first position in the three-dimensional environment (e.g., in front of the representation 7006' of a wall), to a second position in the three-dimensional environment (e.g., in front of the representation 7004' of a wall) at the second viewpoint (e.g., after the user has turned the user's head to the right from FIG. 7D to FIG. 7E). In some embodiments, the alert is displayed with a same spatial relationship relative to an anchor position in the three-dimensional environment that corresponds to a location of a user in a physical environment (e.g., the alert is continued to be displayed at a predefined position in the three-dimensional environment relative to the user's current viewpoint). For example, as illustrated in FIGS. 7D-7E, the representation of the alert 704-1 is displayed at a same relative position to the user's viewpoint (e.g., in a top-center portion of the user's current view).

While the current viewpoint of the user is the second viewpoint (808), in accordance with a determination that the alert is a second type of alert (e.g., a notification for an application and/or the alert is related to the first object (e.g., related to the application associated with the first object)), the computer system displays (812) the three-dimensional environment from the second viewpoint without displaying the alert with the respective spatial relationship to the user when the current viewpoint of the user is the second viewpoint. In some embodiments, in accordance with a determination that the second viewpoint includes the first object, the computer system further displays the alert at a position (e.g., with a different respective spatial relationship to the user) that at least partially overlaps the first object (e.g., the alert continues to be displayed overlaying the first object, as explained in more detail below). In some embodiments, in accordance with a determination that the second view does not include the first object (e.g., the user has moved more than a threshold amount), the alert is displayed at a position that at least partially overlays a second object (that is associated with a same application as the first object) (e.g., the alert is displayed over another window for the application that is in the second view).

In some embodiments, in accordance with a determination that the alert is the first type of alert) (e.g., a system alert), in response to detecting that the user satisfies attention criteria with respect to a second object, distinct from the first object, the computer system displays the alert at a third position in the three-dimensional environment. In some embodiments, the third position in the three-dimensional environment at least partially overlaps the second object. For example, the alert is initially displayed at least partially overlapping the first object (e.g., a first application window), and in response to the user paying attention to (e.g., gazing at, turning to, and/or interacting with) the second object (e.g., a second application window), the alert is optionally redisplayed at least partially overlapping the second object (e.g., without overlapping the first object). For example, the alert is moved in the three-dimensional environment to the third position that does not overlap the first object (and overlaps the second object) from the first position in the three-dimensional environment that partially overlaps the first object. For example, as described with reference to FIGS. 7D-7E, in some embodiments, the alert 704-1 in FIG. 7E overlaps a third object. In some embodiments, the alert is ceased to be displayed while the user is moving (e.g., the alert ceases to be displayed at the first position and is redisplayed at the third position). In some embodiments, the alert is displayed at additional positions between the first position and the third position (e.g., to animate the alert as moving from the first position to the third position). In some embodiments, the alert is a system alert (e.g., not associated with a particular application) and the system alert is displayed over a currently displayed application window (e.g., or other object) in the user's current view of the three-dimensional environment (e.g., regardless of the type of application for the window or object). For example, the alert is displayed over objects associated with distinct applications (e.g., the first object associated with a first application and the second object associated with a second application). Automatically updating display of an alert to be displayed over an object, such as different application window that is currently in the user's view of the three-dimensional environment, when the user is looking at the object, provides real-time visual feedback such that the user can continue to see the alert even as the user's attention changes to different objects (in different views of the three-dimensional environment), and provides additional control options to the user (e.g., for the user to interact with the alert), without additional user input, by automatically displaying the alert over related objects as the user's current view changes, without requiring the user to navigate to another view to interact with the alert, thereby providing improved visual feedback to the user without requiring additional user input.

In some embodiments, the first object comprises a three-dimensional virtual object. For example, the virtual object is a chessboard, a lamp, a whiteboard, or any other virtual object generated by the computer system in the three-dimensional environment, as described with reference to FIGS. 7C-7D. For example, user interface object 702 is displayed as a virtual object (e.g., a three-dimensional object (e.g., a chessboard) instead of an application window). In some embodiments, the second object is related to the first object (e.g., and is related to the second type of alert or an application associated with the second type of alert). In some embodiments, the first object comprises an application window (e.g., a two-dimensional window, or a three-dimensional window) displayed in the three-dimensional environment. Automatically displaying an alert over a virtual object, such as a virtual object that is related to the alert, when the virtual object is in the user's current view of the three-dimensional environment, provides real-time visual feedback indicating a virtual object in which the alert pertains even as the user moves within the three-dimensional environment, thereby providing improved visual feedback to the user.

In some embodiments, the first object comprises a physical object in a physical environment corresponding to the three-dimensional environment. For example, the physical object comprises a pair of headphones, as described with reference to FIGS. 7C-7D. For example, user interface object 702 is displayed as a representation of a physical object (e.g., a three-dimensional object in the physical environment (e.g., a pair of headphones) instead of an application window). In some embodiments, the physical object is displayed in the three-dimensional environment as a pass-through object (e.g., in which the three-dimensional environment allows certain objects and/or features of the physical environment to pass-through as representations in the virtual (AR or VR) three-dimensional environment). For example, the three-dimensional environment is the physical environment that is displayed (e.g., with one or more virtual objects augmented in the physical environment). In some embodiments, the three-dimensional environment is a virtual environment (e.g., the physical environment is not displayed), and representations of features of the physical environment are displayed (e.g., as virtual representations generated from a camera view of the physical environment). Automatically displaying an alert over a physical object that is present in a real-world physical environment corresponding to a three-dimensional environment, such as a physical object that is related to the alert, when the physical object is in the user's current view of the three-dimensional environment, provides real-time visual feedback indicating a physical object in which the alert pertains even as the user moves within the three-dimensional environment, thereby providing improved visual feedback to the user.

In some embodiments, the computer system displays the alert at a first angle while the alert is viewed from the first viewpoint, and displays the alert at a second angle while the alert is viewed from the second viewpoint. In some embodiments, while detecting movement of the current viewpoint of the user from the first viewpoint to the second viewpoint, the computer system displays the alert at a plurality of angles relative to the user (e.g., wherein the angle is changed while the user moves). In some embodiments, the first angle and the second angle are selected such that the displayed alert faces the user at the user's current viewpoint (e.g., the alert appears at an angle perceived by the user to be perpendicular (e.g., front-facing) to the user's current viewpoint) (e.g., the first angle and the second angle are the same angle). In some embodiments, the angle is changed relative to one or more other objects in the first view or current view of the three-dimensional environment. For example, as the user moves the user's head (e.g., up and down), the angle of the alert is updated to face the user. In some embodiments, the alert is displayed with depth properties such that the angle of the alert can be tilted to face the user as the user moves in the three-dimensional environment. Automatically updating display of an alert to be displayed at different angles, relative to other objects displayed in the three-dimensional environment, such that the alert is perceived by the user as being maintained at a same angle relative to the user's viewpoint, as the user's current view of the three-dimensional environment changes, provides real-time visual feedback even as the user moves within the three-dimensional environment, thereby providing improved visual feedback to the user.

In some embodiments, while the current viewpoint of the user is the second viewpoint and in accordance with a determination that the alert is the second type of alert (e.g., a notification for an application and/or an alert that is related to the first object (e.g., specific to an application associated with the first object)), the computer system displays a third object that is associated with the first object and displays the alert at a fourth position in the three-dimensional environment, the alert at least partially overlapping the third object (e.g., the third object is another instance of (e.g., another window or another object related to) the application related to the alert). In some embodiments, the alert at the fourth position has a different spatial relationship to the user than the respective spatial relationship when the current viewpoint of the user is the first viewpoint. For example, the alert is a notification related to an application, and, in response to the current viewpoint of the user including a window and/or object associated with the application (e.g., that was not displayed in the first view at the first viewpoint), the alert moves to overlap the window and/or object associated with the application, as described with reference to FIGS. 7G-7H (e.g., representation of alert 704-3 is associated with both user interface object 702 and user interface object 712, and in response to the user changing the user's viewpoint, the representation of the alert 704-3 is redisplayed over the user interface object 712 (and, optionally, is no longer displayed overlaying the user interface object 702)). In some embodiments, the computer system determines an application window and/or object for the application corresponding to the alert that is most prominent in the current view (e.g., if two application windows for the same application are concurrently displayed), and displays the alert at least partially overlapping the most prominent (e.g., wherein the most prominent is determined based on relative size of the objects, a location within the three-dimensional environment (e.g., centered is more prominent than peripheral), and/or based on the user's attention (e.g., which window or object the user is currently focused on, looking toward, and/or is closer to the user's gaze)). Automatically updating display of an alert to be displayed over a second object, such as over a different application window, that is related to the alert, such that the user can easily access and interact with the alert, even after the user is viewing the different application window, provides real-time visual feedback and provides additional control options to the user for interacting with the alert as the user's viewpoint changes, without requiring the user to navigate to another view to interact with the alert, thereby providing improved visual feedback to the user without requiring additional user input.

In some embodiments, while detecting movement of the current viewpoint of the user, the computer system visually deemphasizes the alert relative to other objects displayed in the three-dimensional environment (e.g., fades the alert). In some embodiments, the alert disappears (e.g., is no longer displayed) while the current viewpoint of the user moves. In some embodiments, in accordance with a determination that movement of the current viewpoint of the user is no longer detected, the computer system redisplays the alert without visually deemphasizing the alert relative to the other objects displayed in a current view of the three-dimensional environment. In some embodiments, the alert is visually deemphasized relative to other displayed objects in the three-dimensional environment while the user is moving, but is redisplayed without the visual deemphasis in response to the user ceasing to move, as described with reference to FIGS. 7C-7H. For example, in FIGS. 7D-7E, as the user changes the user's viewpoint (e.g., while the user is turning to the right in the physical environment), the representation of the alert 704-1 is faded, and after the user is at the second viewpoint (e.g., in FIG. 7E), the representation of the alert 704-1 is redisplayed without being faded. Automatically updating display of an alert by visually deemphasizing the alert relative to other displayed content, while the user is moving around the physical environment, and displaying the alert without the visual deemphasis once the user has stopped moving, provides the user with access to the alert once the user has stopped moving, without cluttering the user's view while the user is moving around the three-dimensional environment, thereby providing improved visual feedback to the user.

In some embodiments, while detecting movement of the current viewpoint of the user from the first viewpoint to the second viewpoint, the computer system moves the alert in the three-dimensional environment as the current viewpoint of the user moves. In some embodiments, the second type of alert comprises a notification (for an application). In some embodiments, only the second type of alert moves in the three-dimensional environment as the current viewpoint of the user moves. In some embodiments, the first type of alert does not move (e.g., the first type of alert disappears while the current viewpoint of the user moves), for example as described with reference to FIGS. 7C-7H (e.g., wherein the representation of the alert 704-1 in FIGS. 7D-7E (e.g., the first type of alert) ceases to be displayed while the user is turning to the right, and the representation of the alert 704-1 as the user turns to the right from FIG. 7D to FIG. 7F continues to be displayed (e.g., overlaying the user interface object 702) while the user is turning to the right). Automatically updating display of a certain type of alerts (e.g., notifications) to move (e.g., with animated movement) within the three-dimensional environment while the user is moving around the physical environment, such that the alerts are accessible to the user as the user's viewpoint changes, without updating display of other types of alerts (e.g., system alerts) with animated movement as the user moves in the physical environment, provides additional control options for the user for interacting with the alert as the user's viewpoint changes, thereby performing an operation when a set of conditions has been met without requiring further user input.

In some embodiments, the first type of alert is moved according to a first set of properties and the second type of alert is moved according to a second set of properties distinct from the first set of properties. In some embodiments, the alerts of the first type of alert (e.g., system alerts) are moved to a second position without maintaining display of the alerts during the movement of the viewpoint of the user (e.g., the alert disappears and reappears after the movement is complete), as described with reference to FIGS. 7C-7H (e.g., the representation of the alert 704-1 in FIGS. 7D-7E (e.g., the first type of alert) is displayed as faded and/or is moved at a slower rate than the user, while the user is turning to the right, and the representation of the alert 704-1 as the user turns to the right from FIG. 7D to FIG. 7F continues to be displayed (e.g., overlaying the user interface object 702) at a rate that is the same as the user (e.g., so that the representation of the alert 704-1 continues to be displayed over user interface object 702, the representation of the alert 704-1 moves by the same amount as user interface object 702) while the user is turning to the right). Automatically moving certain types of alerts in the three-dimensional environment in a first manner, and automatically moving other types of alerts in the three-dimensional environment in a second manner, distinct from the first manner, based on an automatic determination of the type of alert for each respective alert, enables one or more operations to be performed automatically when a set of conditions has been met without requiring further user input.

In some embodiments, while moving the alert in the three-dimensional environment, in accordance with the determination that the alert is the second type of alert, the computer system continues to display the alert as the alert moves to the second position (e.g., without the alert disappearing and/or the computer system ceasing to display the alert). In some embodiments, the alerts of the second type of alert (e.g., notifications) continue to be displayed while the viewpoint of the user moves (e.g., the notifications continue to be displayed partially overlapping the first object while the first object is still in the current viewpoint of the user). In some embodiments, the first type of alert (e.g., system alerts) disappear while the user is moving in the physical environment. For example, after the user begins movement from the first viewpoint, the first type of alert ceases to be displayed at the first position, and the first type of alert is redisplayed at the second position in accordance with the user's current viewpoint being the second viewpoint (e.g., and, optionally, in accordance with a determination that the user has stayed (stopped) at the second viewpoint for at least a threshold amount of time), as described with reference to FIGS. 7C-7H (e.g., wherein the representation of the alert 704-1 in FIGS. 7D-7E (e.g., the first type of alert) ceases to be displayed while the user is turning to the right, and the representation of the alert 704-1 (e.g., the second type of alert) as the user turns to the right from FIG. 7D to FIG. 7F continues to be displayed (e.g., overlaying the user interface object 702) while the user is turning to the right). Automatically continuing to display an alert while the alert is moved to a new position in the three-dimensional environment, without the alert disappearing, allows the user to view the alert and interact with the alert even while the user is moving around the physical environment, thereby providing improved visual feedback to the user without requiring additional user input.

In some embodiments, the computer system detects that movement of the current viewpoint of the user from the second viewpoint to a third viewpoint does not satisfy a threshold amount of movement. In some embodiments, while the current viewpoint of the user is the third viewpoint, in accordance with a determination that the alert is the second type of alert, the computer system displays the alert moving in the three-dimensional environment as the current viewpoint of the user moves, as described with reference to FIGS. 7C-7H (e.g., the representation of the alert 704-1 (e.g., the second type of alert) as the user turns to the right from the user's viewpoint in FIG. 7D (e.g., to a viewpoint before the viewpoint shown in FIG. 7F) continues to be displayed (e.g., overlaying the user interface object 702) while the user is turning to the right). In some embodiments, in accordance with a determination that the alert is the first type of alert, the computer system forgoes displaying the alert moving in the three-dimensional environment as the current viewpoint of the user moves and/or maintains display of the alert at the second position in the second viewpoint without moving the first type of alert. In some embodiments, the second type of alert (e.g., notifications) move with smaller amounts of movement of the user that do not satisfy the threshold amount, whereas the first type of alert (e.g., a system alert) does not move with smaller amounts of movement of the user. For example, the first type of alert is not displayed while the current viewpoint of the user moves. In some embodiments, the first type of alert moves (e.g., without animating the movement between the positions) by the same amount as the movement of the user once a precondition (e.g., amount of movement, or duration of time at new viewpoint) is satisfied (e.g., the first alert continues to have the same respective spatial relationship to the user while the user is at the first viewpoint and the second viewpoint). In some embodiments, the first type of alert is maintained at a same position in the three-dimensional space in accordance with the determination that the movement does not satisfy the threshold amount of movement. In some embodiments, the first type of alert disappears (but does not move) in accordance with the determination that the movement does not satisfy the threshold amount of movement). Automatically moving certain types of alerts in the three-dimensional environment with a smaller amount of movement than an amount of movement of the user in the physical environment, such that the certain types of alerts appear to lag behind the user as the user moves in the physical environment, provides real-time visual feedback for different types of alerts as the user moves in the physical environment, and allows the user to easily access and interact with the alerts while the alerts are displayed, without cluttering the user's current view by displaying the alert at a position that naturally follows the user's movements, thereby providing improved visual feedback to the user.

In some embodiments, in response to determining that the alert is displayed for a threshold amount of time without detecting user interaction with the alert (e.g., the alert is idle for 6 seconds (e.g., or 3 seconds, or 10 seconds, or another threshold amount of time)), in accordance with the determination that the alert is the first type of alert, the computer system maintains display of the alert in the three-dimensional environment (e.g., until the user interacts with the alert to dismiss the alert). For example, if the user does not pay attention to the representation of the alert 704-1 in FIG. 7D, and the alert is the first type of alert, the alert is maintained (e.g., and displayed at the same relative position the user's current viewpoint). If the alert is the second type of alert, the alert automatically disappears after the threshold amount of time has passed without the user paying attention to the alert (e.g., regardless of whether the user moves in the physical environment). In some embodiments, in accordance with the determination that the alert is the second type of alert, the computer system ceases display of the alert. In some embodiments, the first type of alert (e.g., a system alert) is a persistent alert that continues to be displayed, even if the user has not interacted with (e.g., paid attention to and/or looked at) the alert. In some embodiments, the second type of alert (e.g., a notification) is a temporary alert that is dismissed automatically (e.g., without user input) in accordance with the threshold amount of time passing without detecting user interaction with the alert. In some embodiments, for the second type of alert, in response to detecting user interaction with the alert before the threshold amount of time has passed, the computer system maintains display of the alert (e.g., if the user interacts (e.g., gazes) for a predefined time period (e.g., gazes and dwells for at least 0.25 seconds), the alert continues to be displayed). Automatically ceasing to display certain types of alerts in the three-dimensional environment if the user has not interacted with the alert, and maintaining display of other types of alerts in the three-dimensional environment regardless of whether the user has interacted with the other type of alert, improves the user experience by automatically, under certain conditions, removing alerts that the user is not interested in viewing, thereby providing improved visual feedback to the user by minimizing clutter in the user's view and automatically performing an operation when a set of conditions has been met.

In some embodiments, the respective spatial relationship of the alert at the first position to the user, if the alert is the second type of alert, is a higher (e.g., based on the y-axis extending from floor to ceiling) spatial relationship relative to the user than the respective spatial relationship of the alert at the first position to the user, if the alert is the first type of alert. In some embodiments, the second type of alert appears higher (e.g., above) the first type of alert, relative to the user. In some embodiments, if both a first type of alert (e.g., system alert) and a second type of alert (e.g., notification) are displayed in the first viewpoint, the first type of alert is displayed below (e.g., relative to the ground) the second type of alert (e.g., notifications appear at or near the top of the current viewpoint), as described with reference to FIGS. 7C-7H. For example, in FIG. 7D, if a representation of another type of alert is concurrently displayed with the representation of the alert 704-1, the representation of the first type of alert is displayed lower than the representation of the second type of alert. Automatically displaying certain types of alerts in the three-dimensional environment at a position that is higher than a position at which other types of alerts are displayed in the three-dimensional environment, allows the user to easily distinguish between alerts that are system alerts and alerts that are notifications, which makes it easier for the user to select the alert that the user is interested in based on where the alert is displayed in the three-dimensional environment, thereby providing improved visual feedback to the user.

In some embodiments, the computer system detects movement of the current viewpoint of the user to a fourth viewpoint, wherein the fourth viewpoint does not include virtual objects. In some embodiments, the three-dimensional environment includes a virtual portion that includes virtual objects. In some embodiments, the virtual portion is a restricted portion of the field of view (e.g., virtual content is only displayed in the restricted portion of the field of view, and any portion of the physical environment outside of the restricted portion is displayed (e.g., as pass-through). In some embodiments, while the current viewpoint of the user is the fourth viewpoint, in accordance with a determination that the alert is the first type of alert, the computer system ceases display of the first type of alert (e.g., a system alert does not follow the user's movement or current gaze when the user is not in the virtual portion of the three-dimensional environment). In some embodiments, in accordance with a determination that the alert is the second type of alert, the computer system moves the alert in the three-dimensional environment as the current viewpoint of the user moves (e.g., a notification alert follows the current viewpoint of the user in any (e.g., all) portions of the three-dimensional environment), as described with reference to FIGS. 7D-7H. For example, if the user turns to the left from FIG. 7D (e.g., wherein a portion of the environment to the left of the user's viewpoint in FIG. 7D does not include virtual content), if the representation of the alert 704-1 is the first type of alert, the representation of the alert 704-1 ceases to be displayed, and if the representation of the alert 704-1 is the second type of alert, the representation of the alert 704-4 ceases to be displayed after the user has turned to the left from the user's viewpoint in FIG. 7D. Automatically maintaining display of certain types of alerts when the user turns away from virtual content, without maintaining display of other types of alerts when the user turns away from the virtual content, provides additional control options for the user for interacting with the certain types of alerts as the user's viewpoint changes, without cluttering the user's current view of the non-virtual content with display of the other types of alerts, thereby providing improved visual feedback to the user.

In some embodiments, while detecting movement of the current viewpoint of the user, the computer system displays the alert at a position in the three-dimensional environment having a respective spatial relationship to the user that is farther than the respective spatial relationship to the user at the first position. For example, while the user is moving, the alert is displayed at a position farther away from the user (e.g., out of arm's reach), as described with reference to FIGS. 7D-7F (e.g., the representation of the alert 704-1 appears as pushed back, relative to its position in the three-dimensional environment in FIG. 7D, while the user turns to the right from the viewpoint in FIG. 7D to the viewpoint shown in FIG. 7E and/or FIG. 7F. In some embodiments, in response to no longer detecting movement of the viewpoint of the user, the alert is redisplayed having the respective spatial relationship to the user at the first position. Automatically changing display of an alert from a first position while the user is stationary to a second position within the three-dimensional environment that appears farther away from the user than the alert at the first position, while the user is moving around the physical environment, provides real-time visual feedback as the user moves around in the physical environment, thereby providing improved visual feedback to the user.

In some embodiments, the respective spatial relationship to the user at the first position for the first type of alert is a closer (e.g., in its perceived depth and/or distance from the user in the three-dimensional environment) spatial relationship relative to the user than the respective spatial relationship to the user at the first position for the second type of alert. In some embodiments, the second type of alert (e.g., notifications) are displayed farther from the user's current viewpoint than the first type of alert (e.g., system alerts). For example, system alerts are displayed in front of the user at a distance less than a threshold distance (e.g., within an arm's reach, or another threshold distance), while notifications are displayed at a distance greater than the threshold distance (e.g., outside of arm's reach, or another threshold distance), as described with reference to FIGS. 7D-7F (e.g., in FIG. 7D, if a representation of another type of alert is concurrently displayed with the representation of the alert 704-1, the representation of the first type of alert is displayed closer to the user's viewpoint than the representation of the second type of alert). Automatically displaying certain types of alerts in the three-dimensional environment at a position that appears farther away from the user's viewpoint than a position at which other types of alerts are displayed in the three-dimensional environment, provides real-time visual feedback for different types of alerts by displaying the different types of alerts in different portions of the three-dimensional environment, thereby providing improved visual feedback to the user.

In some embodiments, displaying an alert that is the first type of alert includes displaying content and one or more selectable user interface objects for dismissing the alert. For example, the alert includes an option to dismiss the alert (e.g., an affordance), and in response to detecting a user input (e.g., an air gesture) selecting the option to dismiss the alert (e.g., a pinch input directed to the option, a gaze input directed to the option, and/or a gaze input in conjunction with a gesture), the computer system ceases to display the alert (e.g., the alert is dismissed), as described with reference to FIGS. 7C-7D (e.g., the representation of the alert 704-1 includes one or more selectable user interface objects). In some embodiments, the user input is directed to the option directly (e.g., the user performs the input at a position that corresponds to the option) or the input is directed to the option indirectly (e.g., the user performs the input while gazing at the option, wherein a position of the user's hand while performing the input is not at the position that corresponds to the option). For example, the user is enabled to direct the user's input to the option by initiating the gesture at, or near, the option (e.g., within 0.5 cm, 1 cm, 5 cm, or a distance between 0-5 cm, as measured from an outer edge of the option or a center portion of the option). In some embodiments, the user is further enabled to direct the user's input to the option by paying attention to the option (e.g., gazing at the option) and, while paying attention to the option, the user initiates the gesture (e.g., at any position that is detectable by the computer system). For example, if the user is paying attention to the option, the gesture need not be initiated at a position that is at, or near, the option. In some embodiments, the option to dismiss the alert causes the alert to be removed from a "pending" alert state. In some embodiments, the option to dismiss the alert is an option to minimize the alert (e.g., and the alert is still pending). In some embodiments, after the alert is no longer displayed in the current view of the three-dimensional environment, the user is enabled to view the alert from an alerts user interface (e.g., that continues to store and display alerts that have been received by the computer system without being dismissed (e.g., the user minimized the pending alert, but did not view and/or open the application associated with the alert, so the alert is still pending)). For example, the alert is no longer displayed in the three-dimensional environment unless the user requests to view a list of (e.g., optionally all) pending notifications. Automatically displaying content and user-selectable options in conjunction with display of an alert in the three-dimensional environment, provides the user with additional control options without requiring the user to navigate through complex hierarchies, and provides real-time visual feedback by concurrently displaying the alert with content related to the alert, thereby providing improved visual feedback to the user without requiring additional user input.

In some embodiments, while displaying a plurality of separate application regions (e.g., one or more application windows and/or other virtual content) in the three-dimensional environment, the computer system displays the alert, including (e.g., in response to receiving the alert, the alert is displayed and the additional virtual content is visually deemphasized (e.g., concurrently with displaying the alert)), in accordance with a determination that the alert is the first type of alert, visually deemphasizing the plurality of separate application regions, relative to the alert, in the three-dimensional environment (e.g., the alert is not visually deemphasized, and/or the virtual content is dimmed and/or pushed back in distance in the three-dimensional environment). In some embodiments, in accordance with a determination that the alert is the second type of alert, the computer system visually deemphasizes a first application region of the plurality of separate application regions without deemphasizing a second application region of the plurality of application regions, relative to the alert, in the three-dimensional environment. In some embodiments, the first application region (e.g., and the second application region) is a portion, less than all, of the three-dimensional environment. In some embodiments, the first application region (e.g., or the second application region) comprises the first object. For example, only an application window and/or virtual objects associated with the second type of alert (e.g., associated with the application for the notification) are visually deemphasized, while other application windows (e.g., for applications unrelated to the alert) are not visually deemphasized, as described above with reference to FIGS. 7C-7H (e.g., if the representation of the alert 704-1 is the first type of alert (e.g., in FIGS. 7D-7E), the user interface object 702 and other displayed virtual content (e.g., if additional application windows are displayed in FIG. 7D) are faded and/or pushed back; and if the representation of the alert 704-1 is the second type of alert (e.g., in FIGS. 7D and 7F), the user interface object 702 is faded and/or pushed back, without fading or pushing back the other displayed virtual content). Automatically modifying the display of application windows in the three-dimensional environment, when alerts are also displayed in the three-dimensional environment, such that the application windows appear dimmed and/or pushed back relative to their positions before displaying the alerts, makes it easier for the user to interact with the alert without distraction from other displayed content, thereby providing additional controls options without cluttering the user's view with additional displayed controls.

In some embodiments, while displaying a portion of a physical environment in the three-dimensional environment (e.g., the portion of the physical environment comprises pass-through content (of the real world) that is displayed in the three-dimensional environment), the computer system displays the alert, including, in accordance with a determination that the alert is the first type of alert, visually deemphasizing (e.g., dimming, fading, and/or blurring) the portion of the physical environment in the three-dimensional environment, and in accordance with a determination that the alert is the second type of alert, forgoing deemphasizing the portion of the physical environment in the three-dimensional environment (e.g., not darkening the portion of the physical environment and/or maintaining display of the portion of the physical environment), as described with reference to FIGS. 7C-7H (e.g., if the representation of the alert 704-1 is the first type of alert (e.g., in FIGS. 7D-7E), the representation 7014' of the physical object and/or other displayed representations of physical objects are faded and/or pushed back; and if the representation of the alert 704-1 is the second type of alert (e.g., in FIGS. 7D and 7F), the representation 7014' of the physical object and/or other displayed virtual content are not faded and/or pushed back). Automatically modifying the display of physical content that is displayed as pass-through content in the three-dimensional environment, when certain types of alerts, but not other types of alerts, are displayed in the three-dimensional environment, such that the physical content appears dimmed relative to its opacity before displaying the certain types of alerts, makes it easier for the user to interact with certain types of alerts without distraction from other displayed content, thereby providing additional controls options without cluttering the user's view with additional displayed controls.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, and 1200) are also applicable in an analogous manner to method 800 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 800 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 900, 1000, 1100, and 1200). For brevity, these details are not repeated here.

Figure 9:
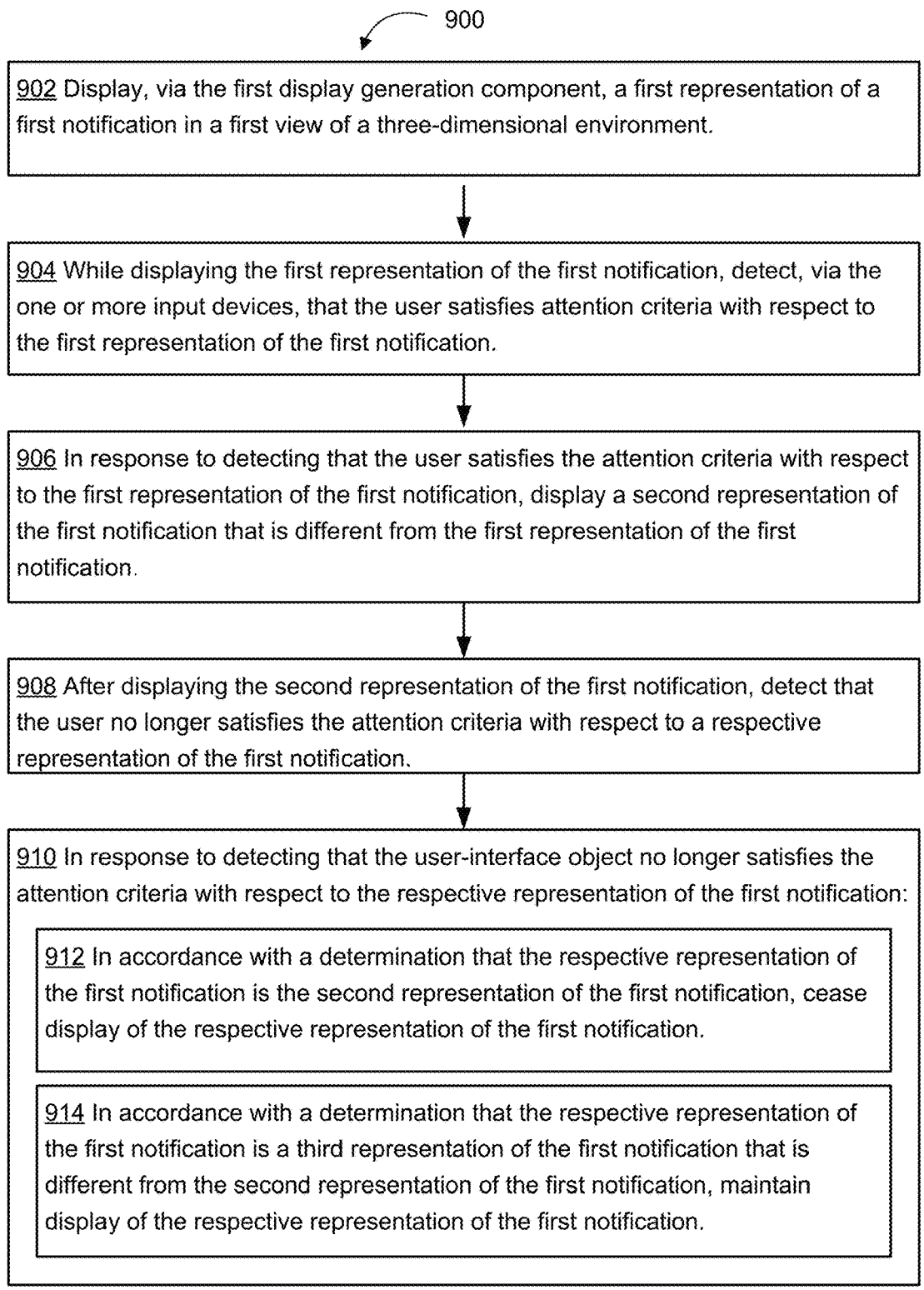
FIG. 9 is a flowchart of a method of displaying a notification with different properties in accordance with the user paying attention to the respective notification, in accordance with some embodiments.

FIG. 9 is a flowchart of a method of displaying a notification with different properties in accordance with the user paying attention to the respective notification in accordance with some embodiments.

In some embodiments, the method 900 is performed at a computer system (e.g., computer system 101 in FIG. 1)

including a first display generation component (e.g., display generation component 120 in FIGS. 1, 3, and 4) (e.g., a heads-up display, a display, a touchscreen, and/or a projector) and, optionally, one or more input devices (e.g., a camera (e.g., cameras, color sensors, infrared sensors, and/or other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, the method 900 is performed at a computer system (e.g., the computer system 101 in FIG. 1, the computer system 101 described with respect to FIGS. 7A-7AE). In some embodiments, the computer system is in communication with a first display generation component (e.g., the first display generation component is a heads-up display, a head-mounted display (HMD), a display, a touchscreen, and/or a projector) and one or more input devices (e.g., cameras, controllers, touch-sensitive surfaces, joysticks, buttons, gloves, watches, motion sensors, and/or orientation sensors). In some embodiments, the first display generation component is a first display generation component 7100 described with respect to FIGS. 7A-7AE. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the first display generation component and/or the one or more input devices. In some embodiments, the first display generation component and the one or more input devices are integrated and enclosed in the same housing. Many of the features of the method 900 are described with respect to FIGS. 7D and 7I-7L, in accordance with some embodiments.

The method 900 relates to displaying a notification with different properties in accordance with the user paying attention to the respective notification. Automatically updating display of a representation of a notification as the user directs the user's attention toward the notification, and/or shifts the user's attention away from the notification, allows the user to access and perform different operations from a notification, while automatically removing notifications that the user has not looked at (e.g., or otherwise paid attention to), thereby providing additional control options without cluttering the user's view with additional display controls. Providing additional control options to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In performing the method 900, the computer system displays (902), via the first display generation component, a first representation of a first notification in a first view of a three-dimensional environment. In some embodiments, a respective characteristic position of the user interface object in the three-dimensional environment has a first spatial relationship to a first anchor position in the three-dimensional environment that corresponds to a location of a user in a physical environment (e.g., the alert is displayed at a predefined position in the three-dimensional environment relative to the user's current position/view). In some embodiments, the first representation of the notification comprises an application icon associated with the notification (e.g., the first representation of the notification is the representation of alert 704-1, FIG. 7D).

While displaying the first representation of the first notification, the computer system detects (904), via the one or more input devices, that the user satisfies attention criteria (e.g., the user is gazing at the user-interface object) with respect to the first representation of the first notification.

In response to detecting that the user satisfies the attention criteria with respect to the first representation of the first notification, the computer system displays (906) a second representation of the first notification that is different from the first representation of the first notification (e.g., expands the alert while the user is gazing at the alert, as described with reference to FIG. 7I).

After displaying the second representation of the first notification (e.g., in accordance with a determination that the user satisfies the attention criteria), the computer system detects (908) that the user no longer satisfies (e.g., does not maintain) the attention criteria with respect to a respective representation (e.g., the second representation or another (e.g., third) representation) of the first notification. In some embodiments, the user ceases to satisfy the attention criteria (e.g., the user looks away from the notification (e.g., the representation of the notification) and/or is no longer gazing at the notification (e.g., the representation of the notification). In some embodiments, the user looks at the user-interface object for a first amount of time (e.g., 1 second, 2 seconds, or another amount of time) and then looks away). In some embodiments, the user does not satisfy the attention criteria in accordance a determination that the user has not looked at the notification (e.g., the representation of the notification automatically disappears after a predetermined time period (e.g., 2 seconds, 3 seconds, or another predetermined time period) without the user gazing at the notification. In some embodiments, detecting the user no longer satisfies the attention criteria further comprises determining a time period during which the user satisfied the attention criteria (e.g., that the user must have looked at the notification for at least a predetermined time period before the user can no longer satisfy the attention criteria (e.g., the user must satisfy the attention criteria before the user no longer satisfies the attention criteria)).

In response to detecting that the user-interface object no longer satisfies the attention criteria with respect to the respective representation of the first notification (910), in accordance with a determination that the respective representation of the first notification is the second representation of the first notification (e.g., wherein the second state is achieved in accordance with a short look (e.g., the user does not satisfy the attention criteria for a threshold amount of time before looking away)), the computer system ceases display (912) of the respective representation of the first notification (e.g., as described with reference to FIG. 7J).

In accordance with a determination that the respective representation of the first notification is a third representation of the first notification that is different from the second representation of the first notification (e.g., wherein the third state is achieved in accordance with a hand gesture and/or a continued gaze (the user satisfies the attention criteria for the threshold amount of time)), the computer system maintains display (914) of the respective representation of the first notification (e.g., as described with reference to FIGS. 7K-7L). For example, if the respective representation of the first notification is in the third state (e.g., representation of alert 704-5), as illustrated in FIG. 7K, after the user directs the user's attention to another object (e.g., representation 7014' of a physical object) and/or changes the user's viewpoint, as illustrated in FIG. 7L, the computer maintains display of the representation of the alert (e.g., illustrated as representation of alert 704-6 in FIG. 7L).

In some embodiments, while displaying the first representation of the first notification, in accordance with a determination that (e.g., in response to detecting that) the user does not satisfy the attention criteria with respect to the first representation of the first notification within a predefined time period, the computer system ceases display of the first representation of the first notification. In some embodiments, in accordance with a determination that the user does not gaze at the first representation of the notification (e.g., and the first representation of the notification stays in a first state, as shown in FIG. 7D) (e.g., the first state being an initial state before the user pays attention to the first representation of the notification), within a threshold amount of time (e.g., 0.5 seconds, 1 second, 3 seconds, or 5 seconds), the first representation of the notification is no longer displayed. Automatically removing a notification that was displayed if the user has not paid attention to (e.g., looked at) the notification within a certain amount of time, provides real-time visual feedback such that the notifications do not remain displayed indefinitely when the user does not want to view the notification, which avoids hindering the user's current view of the three-dimensional environment and avoids the need for the user to explicitly dismiss notifications that are not of interest to the user, thereby making the user interface more efficient and providing improved visual feedback to the user.

In some embodiments, the attention criteria with respect to the first representation of the first notification includes a requirement that is met when the user has looked at the first representation of the first notification (e.g., as described with reference to FIG. 7I, the user has satisfied the attention criteria with respect to the alert 704-4). In some embodiments, in response to the user gazing at the first representation of the notification, an application name for an application associated with the notification is displayed (e.g., wherein the second representation of the notification includes display of an application name). Automatically changing a state of a notification from a first state to a second state, in response to the user looking at the notification, for example where the second state the name of an application associated with the notification, instead of requiring the user to actively open the notification and interrupt the user's current view, allows the user to view additional information about the notification by looking at the alert, without requiring additional user input, thereby reducing the number of inputs needed to perform an operation.

In some embodiments, the attention criteria with respect to the first representation of the first notification includes a requirement that is met when the user has gazed at the first representation of the first notification for at least a threshold amount of time (e.g., as described with reference to FIG. 7I, the user has paid attention to the alert 704-4 for a first threshold amount of time, $t_1$). In some embodiments, the second representation is displayed in accordance with a determination that the user has gazed at the first representation of the notification for a minimum amount of time (e.g., 0.1 seconds, 0.25 seconds, 0.5 seconds, 1 second, or 2 seconds). In some embodiments, the second representation of the notification comprises an expanded view of the notification that includes content related to the notification. In some embodiments, before the user has gazed at the first representation for at least the threshold amount of time, the user looks at the first representation of the notification, which causes the representation to update to display the application name, and after the user has gazed at the first representation for the threshold amount of time, the representation is updated to display notification content. Automatically changing a state of a notification, in response to the user looking at the notification for a predefined amount of time, for example where the new state includes additional content for the notification, instead of requiring the user to actively open the notification and interrupt the user's current view, allows the user to view additional information about the notification by looking at the alert for the predefined amount of time, without additional user input, thereby reducing the number of inputs needed to perform an operation.

In some embodiments, the computer system detects a hand of the user being moved to meet respective criteria (e.g., detecting the hand being raised such as by detecting the hand being moved up by a predetermined amount or being moved into a predetermined region relative to the user) and in response to detecting the hand of the user being moved to meet the respective criteria, the computer system displays (e.g., updates display) of the respective representation of the first notification as the third representation of the first notification (e.g., the representation of the alert in a third state, as described with reference to FIG. 7K in response to the user raising the user's hand 7020 (e.g., optionally in conjunction with a gaze input directed to the alert 704-5)). In some embodiments, the hand is detected using one or more cameras and/or one or more pose sensors in communication with the computer system. Automatically changing a state of a notification to a third state, in response to the user raising the user's hand, for example, where the third state includes additional content for the notification, instead of requiring the user to actively open the notification and interrupt the user's current view, allows the user to view additional information about the notification by raising the user's hand, without requiring additional user input, thereby reducing the number of inputs needed to perform an operation.

In some embodiments, the computer system detects a hand of the user being moved to meet respective criteria, the respective criteria including criteria that is met when the hand of the user is in a predefined pose, and in response to detecting the hand of the user being moved to meet the respective criteria, the computer system displays the respective representation of the first notification as the third representation of the first notification (e.g., the representation of the alert in a third state, as described with reference to FIG. 7K, the user's hand 7020 is moved to a predefined pose). For example, detecting that the hand of the user is moved to the predefined pose comprises detecting the user raising the user's hand at a particular orientation and/or with a predefined shape (e.g., fingers are arranged in a particular way). For example, the predefined pose is the user's hand with the user's palm facing up (or down), the user's fist closed, the user's palm turned away from the user (or towards the user), and/or both of the user's hands arranged in a predefined pose. Automatically changing a state of a notification to a third state, in response to the user performing a gesture that moves the user's hand into a predefined pose, for example, while the user is gazing at the notification, where the third state includes additional content for the notification, instead of requiring the user to actively open the notification and interrupt the user's current view, allows the user to view additional information about the notification by raising the user's hand in a predefined pose, without requiring additional user input, thereby reducing the number of inputs needed to perform an operation.

In some embodiments, the computer system detects a user input (e.g., an air gesture) selecting the respective representation of the first notification, and in response to detecting the user input selecting the respective representation of the first notification, the computer system displays the respective representation of the first notification as the third representation of the first notification (e.g., the representation of the alert in a third state, as described with reference to FIG. 7K in response to the user input (e.g., using hand 7020 and/or a gaze input) directed to alert 704-5, the alert is expanded to the third state). In some embodiments, the user input comprises a pinch input, a tap input, and/or another gesture. In some embodiments, the selection input is a predefined gesture that is detected while the user's gaze is directed to the respective representation (e.g., the user gazes at the respective representation, and in response to the user performing a gesture (e.g., a pinch input, or a tap input), the respective representation is selected. Automatically changing a current state of a notification to a third state, in response to the user performing a gesture to select the notification while it is displayed in the current state, for example, where the third state includes additional content for the notification than in the current state, instead of requiring the user to actively open the notification and interrupt the user's current view, allows the user to view additional information about the notification by raising the user's hand in a predefined pose, without requiring additional user input, thereby reducing the number of inputs needed to perform an operation.

In some embodiments, the second representation of the first notification includes content for the application corresponding to the first notification, as described with reference to FIG. 7I (e.g., the representation of the alert 704-4 includes an application name for the application associated with the alert, while the representation of the alert 704-1 in FIG. 7D (e.g., in the first state) does not include the application name). In some embodiments, the second representation of the first notification (e.g., the first notification in a second state) includes a preview of content (e.g., a preview of a message for a message notification, a summary of content for a news notification, and/or a thumbnail image for a photos notification). In some embodiments, the second representation of the first notification comprises is enlarged (e.g., expanded) relative to the first representation of the first notification (e.g., the second representation is larger so as to display more content than the first representation). Automatically displaying a notification in a second state that includes content for, such as an indication of a name of, an application related to the notification, provides real-time visual feedback in response to the user paying attention to the notification in the second state that is displayed in the three-dimensional environment, without cluttering the user's view with the additional content before the user has paid attention to the notification, thereby providing improved visual feedback to the user.

In some embodiments, the third representation of the first notification includes one or more selectable user interface objects (e.g., as described with reference to FIG. 7K (e.g., the representation of the alert 704-5 includes one or more affordances, while the representation of the alert 704-4 in FIG. 7I (e.g., in the second state) does not include the one or more affordances). For example, the computer system detects a user input (e.g., an air gesture) selecting a first selectable user interface object (e.g., for opening an application related to the first notification) from the one or more selectable user interface objects, and, in response to detecting the user input selecting the first selectable user interface object, the computer system displays an application window for the application (e.g., and/or opening or launching the application) related to the first notification. In some embodiments, the computer system detects a user input selecting a second selectable user interface object (e.g., for closing the first notification) from the one or more selectable user interface objects, and, in response to detecting the user input selecting the second selectable user interface object, the computer system ceases to display the first notification (e.g., minimizes the first notification, or dismisses the first notification). In some embodiments, the third representation of the first notification (e.g., the first notification in a third state) includes content (e.g., the same content as the content displayed in the second representation of the first notification, additional content and/or different content) and one or more selectable affordances. For example, the one or more selectable affordances include an affordance for dismissing the representation of the first notification and/or an affordance for opening an application related to the representation of the first notification (e.g., to view the application associated with the first notification). Displaying a notification in a third state that includes one or more selectable options, such as an option to open an application related to the notification and/or an option to dismiss the notification, allows the user to interact with the notification in more ways than the user could interact with the notification before the user viewed the notification in the third state, thereby providing additional control options without cluttering the user's view.

In some embodiments, while displaying the third representation of the first notification, in response to detecting a user input to open an application associated with the first notification, the computer system displays (e.g., opens and displays a window for) the application associated with the first notification. For example, as described with reference to FIG. 7K, the user selects (e.g., using an air gesture) a first user interface object (e.g., an affordance to open the application associated with the first notification) of the one or more selectable user interface objects, and in response to the user selection, the computer system displays the application associated with the first notification. In some embodiments, the application is opened to a window of the application that shows content included in the second and/or third representation of the first notification (e.g., the particular message thread for the message notification, the respective news story from the news notification, and/or the respective photo from the photos notification). For example, instead of opening the application to an initial application window (e.g., a home interface for the application), the application is opened to display relevant content of the notification. In some embodiments, depending on the type of input, the application is opened concurrently with another object/application that is currently displayed in the three-dimensional environment (e.g., as described below with reference to method 900 and FIGS. 7M-7O). Automatically displaying an option to open an application associated with a notification directly from the notification while the notification is displayed in a third state, provides the user with additional control options without requiring the user to navigate through complex menu hierarchies, thereby reducing the number of inputs needed to perform an operation.

In some embodiments, while displaying the first representation of the first notification, in response to receiving a second notification, the computer system replaces display of the first representation of the first notification with a first representation of the second notification. In some embodiments, replacing display comprises replacing display of a portion, less than all, of the first representation of the notification. For example, the representation of the second notification appears layered in front of the first representation of the notification (e.g., wherein a portion of the first representation of the notification is displayed). In some embodiments, a plurality of notifications are displayed as stacked notifications (e.g., the other notifications are at least partially visible behind a front notification), as described with reference to FIGS. 7I-7L. In some embodiments, the most recent notification is the front notification (e.g., a subsequent notification received while displaying the user interface of FIG. 7D causes the new (subsequent) notification to be displayed in front of the representation of the alert 704-1). In some embodiments, a notification associated with a particular application is displayed as the front notification (e.g., based on application priorities, as set by the user). Automatically replacing display of at least a portion of a first notification in response to receiving a subsequent second notification updates the user in real-time, without requiring user inputs requesting to view subsequent notifications that are received at the computer system, thereby enabling an operation to be performed when a set of conditions has been met without requiring further user input.

In some embodiments, in accordance with a determination that there are a plurality of available notifications (e.g., unread notifications), in response to detecting that the user satisfies attention criteria with respect to the plurality of first representations of respective notifications, the computer system concurrently displays representations of multiple different notifications in the plurality of notifications. In some embodiments, the plurality of available notifications comprise application icons, and the representations of multiple different notifications include content for the respective notifications (e.g., previews of content for the respective notifications). In some embodiments, the plurality of available notifications are concurrently displayed (e.g., at least partially) as side-by-side notifications, or stacked (e.g., layered) notifications, as described with reference to FIGS. 7I-7L (e.g., if there are multiple notifications (e.g., in FIG. 7D), in response to the user satisfying the attention criteria, representations for the multiple notifications (e.g., that may or may not be displayed in the user's viewpoint in FIG. 7D), are concurrently displayed (e.g., in FIG. 7I). In some embodiments, a subset, less than all, of the available notifications are displayed (e.g., a single notification is initially displayed) and the representations of multiple different notifications in the plurality of notifications are concurrently displayed (e.g., as expanding away (e.g., outward, to the sides, and/or above or below) from the display of the single notification). In some embodiments, the representations of the multiple respective notifications are concurrently displayed (e.g., side-by-side). Automatically, in response to the user gazing at one notification in a plurality of available notifications, updating display of multiple notifications to a second state that includes more information about the notification than previously displayed, instead of requiring the user to actively open each of the plurality of notifications individually and interrupt the user's current view, allows the user to view additional information about multiple notifications at the same time, without requiring additional user inputs, thereby reducing the number of inputs needed to perform an operation.

In some embodiments, while displaying the second representation of the first notification, the computer system detects a hand of the user being moved to meet respective criteria, and in response to detecting the hand of the user being moved to meet respective criteria (e.g., detecting that the hand of the user is raised, detecting a hand of the user is within the field of view of the one or more cameras, detecting another gesture performed by the user's hand and/or detecting the user's hand in a predefined pose), in accordance with a determination that displayed second representation of the first notification is the only displayed notification, the computer system updates display of the second representation of the first notification to the third representation of the first notification. In some embodiments, in accordance with a determination that two or more second representations of respective notifications are displayed (e.g., including the second representation of the first notification), the computer system maintains display of the two or more second representations of the respective notifications (e.g., including maintaining display of the second representation of the first notification). For example, if the user raises the user's hand and there is only one alert, the alert is automatically updated to the third state (e.g., as described with reference to the user raising the user's hand in FIG. 7K, the representation of the alert 704-4 is updated to the third state (e.g., displayed as representation of the alert 704-5); and if the user raises the user's hand and there are two or more alerts, the two or more alerts are maintained in the second state (e.g., if there are multiple alerts displayed in FIG. 7I, in response to the user raising the user's hand 7020, the representations are not updated to the third state (e.g., as shown in FIG. 7K), and the multiple alerts remain displayed in the second state). Automatically determining whether to update display of a notification from a second state to a third state in response to a hand gesture performed by the user, based on an automatic determination as to whether the notification is the only displayed notification or is one of a plurality of displayed notifications, and automatically: selecting a notification when it is the only displayed notification, or allowing the user to select between multiple displayed notifications, enables an operation to be performed automatically when a set of conditions has been met without requiring further user input.

In some embodiments, in accordance with a determination that a plurality of second representations of respective notifications (e.g., including the second representation of the first notification) are displayed, the computer system detects a user input selecting a (e.g., single) third notification from the plurality of second representations of respective notifications, as described with reference to FIGS. 7I-7L (e.g., if there are representations of multiple notifications displayed in FIG. 7I, the computer system detects an input directed to a particular notification of the multiple notifications and displays the particular notification in the third state (e.g., as representation of alert 704-5, FIG. 7K)). In some embodiments, the user input (e.g., an air gesture) comprises a combined gaze and hand gesture. In some embodiments, a respective notification (e.g., the third notification) is selected (e.g., changed to the third state, or otherwise opened) in accordance with a determination that the user has gazed at the respective notification, and in response to receiving a user input (e.g., a gesture performed with the user's hand) while the user is gazing at the respective notification, the notification is selected (e.g., an application associated with the notification is opened and displayed). For example, the user indicates which notification, from the plurality of second representations of respective notifications, the user intends to select. In some embodiments, while the user gazes at a respective notification, the respective notification is visually emphasized relative to the other displayed plurality of second representations of notifications (e.g., the notification that the user is currently gazing at is enlarged or highlighted/outlined), and the user is enabled to perform a user input (e.g., an air gesture) to select the respective notification. For example, in accordance with a determination that the user's gaze is directed to a first notification of the plurality of second representations of respective notifications, in response to detecting a user input (while the user is gazing at the first notification), the first notification is selected (e.g., and in response to the selection, the first notification is displayed in the third state and/or an application associated with the first notification is opened). In accordance with a determination that the user's gaze is directed to a second notification of the plurality of second representations of respective notifications, in response to detecting a user input (e.g., while the user is gazing at the second notification), the second notification is selected (e.g., and, in response to the selection, the second notification is displayed in the third state and/or an application associated with the second notification is opened.) Providing the user with an option to select, using a gesture, a notification from a plurality of notifications that are displayed in a second state, provides additional controls for the user without requiring the user to navigate through complex menu hierarchies, thereby reducing the number of inputs required by the user to perform an operation.

In some embodiments, in response to the user input selecting the third notification from the plurality of second representations of respective notifications, the computer system displays a third representation of the third notification and ceases display of the plurality of second representations of the respective notifications (e.g., without displaying third representations of the other notifications that were not selected from the plurality of second representations of the respective notifications) (e.g., as described with reference to FIGS. 7I-7L). For example, if there are representations of multiple notifications displayed in FIG. 7I, and the computer system detects an input directed to a particular notification of the multiple notifications and displays the particular notification in the third state (e.g., representation of alert 704-5, FIG. 7K) without continuing to display the representations of the multiple notifications. Automatically updating display of a notification from a second state to a third state in response to the user selecting the notification, using a gesture, from a plurality of notifications that are displayed in a second state, provides real-time visual feedback as the user interacts with a selected notification from a plurality of notifications, thereby providing improved visual feedback to the user.

In some embodiments, in accordance with a determination that a plurality of second representations of respective notifications (e.g., including the second representation of the first notification) are displayed, the computer system detects a hand of the user being moved to meet respective criteria, and while detecting that the hand of the user is moved to meet the respective criteria, in response to determining that the user satisfies second attention criteria (e.g., gaze criteria that is met when the user is gazing at the fourth notification) (e.g., wherein the second attention criteria is distinct from the attention criteria) (e.g., the second attention criteria is only met while the hand of the user is moved to meet the respective criteria (e.g., while the user's hand is raised)) with respect to a fourth notification from the plurality of second representations of the respective notifications, visually emphasizing (e.g., enlarging, highlighting, and/or outlining) the fourth notification relative to the other second representations of the respective notifications from the plurality of representations of the respective notifications, as described with reference to FIGS. 7I-7L (e.g., if there are representations of multiple notifications displayed in FIG. 7I, and the user's hand 7020 is raised, and the user gaze is directed to a particular notification in the multiple notifications, the particular notification is enlarged relative to the other displayed notifications). Automatically updating display of a notification to be enlarged or otherwise emphasized relative to other displayed notifications, in response to the user gazing at the notification (e.g., in conjunction with the user performing a gesture (e.g., with their hand)), provides visual feedback that indicates to the user, in real time, which notification the user currently has selected from a plurality of displayed notifications, thereby providing improved visual feedback to the user.

In some embodiments, in accordance with a determination that the respective representation of the first notification is the third representation of the first notification, the computer system displays an option to dismiss the respective representation of the first notification, as described with reference to FIGS. 7I-7L (e.g., the representation of the alert 704-5 in the third state includes a selectable affordance to dismiss the alert). In some embodiments, the option to dismiss is selected by the user in response to detecting a selection gesture such as a pinch or tap gesture while gaze of the user is directed to the option to dismiss. In some embodiments, in response to the user selecting the option to dismiss, the computer system ceases to display any of the respective representations of the first notification (e.g., the first representation, the second representation, and the third representation of the first notification are no longer displayed). Displaying a notification in a third state that includes an option to dismiss the notification, allows the user to interact with the notification in more ways than the user could interact with the notification before the user viewed the notification in the third state, thereby providing additional control options without cluttering the user's view.

In some embodiments, displaying the first representation of the first notification in the first view of the three-dimensional environment comprises (e.g., initially) displaying the first representation of the first notification at a position in the three-dimensional environment that has a first spatial relationship to a portion of the body of the user (e.g., the user's hand). For example, as described with reference to FIGS. 7I-7L, in some embodiments the representation of the alert 704-1 is displayed near the user's hand (e.g., in the user's palm, or above the back of the user's hand) while the user's hand is in the current view of the three-dimensional environment. Automatically displaying a notification at an initial position near the user's hand in the three-dimensional environment, when the computing device receives a new notification, without requiring the user to navigate through complex menu hierarchies to view the notification, reduces the number of inputs needed to perform an operation.

In some embodiments, the computer system concurrently displays the first representation of the first notification at the position in the first view of the three-dimensional environment that has the first spatial relationship to the portion of the body of the user and outputs an audio indication (e.g., a spatial audio output) at a simulated location in the three-dimensional environment that corresponds to a location of the portion of the body of the user. For example a spatial audio output sounds like it is coming from the user's hand, as described with reference to FIGS. 7I-7L. In some embodiments, the audio indication is generated in response to receiving the first notification (e.g., the display of the representation of the first notification and the audio indication are performed concurrently). In some embodiments, the representation of the first notification is displayed before the audio indication (e.g., the audio indication is output after a threshold time period if the user has not looked at the representation of the notification). Automatically playing a spatial audio notification sound that is simulated as coming from an initial displayed position of the notification (e.g., near the user's hand) in the three-dimensional environment, even as the position of the notification moves (e.g., as the user's hand moves) in the three-dimensional environment, provides real-time audio and visual feedback to the user when the computing device receives a new notification, thereby providing improved audio and visual feedback to the user.

Existing stereo and mono audio output modes provide audio with respect to a frame of reference that is tied to the audio output devices. For stationary audio output devices, the sound appears to originate from the locations of the audio output devices in the physical environment, irrespective of movement of the user in the physical environment and irrespective to the changes in the visual content of the computer-generated experience (e.g., changes due to movement of virtual sound sources and/or movement of the viewpoint, etc. in the three-dimensional environment of the computer-generated experience). For wearable audio output devices that stay stationary relative to a portion of the user's body (e.g., ears, head, or torso), the sound appears to be locked relative to the portion of the user's body, irrespective of the changes in the visual content of the computer-generated experience (e.g., changes due to movement of the virtual sound sources, changes due to movement of the viewpoint (e.g., movement of the viewpoint caused by a locomotion request by the user or computer system, and not caused by and does not correspond to the movement of the portion of the user's body), in the three-dimensional environment of the computer-generated experience. In some cases, the audio output devices and the display generation component of the computer system are separately housed and may move relative to each other in the physical environment during the presentation of computer-generated content via the audio output devices and the display generation component. In such cases, the sound still appears to originate from the audio output devices, irrespective the location of the display generation component in the physical environment, or the changes in the visual content of the computer-generated experience (e.g., changes due to movement of a virtual sound source (e.g., the representations of the notification, in this case) and/or movement of the viewpoint (e.g., movement caused by a locomotion request in the displayed environment, or in response to and in accordance with movement of the user or a portion thereof in the physical environment), in the three-dimensional environment of the computer-generated experience). In general, stereo and mono audio output modes provide a less realistic and less immersive listening experience than a spatial audio output mode, when the audio content of a computer-generated experience is provided to the user using the stereo audio output mode or the mono audio output mode.

In some embodiments, the spatial audio output mode simulates a more realistic listening experience in which audio seems to come from sources of sound in a separate frame of reference, such as the three-dimensional environment displayed via the display generation component (e.g., an augmented reality environment, a virtual reality environment, or a pure pass-through view of the physical environment surrounding the user) and in which the positioning of simulated sources of sound (e.g., the representations of the notification, in this example) is decoupled from the location and movement of the audio output devices in the physical environment.

In some embodiments, the frame of reference is a frame of reference based on a physical environment represented in a computer-generated experience that is provided via the display generation component of the computer system. In some embodiments, where the frame of reference is based on a physical environment (e.g., when the computer-generated experience is an augmented reality experience based on the physical environment, or a pass-through view of the physical environment), the one or more perceived sound sources have respective spatial locations in the physical environment. For example, in some embodiments, the computer-generated experience includes visual counterparts of the perceived sound sources (e.g., virtual objects that generated the sounds in the computer-generated experience, such as the representation of the notification in the above example) that have respective positions that correspond to the respective spatial locations in the physical environment (e.g., the locations of the user's hand in the physical environment). In some embodiments, the computer-generated experiences include sounds without a visual counterpart (e.g., remote or hidden virtual objects that generated the sounds in the computer-generated experience, virtual wind, sound effect, or external narrator) (e.g., the representation of the notification before the representation of the notification enter into the field of view of the user) but have origins corresponding to respective spatial locations in the physical environment. In some embodiments, as the audio output device(s) move about the physical environment, the audio output from the audio output device(s) is adjusted so that the audio continues to sound as though it is coming from the one or more perceived sound sources at the respective spatial locations in the physical environment (e.g., as the user walks around with the audio output device on his head, or with the audio output device in the physical environment away from his/her person, the sound continue to appear to come from the location of the user's hand, or continue to come from the location that is in the peripheral portion of the user's field of view). Where the one or more perceived sound sources are moving sources that move through a sequence of spatial locations about the physical environment (e.g., as the user's hand moves relative to his/her body while the user is stationary or walks around, the sound continue to appear to come from the location of the user's hand when the representation of the notification is displayed at or near a position that corresponds to the location of the user's hand), the audio output from the audio output device(s) is adjusted so that the audio continues to sound as though it is coming from the one or more perceived sound sources at the sequence of spatial locations in the physical environment. Such adjustment for moving sound sources also takes into account any movement of audio output device(s) relative to the physical environment (e.g., if the audio output device(s) move relative to the physical environment along an analogous path as the moving source of sound so as to maintain a constant spatial relationship with the source of sound, the audio would be output so that the sound does not appear to move relative to audio output device(s)). In some embodiments, when the audio content is output using spatial audio output mode and a frame of reference based on the physical environment represented in the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference based on the physical environment represented in the computer-generated experience.

In some embodiments, the frame of reference for the spatial audio output mode is fixed to an electronic device, such as a display generation component, that is outputting visual content corresponding to the audio content that is being output via the audio output device (e.g., the sound follows the display generation component). For example, locations of the simulated sources of the audio in a physical environment move corresponding to movement of the display generation component in the physical environment (e.g., when the representation of the notification is displayed in the peripheral portion of the field of view provided by an HMD), but not corresponding to the movement of the audio output device in the physical environment. For example, in some embodiments, the display generation component is a head-mounted display device, or a hand-held display device, while the audio output devices are placed in the physical environment and do not follow the movement of the user. In some embodiments, the frame of reference of the spatial audio effect is fixed to the display generation component and indirectly to the user, as the display generation component and the user move around the physical environment, relative to the audio output device(s). In some embodiments, when the audio content is output using spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view.

In some embodiments, the three-dimensional environment in which the respective representation of the first notification is displayed is an augmented reality or virtual reality (AR/VR) three-dimensional environment, as described with reference to FIGS. 7A-7B and 7I-7L. For example, representations of respective notifications and applications and/or application windows (e.g., opened from the respective notifications) are displayed in an AR/VR environment (e.g., the alerts (e.g., notifications) described herein with reference to methods 800, 900, 1000, 1100, and 1200 are displayed in a three-dimensional environment that is an AR/VR three-dimensional environment). Automatically displaying notifications and other virtual objects in an AR/VR environment as notifications are received, provides real-time visual feedback to the user while the user is interacting with the three-dimensional environment, such that the user is enabled to view new notifications in real-time without interrupting the user's session in the AR/VR environment, thereby providing improved visual feedback to the user.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, 1100, and 1200) are also applicable in an analogous manner to method 900 described above with respect to FIG. 9. For example, the gestures, gaze inputs, physical objects, user interface objects, controls, movements, criteria, three-dimensional environment, display generation component, surface, representation of physical object, virtual objects, and/or animations described above with reference to method 900 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 800, 1000, 1100, and 1200). For brevity, these details are not repeated here.

Figure 10:
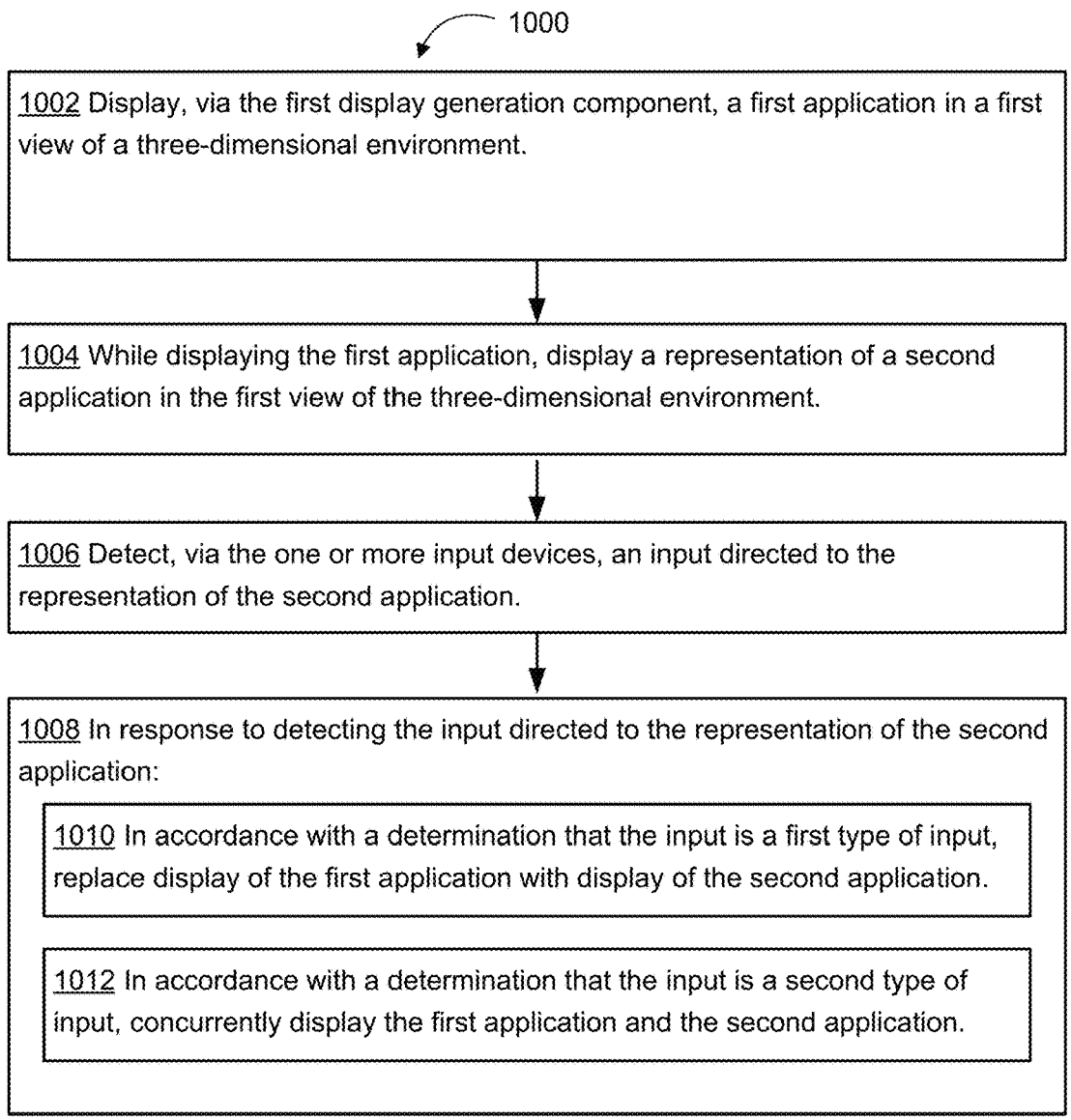
FIG. 10 is a flowchart of a method of determining whether to open an application to replace display of a currently displayed application window in a three-dimensional environment, or to open the application to be concurrently displayed with the currently displayed application window, in accordance with some embodiments.

FIG. 10 is a flowchart of a method of determining whether to open an application to replace display of a currently displayed application window in a three-dimensional environment, or to open the application to be concurrently displayed with the currently displayed application window, in accordance with some embodiments.

In some embodiments, the method 1000 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, optionally, one or more input devices (e.g., a camera (e.g., cameras, color sensors, infrared sensors, and/or other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, the method 1000 is performed at a computer system (e.g., the computer system 101 in FIG. 1, the computer system 101 described with respect to FIGS. 7A-7AE). In some embodiments, the computer system is in communication with a first display generation component (e.g., the first display generation component is a heads-up display, a head-mounted display (HMD), a display, a touchscreen, and/or a projector) and one or more input devices (e.g., cameras, controllers, touch-sensitive surfaces, joysticks, buttons, gloves, watches, motion sensors, and/or orientation sensors). In some embodiments, the first display generation component is a first display generation component 7100 described with respect to FIGS. 7A-7AE. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the first display generation component and/or the one or more input devices. In some embodiments, the first display generation component and the one or more input devices are integrated and enclosed in the same housing. Many of the features of the method 1000 are described with respect to FIGS. 7M-7O, in accordance with some embodiments.

The method 1000 relates to displaying an application icon, such as for a notification, and determining, based on different gestures that the user is enabled to perform, whether to open an application associated with the application icon to replace display of a currently displayed application window in a three-dimensional environment, or to open the application associated with the application icon to be concurrently displayed (e.g., side-by-side) with the already displayed application window in the three-dimensional environment. Automatically determining, based on a type of gesture from the user, where to display an application associated with an application icon in response to the user's gesture, such that the user does not need to manually adjust a position of the displayed application, provides additional control options to the user without cluttering the user's view with additional displayed controls, and enables an operation to be performed automatically when a set of conditions has been met without requiring further user input.

Performing an operation when a set of conditions has been met enhances the operability of the system and makes the user-system interface more efficient (e.g., by helping the user to provide proper inputs and reducing user mistakes when operating/interacting with the system, and furthermore avoiding the need to perform additional actions, e.g., so as to navigate menus, to access features or options for interacting with the system) which, additionally, reduces power usage and improves battery life of the system by enabling the user to use the system more quickly and efficiently.

In performing the method 1000, the computer system displays (1002), via the first display generation component, a first application in a first view of a three-dimensional environment. In some embodiments, a respective characteristic position of the first application in the three-dimensional environment has a first spatial relationship to a first anchor position in the three-dimensional environment (e.g., the application is anchored to the three-dimensional environment). In some embodiments, "displaying a respective application" as used herein includes displaying a user interface of the respective application.

While displaying the first application, the computer system displays (1004) a representation of a second application in the first view of the three-dimensional environment. In some embodiments, the representation of the second application (e.g., representation 705, FIG. 7M) at least partially overlaps the view of the first application.

The computer system detects (1006), via the one or more input devices, an input directed to the representation of the second application (e.g., application icon 705, as described with reference to FIG. 7M).

In response to detecting the input (1008) directed to the representation of the second application, in accordance with a determination that the input is a first type of input (e.g., a first gesture (e.g., a first air gesture)), the computer system replaces display (1010) of the first application with display of the second application (e.g., as described with reference to FIGS. 7M-7N), and, in accordance with a determination that the input is a second type of input (e.g., a second gesture (e.g., a second air gesture)), the computer system concurrently displays (1012) the first application and the second application (e.g., as described with reference to FIGS. 7M and 7O, the first application window 703 is concurrently displayed with the second application window 706).

In some embodiments, the representation of the second application comprises an application icon in a set of application icons. For example, as described with reference to FIG. 7M, the application icon is an application icon within an application dock or a set of application icons displayed in an array or menu within a home display. Automatically displaying a set of application icons for a plurality of applications, including for the second application, while displaying a current view of a first application, provides real-time visual feedback such that the application icons are within the user's view while the user is viewing the first application, and allows the user to interact with the application icons within the user's current view without navigating through complex menu hierarchies, thereby providing improved visual feedback to the user without requiring additional user input.

In some embodiments, the representation of the second application comprises a notification corresponding to the second application. For example, as described with reference to FIG. 7M, the application icon (e.g., application icon 705) is a notification (e.g., a representation of an alert 704-1). Automatically displaying a notification for the second application, while displaying a current view of a first application, provides real-time visual feedback such that the notification for the second application is displayed even while the user is currently viewing the first application, and allows the user to interact with the notification for the second application without navigating through complex menu hierarchies, thereby providing improved visual feedback to the user without requiring additional user input.

In some embodiments, in response to detecting the input directed to the representation of the second application, the computer system displays the second application in a state that corresponds to the notification. For example, as described above with reference to FIGS. 7M-7O, instead of launching the application in a home state, the application is opened to a window that includes content associated with the notification (e.g., in FIGS. 7N and 7O, the application window 706 displays content that is related to the notification). Automatically displaying the second application, in response to the user selecting the notification for the second application, in a view that includes content that corresponds to the notification, without requiring the user to navigate within the second application before viewing the content related to the notification, allows the user to view content related to a notification directly from selecting the notification without additional user input, thereby reducing the number of inputs needed to perform an operation.

In some embodiments, the first type of input comprises a pinch input. For example, as explained above with reference to FIGS. 7M-7O, the first type of input (e.g., performed with the user's hand 7020, directed to the application icon 705 in FIG. 7M) is a pinch gesture that includes movement of two or more fingers of a hand to make contact with one another, or to break contact from each other. For example, performing a pinch input on the representation of the second application (e.g., without detecting movement of the user's hand (e.g., without detecting a drag input)) causes the computer system to automatically, without additional user input, replace display of the application window for the first application with display of the second application. Detecting the user performing a pinch input, differentiating the user's pinch input from another type of gesture (e.g., a pinch and drag input), and replacing display of a currently displayed application with the second application in response to the pinch input, allows the user to control display of the second application (e.g., in a plurality of different ways) based on the type of the user's input (e.g., gesture), without explicitly displaying separate controls for displaying the second application, thereby providing additional control options without cluttering the user's view with additional displayed controls.

In some embodiments, the second type of input comprises a pinch and drag input. For example, as explained above with reference to FIGS. 7M-7O, the user pinches the application icon 705 in FIG. 7M and drags the application icon 705 to a position next to the application window 703, and the computer system displays the application window 706 at the position determined from the end of the user's drag gesture. For example, a pinch and drag input includes: a pinch gesture that includes movement of two or more fingers of a hand to make contact with one another, or to break contact from each other, in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). For example, the pinch input selects the representation of the second application (e.g., the representation of the second application, also referred to as an application icon), and the user is enabled to, once selected, move the second application within the three-dimensional environment in accordance with the drag gesture. In some embodiments, after the representation of the second application is pinched, the representation of the second application is displayed as an application window of the second application (e.g., displayed as a thumbnail view of the application window), and while the user is dragging the second application, the user is dragging the displayed application window of the second application. In some embodiments, while the user is dragging the second application, the second application continues to be displayed as an application icon of the second application (e.g., and the application window is displayed in accordance with the end of the drag input). For example, the user drags the second application to a position that is next to the currently displayed application window for the first application). In some embodiments, the pinch input and the drag input is performed by the same hand (e.g., the user pinches two or more fingers to make contact with one another and moves the same hand to the second position with the drag gesture). In some embodiments, the pinch input is performed by a first hand of the user and the drag input is performed by the second hand of the user (e.g., the user's first hand pinches the second application, and the user's second hand moves from one location to another location while the user continues pinching the second application). Detecting the user performing a pinch and drag input, differentiating the user's pinch and drag input from another type of gesture (e.g., a pinch input), and displaying the second application concurrently with a currently displayed application in response to the pinch and drag input, allows the user to control display of the second application (e.g., in a plurality of different ways) based on the type of the user's input (e.g., gesture), without explicitly displaying separate controls for displaying the second application, thereby providing additional control options without cluttering the user's view with additional displayed controls.

In some embodiments, while detecting the drag input, the computer system detects movement of the hand of the user, and the computer system moves the second application in accordance with the movement of the hand of the user (e.g., in the same direction and/or at a proportional rate). For example, as the user drags the second application (e.g., or drags the application icon 705 associated with the second application), the second application is displayed at a plurality of positions in the three-dimensional environment in accordance with that user's hand moving during the drag input (e.g., as if the second application is following the user's hand as the user moves the user's hand during the drag input). For example, in updating the display from FIG. 7M to FIG. 7O, the application window 706 (e.g., or the application icon 705) is displayed as moving in the three-dimensional environment into its position in FIG. 7O in accordance with the user's drag input (e.g., the user selects the application icon 705, and either (i) the application window 706 (e.g., a thumbnail or representation of the application window)(e.g., which is opened to replace display of the application icon 705), or (ii) the application icon 705, moves in accordance with the speed and direction of the user's drag gesture (e.g., down and to the right)). Automatically updating display of the second application to move within the three-dimensional environment according to the movement of the user's hand (e.g., during a drag input), provides real-time visual feedback as the user moves the user's hand within the three-dimensional environment, thereby providing improved visual feedback to the user.

In some embodiments, replacing display of the first application with display of the second application includes snapping the second application to a position in the three-dimensional environment corresponding to the position of the first application in the three-dimensional environment, as described with reference to FIGS. 7M-7O (e.g., the application window 706 in FIG. 7N is snapped to a same position as application window 703 in FIG. 7M in response to a pinch input directed to application icon 705). In some embodiments, the position at which the second application is automatically (e.g., without additional user input (e.g., after the pinch input)), is determined by: aligning a center of the second application to a center (e.g., or center portion) of the displayed first application, aligning a corner of the second application to a corresponding corner (e.g., the top right corner of the second application is aligned with the top right corner of the first application), aligning an edge of the second application to a corresponding edge (e.g., the left edge of the second application is aligned with a left edge of the first application), displaying the second application at a depth (e.g., a perceived distance away from the user) at which the first application is displayed (e.g., such that the second application appears at a same position relative to the user in the three-dimensional environment that the first application was displayed). In some embodiments, replacing display of the first application with display of the second application includes ceasing to display the first application, and displaying the second application in a same position as the first application was displayed (e.g., as if the second application covers the first application). In some embodiments, replacing display of the first application with display of the second application includes ceasing to display the first application, and displaying the second application in a different position than the position at which the first application was displayed (e.g., the first application is no longer displayed, and the second application is automatically displayed at a different position in the three-dimensional environment (e.g., the second application is a different size and is displayed at a different position, determined by any of the methods described above). Automatically snapping the second application to a position of the currently displayed application in response to a user input (e.g., a pinch input), allows the user to view the second application at the snapped position, without requiring the user to carefully align the second application with the currently displayed application, thereby enabling an operation to be performed when a set of conditions has been met without requiring further user input.

In some embodiments, while displaying the first application, the computer system displays a representation of a third application in the three-dimensional environment, the representation of the third application comprising a notification for the third application. In some embodiments, in response to a third type of input (e.g., a third air gesture) directed to the notification for the third application, the computer system displays content for the notification for the third application without dismissing the first application, as described with reference to FIGS. 7M-7O (e.g., application icon 705 is a notification for the third application). In some embodiments, the third type of input opens the notification at least partially overlapping the first application without ceasing display of the first application (e.g., in FIG. 7O, instead of displaying application window 706 associated with the third application next to the application window 703 (e.g., or replacing display of the application window 703), the application window 706 is displayed partially overlapping the application window 703 (e.g., while continuing to display application window 703 (e.g., behind the application window 706)). Automatically displaying a notification for a third application and, in response to a user input to open the notification for the third application, opening the third application without dismissing a currently displayed application that is displayed while receiving the user input to open the notification for the application, provides real-time visual feedback in response to the user requesting to open the third application, such that the user can view the third application without interrupting the user's current view (e.g., without closing out of the currently displayed application), and reduces the number of inputs from the user such that the user does not need to navigate back to the currently displayed application (e.g., after viewing the third application) thereby providing improved visual feedback to the user and reducing the number of inputs needed to perform an operation.

In some embodiments, the third application comprises a messaging application (e.g., an instant messaging application, an email application, or another communication application, as described above with reference to FIGS. 7M-7O, the application icon 705 is an icon of a messaging application). Automatically displaying a notification for a messaging application and, in response to a user input to open the notification for the messaging application, opening the messaging application without dismissing a currently displayed application that is displayed while receiving the user input to open the notification for the messaging application, provides real-time visual feedback in response to the user requesting to open the messaging application, such that the user can view the messaging application (e.g., and perform one or more operations) without interrupting the user's current view (e.g., without closing out of the currently displayed application) and reduces the number of inputs from the user such that the user does not need to navigate back to the currently displayed application (e.g., after viewing the messaging application), thereby providing improved visual feedback to the user and reducing the number of inputs needed to perform an operation.

In some embodiments, while displaying the representation of the second application in a first display state, the computer system detects attention of the user directed to the representation in the first display state (e.g., a representation of an alert 704-1 displayed in a first state and/or a representation of an alert 704-4 displayed in a second state, as described with reference to FIGS. 7D and 7I-7L). For example, the representation of the second application is initially displayed in a first state (e.g., an initial notification state) (e.g., wherein the first state comprises an application icon for the second application). In some embodiments, the first display state comprises a "short look" state (e.g., the second state of the alert 704-4, described above) (e.g., before the "short look" is updated to a second, "long look", state (e.g., the representation of the second application displayed in the third state) after the user has paid attention to the representation of the second application for a threshold amount of time). In some embodiments, in accordance with a determination that the attention of the user directed to the representation in the first display state satisfies attention criteria with respect to the representation of the second application, updating display of the representation of the second application to a second display state (e.g., a "long look" state that is distinct from the first display state), wherein the second display state includes a user-selectable option to display the second application. In some embodiments, the input (e.g., air gesture) directed to the representation of the second application comprises an input selecting the option to display the second application. In some embodiments, the attention criteria include a gaze criterion in which the user looks at the representation for at least a threshold amount of time. In some embodiments, in accordance with a determination that the attention of the user directed to the representation in the first display state does not satisfy the attention criteria with respect to the representation of the second application, the user-selectable option to display the second application is not displayed (e.g., the user-selectable option is not displayed in the first display state). Displaying a notification in a second state that includes one or more selectable options, such as an option to open an application related to the notification, without displaying the one or more selectable options while displaying the notification in a first state, allows the user to interact with the notification in more ways while the notification is displayed in the second state than the user could interact with the notification before the notification is displayed in the second state, thereby providing additional control options without cluttering the user's view.

In some embodiments, the three-dimensional environment in which the first application and the representation of the second application are displayed is an augmented reality or virtual reality (AR/VR) three-dimensional environment, as described with reference to FIGS. 7A-7B and 7M-7O. In some embodiments, the three-dimensional environment is a mixed reality environment in which features of the physical environment of the user are enabled to be displayed as pass-through content in the three-dimensional environment and are concurrently displayed with one or more virtual objects/virtual applications. In some embodiments, the three-dimensional environment is a virtual reality environment that does not display pass-through content (e.g., all of the objects are virtual). Automatically displaying notifications and other virtual objects in an AR/VR environment as notifications are received, provides real-time visual feedback to the user while the user is interacting with the three-dimensional environment, such that the user is enabled to view new notifications in real-time without interrupting the user's session in the AR/VR environment, thereby providing improved visual feedback to the user.

In some embodiments, while displaying the representation of the second application, the computer system displays representations of one or more additional applications. In some embodiments, in response to detecting an input (e.g., air gesture) selecting a representation for a fourth application of the one or more additional applications, the computer system displays an application window corresponding to the fourth application. For example, while displaying the application icon 705 in FIG. 7M, the computer system displays additional application icons, that the user can select to open additional application windows (e.g., and another application window is enabled to be displayed corresponding to the selected application icon (e.g., application window 703, FIG. 7N)). In some embodiments, the input is a pinch and drag input (e.g., performed as air gestures), as described above with reference to FIGS. 7M-7O (e.g., a pinch gesture that includes movement of two or more fingers of a hand to make contact with one another, or to break contact from each other, in conjunction with (e.g., followed by) a drag input that changes a position of the user's hand from a first position (e.g., a start position of the drag) to a second position (e.g., an end position of the drag)). In some embodiments, the user maintains the pinch gesture while performing the drag input, and releases the pinch gesture (e.g., opens their two or more fingers) to end the drag gesture (e.g., at the second position). For example, the pinch input selects the representation of the fourth application (e.g., while the user is gazing at the representation of the fourth application, the user performs the pinch input), and the user is enabled to, once selected (e.g., pinched), move the fourth application within the three-dimensional environment in accordance with the drag gesture. For example, the user drags the fourth application to a position in the three-dimensional environment, and in response to the user releasing the pinch (e.g., at the end of the drag gesture) at the second position, the fourth application is displayed at the position (e.g., with a center portion of the fourth application window at the second position in which the drag ended). In some embodiments, the pinch input and the drag input is performed by the same hand (e.g., the user pinches two or more fingers to make contact with one another and moves the same hand to the second position with the drag gesture). In some embodiments, the pinch input is performed by a first hand of the user and the drag input is performed by the second hand of the user (e.g., the user's first hand pinches the fourth application, and the user's second hand moves from one location to another location while the user continues pinching the fourth application). Automatically detecting the user performing a pinch and drag input directed to a representation of an application selected from a plurality of currently displayed representations of applications, and automatically displaying the selected application as a new application window in the three-dimensional space, in response to the pinch and drag input, provides real-time visual feedback as the user performs a predefined gesture directed to a particular representation of an application, thereby providing improved visual feedback to the user.

In some embodiments, while displaying the application window corresponding to fourth application, the computer system maintains display of the representation of the second application and the representations of the one or more additional applications that were not selected (e.g., the one or more additional applications without the representation of the fourth application, as described with reference to FIGS. 7M-7O (e.g., in FIG. 7O, while displaying the application windows, application icon(s) (e.g., application icon 705) continues to be displayed)). Automatically maintaining display of a plurality of representations of applications while concurrently displaying a selected application in a new application window in the three-dimensional space, without ceasing to display the representations of the applications that were not selected, provides real-time visual feedback as the user selects to open a particular representation of an application from a plurality of displayed representations of applications, and enables the user to quickly access the other displayed plurality of representations of applications after the user has selected the particular application, without requiring the user to navigate to another view in order to access the other displayed plurality of representations of applications, thereby providing improved visual feedback to the user and reducing the number of inputs needed to perform an operation.

In some embodiments, in response to receiving an input selecting a representation for a fifth application of the one or more additional applications, the computer system displays an application window corresponding to the fifth application (e.g., while maintaining display of the application window corresponding to the fourth application). For example, the representations of the applications (e.g., notifications) of the one or more additional applications are selectable to open new application windows, as described with reference to FIGS. 7M-7O. For example, while displaying the application icon 705 in FIG. 7M, the computer system displays additional application icons, that the user can select to open additional application windows (e.g., and additional application window(s) are enabled to be displayed concurrently with application windows 703 and 706 in FIG. 7O). Detecting a user input, such as a drag input, directed to another representation of an application selected from a plurality of currently displayed representations of applications, and displaying the selected application as a new application window in the three-dimensional space in response to the user input, allows the user to control display of a plurality of different applications by performing a gesture directed to a currently displayed representation for a respective application, without displaying selectable options for controlling display of each of the applications, thereby providing additional control options without cluttering the user's view with additional displayed controls.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1100, and 1200) are also applicable in an analogous manner to method 1000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 1000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 800, 900, 1100 and 1200). For brevity, these details are not repeated here.

The operations described above with reference to FIGS. 8, 9, 10, 11 and 12 are, optionally, implemented by components depicted in FIGS. 1-6. In some embodiments, aspects/operations of methods 800, 900, 1000, 1100, and 1200 may be interchanged, substituted, and/or added between these methods. For brevity, these details are not repeated here.

Figure 11:
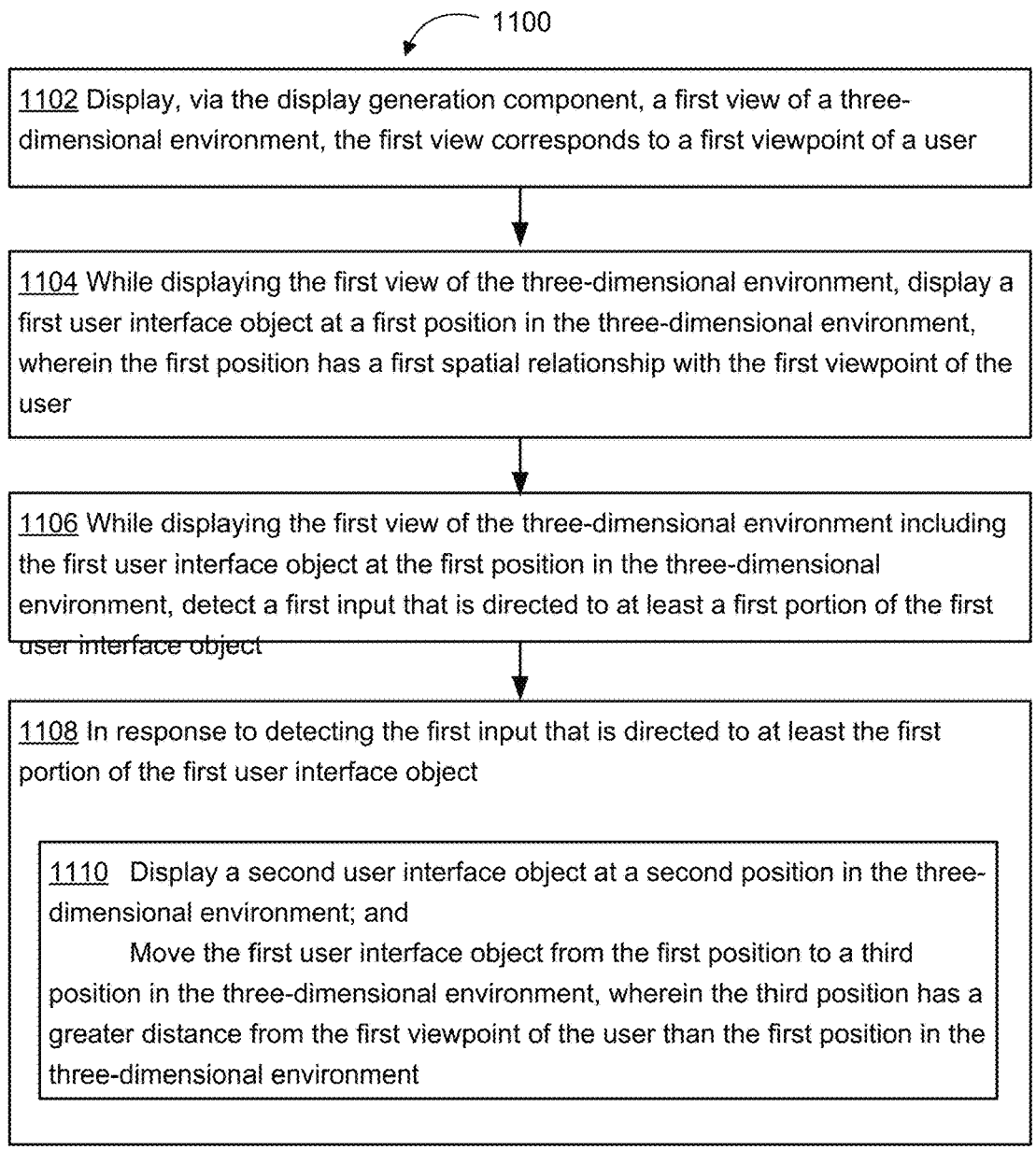
FIG. 11 is a flowchart of a method of navigating through a first user interface object to a second user interface object, in accordance with some embodiments.

FIG. 11 is a flowchart of a method 1100 of navigating through a first user interface object to a second user interface object, in accordance with some embodiments. In some embodiments, when navigating from the first user interface object to the second user interface object, the first user interface object is pushed farther away from the viewpoint of the user, and the second user interface object is displayed in front of the first user interface object at an appropriate distance from the viewpoint of the user, such as at the original position of the first user interface object. Displaying the second user interface object at a second position in the three-dimensional environment and moving a first user interface object from a first position to a third position having a greater distance from the first viewpoint than the first position, in response to detecting the first user input that is an input meeting at least a first input threshold, automatically displays the second user interface object and the first user interface object at appropriate locations without requiring further user input (e.g., further user inputs to move the first user interface object and/or to move the second user interface object).

In some embodiments, the method 1100 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, optionally, one or more input devices (e.g., a camera (e.g., cameras, color sensors, infrared sensors, and/or other depth-sensing cameras) that points downward at a user's hand or a camera that points forward from the user's head). In some embodiments, the method 1100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1100 are, optionally, combined and/or the order of some operations is, optionally, changed.

In some embodiments, the method 1100 is performed at a computer system including or in communication with a display generation component (e.g., a heads-up display, a head-mounted display (HMD), a display, a touchscreen, a projector, a tablet, and/or a smartphone) and one or more input devices (e.g., cameras, controllers, touch-sensitive surfaces, joysticks, and/or buttons). In some embodiments, the first display generation component is a first display generation component 7100 described with respect to FIGS. 7A-7AE. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, or a laptop computer) that includes one or more processors and memory that is separate from the first display generation component and/or the one or more input devices. In some embodiments, the first display generation component and the one or more input devices are integrated and enclosed in the same housing. Many of the features of the method 1100 are described with respect to FIGS. 7P-7W, in accordance with some embodiments.

In performing the method 1100, the computer system displays (1102), via the display generation component, a first view of a three-dimensional environment, the first view corresponds to a first viewpoint of a user. While displaying the first view of the three-dimensional environment, the computer system displays (1104) a first user interface object at a first position in the three-dimensional environment, wherein the first position has a first spatial relationship with the first viewpoint of the user. For example, in some embodiments, the first user interface object is an interactive user interface element (e.g., a button, an icon, a hyperlink, a control, or another type of interactive user interface element) that is separate from another interactive user interface object. In some embodiments, the first user interface object includes multiple interactive user interface elements on a common background platter. FIG. 7R illustrates display of a first user interface object 708 at a first position in the three-dimensional environment 7000', where the first position has a first spatial relationship with the first viewpoint of the user (e.g., at a first distance away from the first viewpoint, and facing toward the first viewpoint), in accordance with some embodiments. While displaying the first view of the three-dimensional environment including the first user interface object at the first position in the three-dimensional environment (e.g., while the first viewpoint of the user remains stationary or substantially stationary in the three-dimensional environment), the computer system detects (1106) a first input that is directed to at least a first portion of the first user interface object (e.g., gaze input 707 detected in conjunction with gesture input 718, as shown in FIG. 7Q). In response to detecting the first input that is directed to at least the first portion of the first user interface object (e.g., while the first viewpoint of the user remains stationary or substantially stationary in the three-dimensional environment) (e.g., in accordance with a determination that the first input meets first criteria (e.g., the first input is a pinch gesture in conjunction with a gaze or focus selector at the first portion of the first user interface object, or the first input is a long pinch gesture in conjunction with a gaze or focus selector at the first portion of the first user interface object)) (1108): the computer system displays (1110) a second user interface object (e.g., a modal user interface that corresponds to the first user interface object or the portion of the first user interface object to which the first input was directed) at a second position in the three-dimensional environment (e.g., optionally, the second position has the first spatial relationship with the first viewpoint of the user); and the computer system moves the first user interface object from the first position to a third position in the three-dimensional environment, wherein the third position has a greater distance from the first viewpoint of the user than the first position in the three-dimensional environment. For example, in some embodiments, in response to the user's input directed to at least a portion of the first user interface object, as the first user interface object is moved farther away from viewpoint of the user while the viewpoint of the user remains stationary or substantially stationary in the three-dimensional environment, a new user interface object is displayed at the original position or depth of the first user interface object. For example, as shown in FIGS. 7Q-7R, in some embodiments, in response to the detection of the gaze input 707 directed to the user interface element 710-2 in the first user interface object 708 as shown in FIG. 7Q, the computer system displays a second user interface object 720 at a second position in the three-dimensional environment 7000' and moves the first user interface object 708 to a third position in the three dimensional environment, as shown in FIG. 7R, where the third position is farther away from the first viewpoint than the first position at which the first user interface object 708 was previously displayed. In some embodiments, while the first viewpoint of the user remains stationary or substantially in the three-dimensional environment, in contrast to the first user interface object, one or more stationary user interface objects that are also shown in the first view of the three-dimensional environment remain at their original positions in the three-dimensional environment and do not change their respective spatial relationships with the first viewpoint as a result of the first input. For example, the representation of the physical object 7014' and the virtual object 712 remained at their original positions in the three-dimensional environment and do not change their respective spatial relationships with the first viewpoint as a result of the user's input.

In some embodiments, moving the first user interface object from the first position to the third position in the three-dimensional environment changes a respective spatial relationship between the first user interface object and at least one other user interface object in the three-dimensional environment (e.g., a stationary user interface object in the three-dimensional environment, an object that is world locked, an object that is viewpoint locked). For example, in some embodiments, as illustrated in the FIGS. 7Q-7R, moving the first user interface object 708 from the first position (e.g., shown in FIG. 7Q) to the third position (e.g., shown in FIG. 7R) changes the spatial relationship between the first user interface object 708 with the virtual object 712, the representation 7008' of the floor 7008, the representation 7006' of the wall 7006, and the representation 7014' of the physical object 7014. Changing a respective spatial relationship between the first user interface object and at least one other user interface object in the three-dimensional environment provides improved visual feedback to the user (e.g., improved visual feedback that the second user interface is displayed at the second position in the three-dimensional environment).

In some embodiments, the first position and the second position have less than a threshold amount of difference in distance (e.g., have the same distance) from the first viewpoint of the user in the three-dimensional environment. For example, in some embodiments, in response to the first input, the computer system displays a new user interface corresponding to the first user interface object or the portion of the first user interface object to which the first input is directed, as the first user interface object recedes from the viewpoint of the user; and the new user interface object is displayed at the original viewing depth of the first user interface object (e.g., wholly or partially blocking the view of the first user interface object). For example, as shown in the inset 716 of FIG. 7R, the second user interface object 720 is displayed a position that is the same or substantially the same distance away from the first viewpoint as the original position of the first user interface object 708 (e.g., the position of the first user interface object 708 as shown in FIG. 7Q). Displaying the second user interface object at a second position that has the same or substantially the same distance from the first viewpoint of the user as the first position, causes the computer system to automatically display the second user interface object at the same or substantially the same distance from the first viewpoint as the first user interface object (prior to detecting the first input) without requiring further user input (e.g., a further user input to first move the first user interface to the third location, a further user input to display the second user interface object, and/or a further user input to move the second user interface object to the second location).

In some embodiments, the computer system detects (e.g., while the second user interface object is displayed at the second position and the first user interface object is displayed at the third position in the three-dimensional environment as the result of the first input) movement of the display generation component in a physical environment (e.g., the physical environment that is represented in the three-dimensional environment, or a physical environment of the user). In response to detecting the movement of the display generation component in the physical environment, the computer system replaces the first view of the three-dimensional environment with a second view of the three-dimensional environment, wherein the second view of the three-dimensional environment corresponds to a second viewpoint of the user, and a difference between the first viewpoint and the second viewpoint in the three-dimensional environment corresponds to the movement of the display generation component in the physical environment. In some embodiments, when the movement of the display generation component causes a movement of the viewpoint of the user in the three-dimensional environment, one or more stationary objects in the three-dimensional environment remain at their original positions in the three-dimensional environment and their respective spatial relationships to the viewpoint of the user are changed as a result of the movement of the display generation component. In response to detecting the movement of the display generation component, the computer system further moves the first user interface object and the second user interface object in the three-dimensional environment in accordance with the movement of the display generation component in the physical environment, while maintaining respective distances from the second viewpoint to the first user interface object and the second user interface object. In some embodiments, in contrast to stationary objects in the three-dimensional environment, when the movement of the display generation component causes a movement of the viewpoint of the user in the three-dimensional environment, the first user interface object and the second user interface object are anchored to the viewpoint of the user, and move in the three-dimensional environment in accordance with the movement of the viewpoint of the user in the three-dimensional environment, their respective spatial relationships to the viewpoint of the user remain substantially unchanged as a result of the movement of the display generation component. For example, in some embodiments, in FIG. 7T, the first user interface object 708 and the second user interface object 720 are displayed with respective distances from the first viewpoint of the user, and if the current viewpoint of the user changes to a second viewpoint based on movement of the user and/or the display generation component, the computer system updates the view of the three-dimensional environment to a second view that corresponds to the second viewpoint, and the computer system also moves the first user interface object 708 and the second user interface object 720 in the three-dimensional environment, such that the first user interface object and the second user interface object remain in the same portion of the field of view of the user and maintain their respective distances to the current viewpoint of the user. Replacing the first view of the three-dimensional environment with a second view of the three-dimensional environment, and moving the first user interface object and the second user interface object in accordance with the movement of the display generation component, causes the computer system to automatically move the first user interface object and the second user interface object (e.g., without the need for the user to perform additional inputs to manually move the first user interface object and the second user interface object to appropriate locations in the second view of the three-dimensional environment).

In some embodiments, the first input is an input that meets at least a first input threshold (e.g., having a duration that is longer than a first time threshold, and/or a distance threshold). In some embodiments, the first input is a first type of air gesture (e.g., a pinch gesture, a swipe gesture, or another type of air gesture) that meets an input threshold (e.g., a time threshold, and/or a distance threshold). In some embodiments, the first input is a long pinch air gesture. In some embodiments, the first input is a long tap air gesture. For example, in FIG. 7Q, the computer system detects a gesture 710 that is an input that meets at least a first input threshold (e.g., a time threshold, or a distance threshold), and the computer system displays the second user interface object 720 (FIG. 7Q) and pushes the first user interface object 708 farther away from the viewpoint of the user, in accordance with some embodiments. In some embodiments, the computer system generates other types of responses in response to other types of inputs directed to the portion of the first user interface object (e.g., dismisses the first user interface object from the first view in response to a flick gesture, and/or changes the position of the first user interface object in response to a pinch and drag gesture), without displaying the second user interface object or moving the first user interface object away from the viewpoint of the user. Displaying the second user interface object at the second position in the three-dimensional environment and moving the first user interface object from the first position to the third position having a greater distance from the first viewpoint than the first position, in response to detecting the first user input that is an input meeting at least a first input threshold, automatically displays the second user interface object and the first user interface object at appropriate locations without requiring further user input (e.g., further user inputs to move the first user interface object and/or to move the second user interface object).

In some embodiments, the first portion of the first user interface object is a first selectable object within the first user interface object and the first input is directed to the first selectable object (e.g., and not any other selectable object within the first user interface object), and the second user interface object emerges from a respective position of the first selectable object in the three-dimensional environment. For example, in some embodiments, the first portion of the first user interface object to which the first input is directed is a selectable button or menu option contained within the first user interface object; and in response to the first input selecting or activating the selectable button or menu option, the button or menu option is animated into a modal user interface that corresponds to the button or menu option and, optionally, displayed at the original position of the first user interface object, while the first user interface object recedes to at another position in the three-dimensional environment. For example, as illustrated in FIG. 7Q, the first portion of the first user interface object is a selectable user interface element 710-2, and the first input (e.g., gaze input 707 and gesture input 718) is directed to the selectable user interface element 710-2; and in response to detecting the first input directed to the selectable user interface element 710-2, the computer system displays the second user interface object 720 which emerges from a respective position of the selectable user interface element 710-2 in the three-dimensional environment, in accordance with some embodiments. Displaying the second user interface object emerging from a respective position of the first selectable object in the three-dimensional environment, provides improved visual feedback to the user (e.g., improved visual feedback that the second user interface object is being displayed, and improved visual feedback regarding the locations of the first user interface object and the second user interface object).

In some embodiments, in response to detecting the first input that is directed to at least the first portion of the first user interface object: the computer system changes one or more display properties of the first user interface object from a first set of values to a second set of values, in conjunction with moving the first user interface object from the first position to the third position in the three-dimensional environment. For example, in some embodiments, changing the one or more display properties of the first user interface objects includes blurring the first user interface object out, making the first user interface object more translucent, making the first user interface object less color saturated, and/or darkening the first user interface object relative to the second user interface object and/or the previous state of the first user interface object at the first position. For example, as illustrated in FIGS. 7Q-7R, in conjunction with moving the first user interface object 708 from the first position to the third position in the three-dimensional environment in response to detecting the gaze input 707 in conjunction with the gesture input 718, the computer system further changes the display properties of the first user interface object 708, such that the first user interface object 708 is displayed with a reduced visual prominence (e.g., dimmed, darkened, blurred, and/or made more translucent), in accordance with some embodiments. Changing one or more display properties of the first user interface object from a first set of values to a second set of values, in conjunction with moving the first user interface object from the first position to the third position in the three-dimensional environment, provides improved visual feedback to the user (e.g., improved visual feedback that the computer system has detected the movement of the display generation component).

In some embodiments, while the first user interface object is displayed at the third position in the three-dimensional environment, the computer system detects that attention of the user is directed to the first user interface object (e.g., detecting the user's gaze shifting from the second user interface object or another portion of the three-dimensional environment to the first user interface object, detecting a focus selector being moved to the first user interface object at the third position). In response to detecting that the attention of the user is directed to the first user interface object, the computer system restores the one or more display properties of the first user interface object from the second set of values to the first set of values. For example, in some embodiments, after the first user interface object is moved to the third position in conjunction with displaying the second user interface object, the computer system continues to display the first user interface object at the third position with reduced visual prominence relative to the second user interface object, e.g., by blurring, making more translucent, making less saturated, fading out, and/or darkening the first user interface object; and when the computer system detects that the user's gaze is shifted from the second user interface object or another portion of the three-dimensional environment back to the first user interface object, the computer system increases the visual prominence of the first user interface object by restoring the original clarity, opacity, color saturation, and/or luminance of the first user interface object. For example, as illustrated in FIGS. 7Q-7S, in response to detecting the user's gaze input 709 directed to the first user interface object 708 displayed at the third position, the computer system restores the visual appearance of the first user interface object 708 (in FIG. 7S) to that shown before the display of the second user interface object 720 (e.g., the appearance of the first user interface object 708 shown in FIG. 7Q), in accordance with some embodiments. Restoring the one or more display properties of the first user interface object from the second set of values to the first set of values, in response to detecting that the attention of the user is directed to the first user interface object, provides additional control options without needing to display additional controls (e.g., additional controls for changing the one or more display values of the first user interface object).

In some embodiments, in response to detecting that attention of the user is directed to the first user interface object (e.g., detecting the user's gaze shifting from the second user interface object or another portion of the three-dimensional environment to the first user interface object, or detecting a focus selector being moved to the first user interface object at the third position), the computer system changes one or more display properties of the second user interface object from a third set of values to a fourth set of values. For example, in some embodiments, after the first user interface object is moved to the third position in conjunction with displaying the second user interface object, the computer system continues to display the first user interface object at the third position with reduced visual prominence relative to the second user interface object, e.g., by blurring, making more translucent, making less saturated, fading out, and/or darkening the first user interface object; and when the computer system detects that the user's gaze is shifted from the second user interface object or another portion of the three-dimensional environment back to the first user interface object, the computer system increases the visual prominence of the first user interface object by restoring the original clarity, opacity, color saturation, and/or luminance of the first user interface object, and blurring out the second user interface object, making the second user interface object more translucent, less color saturated, and/or darkened. For example, as illustrated in FIGS. 7R-7S, in response to detecting the user's gaze input 709 directed to the first user interface object 708 displayed at the third position, the computer system changes the visual appearance of the second user interface object 720 (in FIG. 7S) such that the visual prominence of the second user interface object 720 is reduced (e.g., as compared to the appearance of the second user interface object 720 shown in FIG. 7R), in accordance with some embodiments. Changing one or more display properties of the second user interface object from a third set of values to a fourth set of values, in response to detecting that attention of the user is directed to the first user interface object, provides improved visual feedback to the user (e.g., improved visual feedback that the computer system has detected that the user's attention is directed to the first user interface object (e.g., and is no longer directed to the second user interface object)).

In some embodiments, in response to detecting that attention of the user is directed to the first user interface object (e.g., detecting the user's gaze shifting from the second user interface object or another portion of the three-dimensional environment to the first user interface object, and/or detecting a focus selector being moved to the first user interface object at the third position), the computer system restores an appearance of the first user interface object at the first position. For example, in some embodiments, the computer system increases the visual prominence of the first user interface object by restoring the original clarity, opacity, color saturation, and/or luminance of the first user interface object. For example, in some embodiments, the computer system increases the visual prominence of the first user interface object by restoring the original clarity, opacity, color saturation, and/or luminance of the first user interface object at the first position. In some embodiments, the computer system moves the second user interface object out of the way to redisplay the first user interface object at the first position. For example, in some embodiments, in response to detecting the gaze input directed to the first user interface object 708, the computer system redisplays the first user interface object 708 at the first position and restores the appearance of the first user interface object 708 to that shown in FIG. 7Q, and optionally, pushes the second user interface object to another position on the side. Restoring an appearance of the first user interface object at the first position, in response to detecting that attention of the user is directed to the first user interface object, enables display (e.g., by restoring an appearance of) the first user interface object at the first position without displaying additional controls (e.g., additional controls to move the first user interface object to the first position, and/or to change an appearance of the first user interface object).

In some embodiments, while concurrently displaying the first user interface object and the second user interface object in the first view of the three-dimensional environment (e.g., while the first user interface object is displayed at the third position and the second user interface object is displayed at the second position), the computer system detects back and forth movement of a gaze input between the first user interface object and the second user interface object. In response to detecting the back-and-forth movement of the gaze input between the first user interface object and the second user interface object: during a first portion of the back-and-forth movement, in accordance with a determination that the gaze input is moved from the second user interface object to the first user interface object, the computer system changes one or more display properties of at least one of the first user interface object and the second user interface object, such that the first user interface object gains greater visual prominence than the second user interface object; and during a second portion of the back-and-forth movement, in accordance with a determination that the gaze input is moved from the first user interface object to the second user interface object, the computer system changes one or more display properties of at least one of the first user interface object and the second user interface object, such that the second user interface object gains greater visual prominence than the first user interface object. For example, when the user' gaze is shifted from the second user interface object to the first user interface object, the computer system reduces the visual prominence of the second user interface object at the second position, e.g., by blurring and/or darkening the second user interface object and/or reducing the opacity of the second user interface object, and increases the visual prominence of the first user interface object at the third position, e.g., by restoring the original clarity, opacity, and/or luminance of the first user interface object. Similarly, when the user' gaze is shifted from the first user interface object back to the second user interface object, the computer system restores the visual prominence of the second user interface object at the second position, e.g., by restoring its original clarity, opacity, and/or luminance, and decreases the visual prominence of the first user interface object at the third position, e.g., by blurring and/or darkening the first user interface object and/or reducing the opacity of the first user interface object. This process is optionally repeated as the user's gaze is moved back and forth between the first user interface object and the second user interface object. For example, in some embodiments, as illustrated in FIG. 7R-7S, when the user's gaze shifts from the second user interface object 720 to the first user interface object 708, the computer system changes the visual properties of the second user interface object at the first position to make it less visually prominent, and the computer system changes the visual properties of the first user interface object at the third position to restore its visual prominence to its original state as that shown in FIG. 7Q; and when the user's gaze shifts from the first user interface object 708 to the second user interface object 708, the computer system changes the visual properties of the first user interface object at the third position to make it less visually prominent, and the computer system changes the visual properties of the second user interface object at the first position to restore its visual prominence to its original state as that shown in FIG. 7R. Changing one or more display properties of at least one of the first user interface object and the second user interface object such that the first user interface object gains greater visual prominence than the second user interface object, in accordance with a determination that the gaze input is moved from the second user interface object to the first user interface object, and changing one or more display properties of at least one of the first user interface object and the second user interface object, such that the second user interface object gains greater visual prominence than the first user interface object, in accordance with a determination that the gaze input is moved from the first user interface object to the second user interface object, enables user interface objects to be displayed with the appropriate visual prominence, without needing to display additional controls (e.g., additional controls for adjusting the visual prominence of the first user interface object and/or the second user interface object).

In some embodiments, while displaying the second user interface object at the second position and displaying the first user interface object at the third position in the three-dimensional environment (e.g., when the first view of the three-dimensional environment is still displayed), the computer system detects a second user input that is directed to the first user interface object. In response to detecting the second input that is directed to the first user interface object (e.g., while the first viewpoint of the user remains stationary or substantially stationary in the three-dimensional environment) (e.g., in accordance with a determination that the second input meets second criteria (e.g., the second input includes a pinch gesture in conjunction with a gaze input directed to the first user interface object, or a long pinch gesture in conjunction with a focus selector at the first user interface object)): the computer system ceases to display the second user interface object; and the computer system moves the first user interface object from the third position back to the first position in the three-dimensional environment. For example, in some embodiments, after the first user interface object is moved to the third position that is further away from the viewpoint of the user, if another user input directed to the first user interface object (e.g., an input that meets the first criteria for activating the first portion of the first user interface object) is detected, the computer system dismisses the second user interface object and restores the first user interface object back to the first position in the three-dimensional environment. In other words, the original spatial relationship between the first user interface object and the viewpoint of the user is restored. For example, in some embodiments, in FIG. 7S, while the gaze input 709 is directed to the first user interface object 708, if a gesture input meeting first criteria (e.g., a pinch gesture, a tap gesture, or another gesture) is detected, the computer system ceases to display the second user interface object, and redisplays the first user interface object 708 at the first position in the three-dimensional environment. Ceasing to display the second user interface object and moving the first user interface object from the third position back to the first position, in response to detecting the second input directed to the first user interface object, enables the appropriate user interface object to be displayed at the appropriate location, without needing to display additional controls (e.g., additional controls for ceasing to display the second user interface object and/or for moving the first user interface object).

In some embodiments, the second input that is directed to the first user interface object includes a gaze input directed to the first user interface object detected in conjunction with (e.g., concurrently with, and/or within a time window of) an air gesture (e.g., a pinch gesture, a long pinch gesture, or a tap gesture). For example, in some embodiments, in FIG. 7S, while the gaze input 709 is directed to the first user interface object 708, if the computer system detects an air gesture input that meets first criteria (e.g., a pinch gesture, a long pinch gesture, or a tap gesture), the computer system ceases to display the second user interface object and redisplays the first user interface object at the first position in the three-dimensional environment (e.g., restores the state shown in FIG. 7P). Ceasing to display the second user interface object and moving the first user interface object from the third position back to the first position, in response to detecting a gaze input directed to the first user interface object in conjunction with an air gesture, enables the appropriate user interface object to be displayed at the appropriate location, without needing to display additional controls (e.g., additional controls for ceasing to display the second user interface object and/or for moving the first user interface object).

In some embodiments, moving the first user interface object from the third position back to the first position in the three-dimensional environment includes moving the first user interface object in a direction toward the first viewpoint of the user. In some embodiments, if the viewpoint has moved in the three-dimensional environment (e.g., due to the movement of the display generation component in the physical environment) while the first user interface object and the second user interface object are concurrently displayed, the first user interface object and the second user interface object are, optionally, anchored to the current viewpoint of the user and move in the three-dimensional environment in accordance with the movement of the viewpoint. Therefore, when an input (e.g., a gaze input directed to the first user interface object detected in conjunction with an air gesture (e.g., a pinch gesture, a long pinch gesture, or a tap gesture)) is detected to navigate back to the first user interface object and dismiss the second user interface object, the computer system ceases to display the second user interface object and moves the first user interface object from its current position toward the current viewpoint of the user, such that the original spatial relationship (e.g., the first spatial relationship, and/or a first viewing distance) between the first user interface object and the viewpoint of the user is restored. For example, in some embodiments, in FIG. 7S, while the gaze input 709 is directed to the first user interface object 708, if the computer system detects an air gesture input that meets first criteria (e.g., a pinch gesture, a long pinch gesture, or a tap gesture), the computer system ceases to display the second user interface object and redisplays the first user interface object at the first position in the three-dimensional environment (e.g., restores the state shown in FIG. 7P), which includes moving the first user interface object 708 toward the first viewpoint until the first user interface object 708 reaches the first position at the first distance away from the first viewpoint. Ceasing to display the second user interface object and moving the first user interface object from the third position back to the first position, including moving the first user interface object in a direction toward the first viewpoint of the user, in response to detecting the second input directed to the first user interface object, enables the appropriate user interface object to be displayed at the appropriate location, without needing to display additional controls (e.g., additional controls for ceasing to display the second user interface object and/or for moving the first user interface object).

In some embodiments, while displaying the first user interface object at the third position and displaying the second user interface object at the second position, detecting a third input that includes movement of a hand of a user in a first posture (e.g., a pinch posture, index finger and thumb maintaining contact with each other, or a three-finger pinch posture) followed by a release of the first posture (e.g., breaking the pinch posture, ceasing contact between the index finger and the thumb, or ceasing contact of at least two fingers of the three-finger pinch posture). In response to detecting the third input, the computer system ceases to display the second user interface object in the three-dimensional environment. In some embodiments, the computer system, optionally, in response to the third input ceases to display the first user interface object in the three-dimensional environment. In some embodiments, the computer system, optionally, in response to the third input, moves the first user interface object back to a position that restores the first spatial relationship between the first user interface object and the current viewpoint of the user. In some embodiments, the computer system displays a user interface object such as a close button concurrently with the second user interface object; and in response to activation of the user interface object (e.g., a gaze input directed to the close button detected in conjunction with an air gesture (e.g., a pinch gesture, a tap gesture, or a long pinch gesture), or an activation input while a focus selector at the close button), the computer system ceases to display the second user interface object in the three-dimensional environment, and optionally, ceases to display the first user interface object or moves the first user interface object back to a position that restores the first spatial relationship between the first user interface object and the current viewpoint of the user. For example, in some embodiments, as shown in FIGS. 7V-7W, while displaying the second user interface object and the first user interface object at their respective positions (e.g., displaying the first user interface object 708 at the third position and displaying the second user interface object 720 at the second position, or displaying the first user interface object at a different position behind the second user interface object after the second user interface object has been translated to a different position by the user (e.g., shown in FIGS. 7U-7V)), the computer system detects a gesture input 728 (e.g., a pinch and drag in the downward direction, or a pinch and wrist-flick gesture) (optionally, in conjunction with detecting a gaze input 717 directed to an unoccupied portion of the second user interface object 720); and in response to detecting the gesture input 728 (and optionally the gaze input 717) (as shown in FIG. 7V), the computer system ceases to display the second user interface object 720 and restores the appearance of the first user interface object 708 and restores the spatial relationship between the first user interface object 708 and the current viewpoint to the spatial relationship that existed before the display of the second user interface object 720 (e.g., if the current viewpoint is the first viewpoint and the first user interface object and the second user interface object had not been moved by a user input 728, the first user interface object 708 would be redisplayed at the first position with its original appearance, and/or if the current viewpoint is the second viewpoint, the first user interface object 708 is displayed at a position that is the first distance away from the second viewpoint (e.g., at the second position, and/or the last position of the second user interface object before the second user interface object was dismissed)). Ceasing to display the second user interface object in response to detecting a third input that includes movement of a hand of a user in a first posture followed by a release of the first posture, enables user interface objects to be dismissed (e.g., such that they are no longer displayed) without needing to display additional controls (e.g., additional controls for ceasing to display the second user interface object).

In some embodiments, while displaying the first user interface object at the first position in the three-dimensional environment, displaying a grabber object (e.g., grabber object 714 in FIG. 7Q) at a fourth position in the three-dimensional environment, wherein the grabber object has a second spatial relationship to the first user interface object (e.g., the grabber object is anchored to an edge of the first user interface object, and has the same or substantially the same z-depth of the first user interface object) and the first user interface object is configured to move with the grabber object when the grabber object is moved in the three-dimensional environment. For example, in some embodiments, as shown in FIG. 7Q, the grabber object 714 is displayed below the bottom edge of the first user interface object 708. If a drag input directed to the grabber object (e.g., a pinch and drag gesture detected in conjunction with a gaze input directed to the grabber object 714, or another select and drag input) is detected, the computer system translates the first user interface object 708 and the grabber object 714 together in accordance with the drag input while maintaining the spatial relationship between the first user interface object 708 and the grabber object 714 during the translation of the first user interface object 708 and the grabber object 714. In response to detecting the first input, the computer system displays the grabber object at a fifth position in the three-dimensional environment (e.g., the grabber object is anchored to the second user interface object and has the same or substantially the same z-depth as the second user interface object, while the second user interface object is displayed at the second position and the first user interface object is moved to the third position), wherein the fifth position and the fourth position have less than a threshold amount of difference in distance from the first viewpoint of the user (e.g., the fifth position and the fourth position have the same or substantially the same distance from the first viewpoint of the user). For example, in some embodiments, as shown in FIG. 7Q-7R, the grabber object 724 and the grabber object 714 are the same object; and in response to detecting the input that causes the display of the second user interface object 720 at the first position, the computer system moves the grabber object 714 shown in FIG. 7Q downward to below the bottom edge of the second user interface object 720, without changing the display depth of the grabber object 714, and the grabber object 714 displayed below the second user interface object 720 in FIG.

7R is labeled as grabber object 724. For example, in some embodiments, when the second user interface object is displayed at the second position and the first user interface object is displayed at the third position in the three-dimensional environment, the grabber object remains stationary (e.g., when the second user interface object has a bottom edge that is higher than the bottom edge of the first user interface object). In some embodiments, when the second user interface object is displayed at the second position and the first user interface object is displayed at the third position in the three-dimensional environment, the grabber object is moved from the fourth position to the fifth position (e.g., from the bottom edge region of the first user interface object to the bottom edge region of the second user interface object), but the viewing depth or z-position of the grabber object remains unchanged. In some embodiments, the spatial relationship between the grabber object and the second user interface object is the same or substantially the same as the spatial relationship between the grabber object and the first user interface project prior to the display of the second user interface object. In some embodiments, the grabber bar only moves when the bottom edge of the second user interface object is lower than the bottom edge of the first user interface object. In some embodiments, a different edge other than the bottom edge (e.g., top edge, left edge, or another edge) of the user interface objects are used to determine how to position the grabber bar. In some embodiments, while the grabber object is displayed at the fifth position (e.g., at the bottom region of the second user interface object), a user input that drags the grabber object causes the first user interface object and the second user interface object to be moved concurrently with the grabber object, such that the spatial relationship between the first user interface object and the second user interface object, and the spatial relationship between the grabber object and the second user interface object, are maintained during the user-controlled movement of the grabber object. For example, when the user drags the grabber object from the left to the right of the current field of view of the user, both the first user interface object and the second user interface object are moved from the left to the right of the field of view of the user. In some embodiments, the grabber object is moved in accordance with a user input from a position with a smaller viewing depth to a position with a larger viewing depth, and as a result, the first user interface object and the second user interface objects are moved further away from the viewpoint of the user according to the movement of the grabber object. Displaying a grabber object at a fourth position in the three-dimensional environment, wherein the grabber object has a second spatial relationship to the first user interface object, provides improved visual feedback to the user (e.g., improved visual feedback that the first user interface object can be moved, and/or improved visual feedback regarding how to move the first user interface object).

In some embodiments, displaying the grabber object at the fifth position in the three-dimensional environment includes: in accordance with a determination that a first edge (e.g., bottom edge, top edge, or another edge) of the second user interface object displayed at the second position is outside of an area previously occupied by the first user interface object displayed at the first position, moving the grabber object beyond the first edge of the second user interface object; and in accordance with a determination that the first edge (e.g., bottom edge, top edge, or another edge) of the second user interface object displayed at the second position is within the area previously occupied by the first user interface object displayed at the first position, maintaining the grabber object at its current position in the three-dimensional environment. For example, in some embodiments, in the example shown in FIG. 7Q-7R, the second user interface object 720 is larger in the vertical direction than the first user interface object 708, and the computer system moves the grabber object 714 (shown in FIG. 7Q, and relabeled as grabber object 724 in FIG. 7R) downward to a position below the bottom edge of the second user interface object 720 which is lower in position than the bottom edge of the first user interface object. If in another example the second user interface object is smaller than the first user interface object in the vertical direction, the bottom edge of the second user interface object would be higher in position than the bottom edge of the first user interface object, and the grabber object 714 would not be moved in the vertical direction, in accordance with some embodiments. Moving the grabber object beyond the first edge of the second user interface object in accordance with a determination that a first edge of the second user interface object is outside an area previously occupied by the first user interface object, and maintaining the grabber object at its current position in accordance with a determination that the first edge of the second user interface object is within the area previously occupied by the first user interface object, enables the grabber object to be displayed at an appropriate location without needing to display additional controls (e.g., additional controls for adjusting a position of the grabber object).

[pinch to select in modal user interface] In some embodiments, the second user interface object includes at least a first selectable object that corresponds to a first operation of the computer system. While displaying the second user interface object at the second position, the computer system detects a fourth input directed to the first selectable object within the second user interface object. In response to detecting the fourth input directed to the first selectable object: in accordance with a determination that the fourth input meets preset criteria for selecting the first selectable object (e.g., the fourth input is a pinch gesture in conjunction with a gaze on the first selectable object, or a tap gesture while a focus selector is on the first selectable object), the computer system performs the first operation. In some embodiments, in response to detecting an input that does not meet the preset criteria for selecting the first selectable object, the computer system forgoes performing the first operation. For example, in some embodiments, as shown in FIG. 7V, the second user interface object 720 includes one or more selectable user interface elements (e.g., user interface elements 720-1, 720-2, and/or 720-3) that corresponding to respective operations. For example, the operations include toggling a control value, opening a new window, launching an AR or VR experience, changing a level of immersion of the currently displayed experience, accepting a communication request, sending a communication request, activate or deactivate a control, performing an operation specified by a menu option, performing an operation within an application corresponding to the first user interface object and/or the second user interface object. In some embodiments, the computer system detects a gaze input 715-2 directed to the user interface element 722-2 in conjunction with a gesture input of a first gesture type (e.g., a pinch gesture, a tap gesture, and/or another gesture type), and in response to detecting the inputs, the computer system performs a first operation that corresponds to the user interface element 722-2, in accordance with some embodiments. In some embodiments, the computer system detects the gaze input directed to another user interface element in the second user interface object in conjunction with detecting the gesture input of the first gesture type, and the computer system forgoes performing the first operation and optionally performs another operation that corresponds to the selected user interface element, in accordance with some embodiments. Displaying a second user interface object at a second position in the three-dimensional environment, that includes the first selectable object, in response to detecting the first user input that is an input meeting at least a first input threshold, and performing the first operation in accordance with a determination that the fourth input meets preset criteria for selecting the first selectable object, and in response to detecting the fourth input directed to the first selectable object, enables the first operation to be performed without needing to permanently display additional controls (e.g., the first selectable object).

In some embodiments, the second user interface object includes at least a first control that corresponds to a first control function that has one or more control values. While displaying the second user interface object at the second position, the computer system detects a fifth input directed to the first control within the second user interface object. In response to detecting the fifth input directed to the first control: in accordance with a determination that the fifth input meets preset criteria for adjusting the control (e.g., the fifth input is a pinch and drag gesture in conjunction with a gaze on the first selectable object, or a twist gesture while a focus selector is on the first selectable object), the computer system adjusts a current control value of the control function in accordance with the fifth input. For example, in some embodiments, as shown in FIG. 7V, the second user interface object 720 includes one or more selectable user interface elements (e.g., user interface elements 720-1, 720-2, and/or 720-3) that corresponding to respective control functions. For example, the control functions include adjusting a volume level, brightness level, color saturation level, levels of immersion, media playback progress control, and/or other adjustable controls with adjustable values within a value range. In some embodiments, the control values are continuous within the control value range. In some embodiments, the control values are discrete values within the control value range. In some embodiments, the computer system detects a gaze input 715-2 directed to the user interface element 722-2 in conjunction with a gesture input of a first gesture type (e.g., a pinch and drag gesture, a pinch and twist gesture, and/or another gesture type), and in response to detecting the inputs, the computer system adjusts the control value of the first control function that corresponds to the user interface element 722-2 in accordance with the gesture input, in accordance with some embodiments. In some embodiments, the gesture input is directional and the computer system adjusts the control value in different directions (e.g., increase, decrease, and/or in a respective direction among multiple directions) based on the direction of the gesture input, in accordance with some embodiments. Displaying a second user interface object at a second position in the three-dimensional environment, that includes the first control object, in response to detecting the first user input that is an input meeting at least a first input threshold, and adjusting a current control value of the control function in accordance with a fifth input that meets preset criteria, enables control values of the control function to be adjusted without needing to permanently display additional controls (e.g., the first control).

In some embodiments, the second user interface object has a greater spatial extent in at least one dimension (e.g., in the x direction and/or y-direction, and/or occupies a larger area) at the second position than the first user interface object at the first position. For example, as shown in FIG. 7R, the second user interface object 720 is larger in the vertical dimension than the first user interface object. In some embodiments, the second user interface object is larger than the first user interface object in the horizontal dimensional. Displaying the second user interface object with a greater spatial extent, in at least one dimension, than the first user interface object, provides improved visual feedback to the user (e.g., by drawing the user's attention to the second user interface object).

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, and 1200) are also applicable in an analogous manner to method 1100 described above with respect to FIG. 11. For example, the gestures, gaze inputs, physical objects, user interface objects, controls, movements, criteria, three-dimensional environment, display generation component, surface, representation of physical object, virtual objects, and/or animations described above with reference to method 1100 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 800, 900, 1000 and 1200). For brevity, these details are not repeated here.

Figure 12:
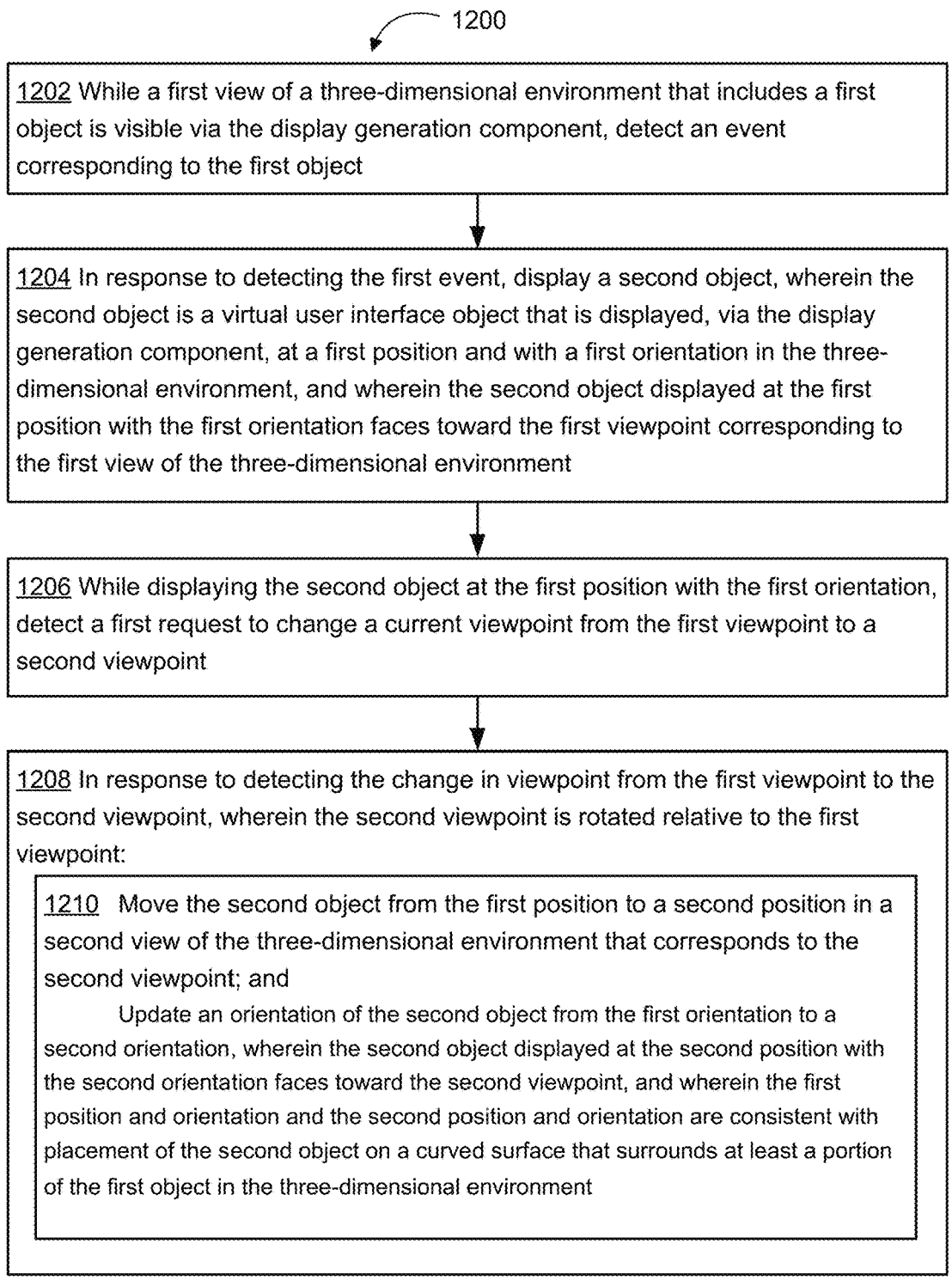
FIG. 12 is a flowchart of a method of displaying a virtual object in association with an object in a three-dimensional environment while updating a view of the three-dimensional environment in accordance with movement of a viewpoint of a user, in accordance with some embodiments.

FIG. 12 is a flowchart of a method 1200 of displaying a virtual object in association with an object in a three-dimensional environment while updating a view of the three-dimensional environment in accordance with movement of a viewpoint of a user, in accordance with some embodiments. In some embodiments, the virtual object is anchored to a curved surface and is reoriented to face toward the viewpoint of the user, as the user moves around the object in the three-dimensional environment. Displaying a second object that is a virtual user interface object, at a first position and with a first orientation in a three-dimensional environment that faces toward a first viewpoint corresponding to a first view in the three-dimensional environment, in response to detecting a first event corresponding to the first object; and moving the second object from the first position to a second position and updating an orientation of the second object from the first orientation to a second orientation facing toward a second viewpoint, consistent with placement of the second object on a curved surface surrounding at least a portion of a first object in the three-dimensional environment, in response to detecting a change in viewpoint from the first viewpoint to the second viewpoint, automatically displays the second object with the appropriate position and orientation without requiring further user input from the user (e.g., further user input to move the second object and/or adjust an orientation of the second object, each time there is a change in the viewpoint).

In some embodiments, the method 1200 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, optionally, one or more input devices (e.g., a camera (e.g., cameras, color sensors, infrared sensors, and/or other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, the method 1200 is performed at a computer system including or in communication with a display generation component (e.g., a heads-up display, a head-mounted display (HMD), a display, a touchscreen, a projector, a tablet, and/or a smartphone) and one or more input devices (e.g., cameras, controllers, touch-sensitive surfaces, joysticks, and/or buttons). While a first view of a three-dimensional environment that includes a first object (e.g., a representation of a first physical object in the physical environment, a first virtual object, an application icon, a window, a menu, or an avatar of a user) is visible via the display generation component, the computer system detects (1202) a first event corresponding to the first object (e.g., the event includes receipt of a notification, or detection of a user interaction event, such as an air gesture that corresponds to the first object). For example, in some embodiments, as shown in FIG. 7X, the computer system detects a gesture input 730 in conjunction with a gaze input 721 directed to a first object 732, while a first view of a three-dimensional environment 7000' is visible via the display generation component 7100. In response to detecting the first event, the computer system displays (1204) a second object, wherein the second object is a virtual user interface object that is displayed, via the display generation component, at a first position and with a first orientation in the three-dimensional environment (e.g., the second object is a window, a menu, a control panel, a notification, or an alert, but not a representation of the physical environment or physical object in an AR environment). The second object displayed at the first position with the first orientation faces toward the first viewpoint corresponding to the first view of the three-dimensional environment (e.g., facing toward the first viewpoint, centered at an intersection between a smooth surface enclosing the first object and a ray connecting the first viewpoint and the first object). For example, as shown in FIGS. 7X-7Y, in response to detecting the first event (e.g., gesture input 730 in conjunction with gaze input 721 in FIG. 7X), the computer system displays a second object 740 at a first position with a first orientation facing toward the first viewpoint that corresponds to the first view of the three-dimensional environment (as shown in FIG. 7Y). The first position is on a cylindrical surface 736 (e.g., surface represented by the dashed lines in FIG. 7Y that are, optionally, not actually rendered by the display generation component). While displaying the second object at the first position with the first orientation, the computer system detects (1206) a first request to change a current viewpoint from the first viewpoint to a second viewpoint (e.g., head movement of the user wearing an HMD, movement of the one or more cameras included in or in communication with the display generation component). For example, as shown in FIGS. 7AB-7AC, while displaying the second object 740 at the first position with the first orientation, the computer system detects that the user 7002 and/or the display generation component 7100 move around the location that corresponds to the position of the first object 732 in the three-dimensional environment, and the computer system updates the view of the three-dimensional environment from the first view to a second view that corresponds to a second viewpoint of the user (as shown in FIG. 7AC). In response to detecting the change in viewpoint from the first viewpoint to the second viewpoint, wherein the second viewpoint is rotated relative to the first viewpoint (1208): the computer system moves (1210) the second object from the first position to a second position in a second view of the three-dimensional environment that corresponds to the second viewpoint; and the computer system updates an orientation of the second object from the first orientation to a second orientation, wherein the second object displayed at the second position with the second orientation faces toward the second viewpoint, and wherein the first position and orientation and the second position and orientation are consistent with placement of the second object on a curved surface that surrounds at least a portion of the first object in the three-dimensional environment. For example, in some embodiments, as shown in FIGS. 7AB-7AC, in response to detecting the movement of the viewpoint of the user (e.g., indicated by the change in the position of the user's eyes 592 in inset 734), the computer system changes the position of the second object 740 around the curved surface 736 (e.g., the second object 740 is moved closer to fixed point 738 on the curved surface 736), and changed the orientation of the second object 740 (e.g., rotated around the new position of the second object on the curved surface 736) so that the second object continues to face toward the viewpoint of the user (e.g., as indicated by the position of the user's eyes 592 in FIG. 7AC). In some embodiments, the second viewpoint is rotated relative to an axis of the first object, such as an axis of the first object that is parallel a surface of the second object that is facing the first viewpoint, as an axis of the first object that is parallel a surface of the second object that is facing the second viewpoint, an axis of the first object that is not perpendicular to a surface of the second object that is facing the first viewpoint, or an axis of the first object that is not perpendicular to a surface of the second object that is facing the second viewpoint. In some embodiments, the first viewpoint and the second viewpoint have a same orientation relative to gravity. In some embodiments, the first orientation of the second object and the second orientation of the second object have a same orientation relative to gravity. In some embodiments, in response to detecting the change in viewpoint from the first viewpoint to the second viewpoint, wherein the second viewpoint is rotated relative to the first viewpoint: in accordance with a determination that the change in viewpoint from the first viewpoint to the second viewpoint is a result of movement of the user around the first object, the computer system moves the second object from the first position to a second position in the second view of the three-dimensional environment that corresponds to the second viewpoint and the computer system updates an orientation of the second object from the first orientation to a second orientation, wherein the second object displayed at the second position with the second orientation faces toward the second viewpoint, and wherein the first position and orientation and the second position and orientation are consistent with placement of the second object on a curved surface that surrounds at least a portion of the first object in the three dimensional environment; and in accordance with a determination that the change in viewpoint from the first viewpoint to the second viewpoint is not a result of movement of the user around the first object (e.g., instead, is the result of the user tilting his/her head, or moving toward or away from the first object), the computer system forgoes moving the second object from the first position to the second position in the second view of the three-dimensional environment that corresponds to the second viewpoint and the computer system forgoes updating the orientation of the second object from the first orientation to a second orientation. The movement and reorientation of the second user interface object are illustrated in the example shown in FIGS. 7AB-7AC, in accordance with some embodiments. As shown in FIGS. 7AB-7AC, while displaying the second object 740 at the first position with the first orientation, the computer system detects that the user 7002 and the display generation component 7100 move around the location that corresponds to the position of the first object 732 in the three-dimensional environment, and the computer system updates the view of the three-dimensional environment from the first view to a second view that corresponds to a second viewpoint of the user (as shown in FIG. 7AC). In addition to updating the view of the three-dimensional environment from the first view to the second view, the computer system also moves the second object 740 from the first position on the cylindrical surface 736 to a second position on the cylindrical surface 736, and changes the orientation of the second object 740 from a first orientation facing toward the first viewpoint of the user (shown in FIG. 7AB) to a second orientation facing toward the second viewpoint of the user (shown in FIG. 7AC).

In some embodiments, while displaying the second object at the second position with the second orientation in the second view of the three-dimensional environment that corresponds to the second viewpoint, the computer system detects a second request to change the current viewpoint from the second viewpoint to a third viewpoint (e.g., additional head movement of the user wearing an HMD, additional movement of the one or more cameras included in or in communication with the display generation component). For example, as shown in FIGS. 7AC and 7AE, while displaying the second object 740 at the second position with the second orientation, the computer system detects that the user 7002 and/or the display generation component 7100 move around the location that corresponds to the position of the first object 732 in the three-dimensional environment, and the computer system updates the view of the three-dimensional environment from the second view to a third view that corresponds to a third viewpoint of the user (as shown in FIG. 7AE). In response to detecting the change in the current viewpoint from the second viewpoint to the third viewpoint, wherein the third viewpoint is rotated relative to the second viewpoint: the computer system moves the second object from the second position to a third position in a third view of the three-dimensional environment that corresponds to the third viewpoint, and the computer system updates the orientation of the second object from the second orientation to a third orientation, wherein the second object displayed at the third position with the third orientation faces toward the third viewpoint, and wherein the first position and orientation, the second position and orientation, and the third position and orientation are consistent with placement of the second object on the same curved surface that surrounds at least a portion of the first object in the three dimensional environment. For example, in some embodiments, as shown in FIG. 7AC followed by 7AE, in response to detecting the movement of the viewpoint of the user (e.g., indicated by the change in the position of the user's eyes 592 in inset 734), the computer system changes the position of the second object 740 around the curved surface 736 (e.g., the second object 740 is moved closer to fixed point 738 on the curved surface 736), and changed the orientation of the second object 740 (e.g., rotated around the new position of the second object on the curved surface 736) so that the second object continues to face toward the viewpoint of the user (e.g., as indicated by the position of the user's eyes 592 in FIG. 7AE). In some embodiments, the third viewpoint is rotated relative to an axis of the first object, such as an axis of the first object that is parallel a surface of the second object that is facing the first viewpoint, an axis of the first object that is parallel a surface of the second object that is facing the second viewpoint, an axis of the first object that is parallel a surface of the second object that is facing the third viewpoint, an axis of the first object that is not perpendicular to a surface of the second object that is facing the first viewpoint, an axis of the first object that is not perpendicular to a surface of the second object that is facing the second viewpoint, or an axis of the first object that is not perpendicular to a surface of the second object that is facing the third viewpoint. In some embodiments, the first viewpoint, the second viewpoint, and/or the third viewpoint have a same orientation relative to gravity. In some embodiments, the first orientation of the second object and the second orientation of the second object have a same or substantially the same orientation relative to gravity. In some embodiments, the curved surface is a side surface of a cylinder. In some embodiments, the curved surface is a surface of a sphere. In some embodiments, the curved surface is a surface of an ellipsoid. In some embodiments, the curved surface does not conform to the rises and falls on the surface of the first object and is a simple convex surface. The movement and reorientation of the second user interface object are illustrated in the example shown in FIGS. 7AB-7AC, followed by FIG. 7AE, in accordance with some embodiments. As shown in FIGS. 7AB-7AC, followed by FIG. 7AE, while displaying the second object 740 at the second position with the second orientation, the computer system detects that the user 7002 and the display generation component 7100 move around the location that corresponds to the new position of the first object 732 in the three-dimensional environment, and the computer system updates the view of the three-dimensional environment from the second view to a third view that corresponds to a third viewpoint of the user (as shown in FIG. 7AE). In addition to updating the view of the three-dimensional environment from the second view to the third view, the computer system also moves the second object 740 from the second position on the cylindrical surface 736 to third position on the cylindrical surface 736, and changes the orientation of the second object 740 from a second orientation facing toward the second viewpoint of the user (shown in FIG. 7AC) to a third orientation facing toward the third viewpoint of the user (shown in FIG. 7AE). Moving the second object from the second position to a third position in a third view of the three-dimensional environment that corresponds to the third viewpoint, and updating the orientation of the second object from the second orientation to a third orientation facing toward the third viewpoint, consistent with placement of the second object on the same curved surface that surrounds at least a portion of the first object, automatically orients the second object appropriated in the third view of the three-dimensional environment without the need for additional user input (e.g., additional user input to manually adjust the orientation of the second object, after a change in viewpoint).

In some embodiments, the second object includes at least a first portion that corresponds to a first operation of the computer system and a second portion that corresponds to a second operation of the computer system, the first portion and the second portion are separately located within the second object, and the first operation is distinct from the second operation. For example, the second object 740 includes internal interactive user interface elements 742-1 and 742-2 (FIG. 7Y). In some embodiments, while displaying the second object (e.g., displaying the second object at the first position with the first orientation, displaying the second object at the second position with the second orientation, or displaying the second object at the third position with the third orientation), the computer system detects a user input directed to the second object. In response to detecting the user input directed to the second object: in accordance with a determination that the user input is directed to the first portion of the second object and a determination that the user input meets activation criteria (e.g., the user input is a long pinch air gesture detected in conjunction with a gaze input directed to the first portion of the second object, or the user input is a tap gesture detected in conjunction with a focus selector at the first portion of the second object), the computer system performs the first operation (e.g., selecting a first menu option located at the first portion of the second object, or launching a first user interface of an application corresponding to the first object), and in accordance with a determination that the user input is directed to the second portion of the second object and a determination that the user input meets the activation criteria, (e.g., the user input is a long pinch air gesture detected in conjunction with a gaze input directed to the second portion of the second object, or the user input is a tap gesture detected in conjunction with a focus selector at the second portion of the second object), the computer system performs the second operation (e.g., selecting a second menu option located at the second portion of the second object, or launching a second user interface of an application corresponding to the first object). For example, in some embodiments, as shown in FIG. 7Y, if a user input is detected at the location of the second object 740 (e.g., a gaze input detected in conjunction with an air gesture meeting activation criteria, or a direct manipulation gesture detected at the location of the second object 740), the computer system selectively activates the user interface element 742-1 or the user interface element 742-2 and perform their corresponding operations based on the location of the user input. If the user input is directed to the portion of the second object 740 containing the user interface element 742-1, the computer system performs the operation corresponding to the user interface element 742-1 and not the operation corresponding to the user interface element 742-2; and if the user input is directed to the portion of the second object 740 containing the user interface element 742-2, the computer system performs the operation corresponding to the user interface element 742-2 and not the operation corresponding to the user interface element 742-1. Displaying the second object at the first position and with the first orientation in a three-dimensional environment that faces toward a first viewpoint corresponding to the first view in the three-dimensional environment, in response to detecting a first event corresponding to the first object, wherein the second object includes at least a first portion that corresponds to a first operation of the computer system and a second portion that corresponds to a second operation of the computer system, provides additional control options (e.g., corresponding to the first operation and the second operation) without needing to permanently display additional controls (e.g., the first portion and the second portion of the second object).

In some embodiments, the curved surface that surrounds at least a portion of the first object in the three-dimensional environment is a continuous and convex surface (e.g., a spherical surface, an ellipsoidal surface, or a cylindrical surface). For example, in some embodiments, as shown in FIG. 7Y, the curved surface 736 is a continuous and convex surface surrounding the first object 732. In some embodiments, the curved surface is selected based on the shape and size of the first object. In some embodiments, the curved surface has the same basic shape for objects of different sizes and shapes. In some embodiments, the curved surface is not a surface of the first object and is not a surface that conform closely to the surface of the first object. Moving the second object from the first position to the second position and updating the orientation of the second object from the first orientation to the second orientation facing toward the second viewpoint, consistent with placement of the second object on the curved surface, which is a continuous and convex surface, surrounding at least the portion of a first object in the three-dimensional environment, in response to detecting the change in viewpoint from the first viewpoint to the second viewpoint, automatically displays the second object with the appropriate position and orientation without requiring further user input from the user (e.g., further user input to move the second object and/or adjust an orientation of the second object, each time there is a change in the viewpoint).

In some embodiments, detecting the first request to change the current viewpoint from the first viewpoint to the second viewpoint includes detecting first movement of a user that is in a position to view the three-dimensional environment via the display generation component (e.g., the user wearing an HMD that serves as the display generation component, or movement of a user holding the display generation component), wherein the first movement of the user causes the current viewpoint to rotate by at least a first threshold amount of rotation around the first object. For example, in some embodiments, in FIGS. 7AB-7AC, followed by FIG. 7AE, detecting the change in the current viewpoint of the user includes detecting movement of the user 7002 in the physical environment relative to a location that corresponds to the first object 732. In some embodiments, updating the orientation of the second object from the first orientation to the second orientation includes facing the second object toward the user (e.g., translating the second object along the surface and rotating the second object as the user walks around a location that corresponds to the position of the first object, such that the second user continues to face toward the user in the three-dimensional environment after the movement of the user in the physical environment). For example, in some embodiments, in FIGS. 7AB-7AC, followed by FIG. 7AC, updating the orientation of the second object 740 includes facing the second object 740 toward the location of the user 7002 (represented by the location of the user's eyes 592), as the second object 740 is moved on the curved surface 736. Updating the orientation of the second object from the first orientation to a second orientation that faces the second object toward the user, automatically orients the second object appropriately, without the need for additional user input (e.g., additional user input to manually adjust the orientation of the second object, after a change in viewpoint).

In some embodiments, updating the orientation of the second object from the first orientation to the second orientation includes rotating the second object through a plurality of intermediate orientations between the first orientation and the second orientation as the second object is moved through a plurality of intermediate positions between the first position to the second position, wherein the plurality of intermediate orientations of the second object correspond the plurality of intermediate positions of the second object according to a curvature of the curved surface at the plurality of intermediate positions. For example, in some embodiments, in FIGS. 7AB-7AC, as the user's viewpoint moves continuously and smoothly through the three-dimensional environment, the computer system continuously update the current view of the three-dimensional environment in accordance with the movement of the viewpoint, and the computer system continuously moves the position of the second object 740 on the curved surface 736 and continuously updates the orientation of the second object 740, such that the second object 740 continually to face toward the current viewpoint of the user during the movements of the viewpoint and the second object. Rotating the second object through a plurality of intermediate orientations between the first orientation and the second orientation as the second object is moved through a plurality of intermediate positions between the first position to the second position, wherein the plurality of intermediate orientations correspond to the plurality of intermediate positions according to a curvature of the curved surface at the plurality of intermediate positions, automatically displays the second object at the appropriate location with the appropriate orientation, without requiring further user input (e.g., further user input to move the second object and/or adjust an orientation of the second object, as the second object is moved from the first position to the second position).

In some embodiments, while displaying the second object at the first position with the first orientation, the computer system detects a third request to change the current viewpoint from the first viewpoint to a fourth viewpoint (e.g., head movement of the user wearing an HMD, movement of the one or more cameras included in or in communication with the display generation component). In response to detecting the change in the current viewpoint from the first viewpoint to the fourth viewpoint: the computer system maintains the second object at the first position with the first orientation in a fourth view of the three-dimensional environment that corresponds to the fourth viewpoint. For example, the fourth viewpoint is closer to the first object than the first viewpoint; the fourth viewpoint is farther away from the first object than the first viewpoint. In some embodiments, the first viewpoint and the second viewpoint have a same orientation relative to gravity. In case where the change in viewpoint does not involve a rotation around at least a portion of the first object, and/or merely involves movement of the viewpoint closer to farther away from the first object or second object, or reorienting the viewpoint relative to a center of the field of view, the position and the orientation of the second object remain unchanged in the three-dimensional environment. For example, in some embodiments, as shown in FIG. 7AA-7AB, the second object 740 remains substantially fixed in position and orientation when the viewpoint of the user (e.g., indicated by the position of the user's eye 592 relative to the physical environment in inset 734) moves toward or away from the first object 732 and/or the second object 740, without moving around the first object 732 and/or the second object 740. In some embodiments, the first object 732 is world locked and so is the curved surface 736, and the movement of the second object 740 is constrained by the curved surface 736 despite of the movement of the user's viewpoint. Maintaining the second object at the first position with the first orientation in a fourth view of the three-dimensional environment corresponding to the fourth viewpoint, in response to detecting the change in the current viewpoint from the first viewpoint to the fourth viewpoint, reduces the number of inputs needed to display the second object at the appropriate position and with the appropriate orientation (e.g., the user does not need to perform additional inputs to move the second object back to the first location and/or change an orientation of the second object each time the current viewpoint changes).

In some embodiments, while displaying the second object at the first position with the first orientation in the first view of the three-dimensional environment, the computer system detects a request to move the first object from an original position of the first object to a new position of the first object in the three-dimensional environment. In response to detecting the request to move the first object from the original position of the first object to the new position of the first object: the computer system moves the second object from the first position to a fifth position in accordance with the new position of the first object in the three-dimensional environment. In addition, the computer system also updates the current orientation of the second object from the first orientation to the fifth orientation, wherein the second object displayed at the fifth position with the fifth orientation faces toward the first viewpoint, and wherein the first position and orientation, the second position and orientation, and the fifth position and orientation are consistent with placement of the second object on the same curved surface that surrounds at least a portion of the first object in the three dimensional environment. For example, as shown in FIGS. 7Z-7AA, the computer system detects a user's input (e.g., a gesture input 748-1 in conjunction with a gaze input 721 directed to the first object 732) that corresponds to a request to move the first object 732 to a new location. In response to detecting the user's input, the computer system moves the second object 740 to a new position on the curved surface 736 (e.g., farther away from the fixed point 738 in the clockwise direction) and reorients the second object 740 to continue to face toward the viewpoint of the user (e.g., as indicated by the position of the user's eye 592). In this example, the movement of the second object 740 is caused by the movement of the curved surface 736, which is in turn caused by the movement of the first object 732 relative to the user's viewpoint and/or the physical environment. Moving the second object from the first position to a fifth position in accordance with the new position of the first object in the three-dimensional environment, and updating the current orientation of the second object from the first orientation to the fifth orientation, consistent with placement of the second object on the same curved surface that surrounds at least a portion of the first object, in response to detecting the request to move the first object from the original position of the first object to the new position of the first object, automatically displays the second object at the appropriate position and with the appropriate orientation without requiring further user input (e.g., further user input to move the second object to the new position and/or update the orientation of the second object, each time the first object is moved to a new position).

In some embodiments, the second object and the first object are separated by a first distance when the second object is displayed with the first position and orientation in the first view of the three-dimensional environment, wherein the second object and the first object are separated by a second distance when the second object is displayed with the second position and orientation in the second view of the three-dimensional environment, and wherein there is less than a threshold amount of difference between the first distance and the second distance. For example, in some embodiments, the second object stays approximately the same distance (e.g., with less than a threshold amount of difference in distance) from the first object that it corresponds to as the viewpoint of the user shifts (even if the orientation and/or position of the object shifts by a non-negligible amount). For example, in some embodiments, in FIGS. 7Z-7AE, the distance between points on the curved surface 736 and the position of the first object 732 (e.g., the position of the center of the first object 732, the position of a main portion of the first object 742, and/or the position of a point on the surface of the first object 732 that is closest to the point on the curved surface 740 at which the second object is placed) remains substantially constant for different points on the curved surface 736 at which the second object may be positioned due to the movement of the viewpoint. Displaying the second object and the first object separated by a first distance when the second object is displayed with the first position and orientation, and displaying the object and the first object separated by a second distance when the second object is displayed with the second position and orientation, wherein there is less than a threshold amount of difference between the first distance and second distance, automatically displays the second object and the first object separated by approximately the same distance without requiring further user input (e.g., further user inputs to adjust the location and/or the distance between the second object and the first object), and allows the user to easily locate the second object (e.g., because it is consistently displayed at approximately the same distance from the first object).

In some embodiments, while displaying the first object and the second object in a respective view of the three-dimensional environment, the computer system detects movement of user attention from a first region of the three-dimensional environment that corresponds to the first object and the second object to a second region of the three-dimensional environment that does not correspond to the first object and the second object (e.g., user's gaze moved away from the second object to another object in the three-dimensional environment, and/or user's face turned to the side). For example, in some embodiments, as shown in FIGS. 7AC-7AD, the computer system detects that the user's attention has moved from the region of the three-dimensional environment that includes the first object 732 to the region of the three-dimensional environment that includes the representation 7104' of the physical object 7014 (and does not include the first object 732) (e.g., as indicated by change in the location of the user's gaze (e.g., from gaze 721 to gaze 731)). In response to detecting the movement of user attention from the first region of the three-dimensional environment to the second region of the three-dimensional environment, the computer system changes one or more display properties of the second object to reduce visual prominence of the second object (e.g., fading out the second object, darken the second object, and/or making the second object more translucent) in the respective view of the three-dimensional environment. For example, in some embodiments, as shown in FIGS. 7AC-7AD, in response to detecting the movement of the user's attention from the location of the first object 732 to the location of the representation 7014' of the physical object 7014, the computer system ceases to display the second object 738, or reduces the visual prominence of the second object in other manners (e.g., making the second object more translucent, dimmed, and/or darkened). Changing one or more display properties of the second object to reduce visual prominence of the second object, in response to detecting the movement of user attention from the first region of the three-dimensional environment to the second region of the three-dimensional environment that does not correspond to the first object and the second object, automatically reduces the visual prominence of the second object when the user's attention is not directed to the first object and/or the second object, without requiring further user input (e.g., further user inputs to reduce the visual prominence of the second object if the user's attention is not directed to the first object and/or second object).

In some embodiments, while displaying the second object at the first position with the first orientation, the computer system detects a request to rotate the first object from an original orientation of the first object to a new orientation of the first object in the three-dimensional environment. In response to detecting the request to rotate the first object from the original orientation of the first object to the new orientation of the first object: the computer system updates a spatial relationship between the first object and the second object to maintain the second object at the first position with the first orientation. For example, as shown in FIGS. 7Y-7Z, the computer system detects that the orientation of the first object 732 has been changed relative to the three-dimensional environment (e.g., while the viewpoint remains substantially stationary relative to the three-dimensional environment) in accordance with a user's input (e.g., gesture 746 detected in conjunction with gaze input 721), and the computer system reorients the second object 740 such that the orientation and position of the second object relative to the viewpoint remains unchanged (e.g., the second object 740 remains at the first position with the first orientation). Updating a spatial relationship between the first object and the second object to maintain the second object at the first position with the first orientation, in response to detecting the request to rotate the first object from the original orientation of the first object to the new orientation of the first object, automatically display the second object at the appropriate position and with the appropriate orientation, without requiring additional user input (e.g., additional user input to adjust the location and/or orientation of the second object).

In some embodiments, in response to detecting the first event, and in conjunction with displaying the second object: in accordance with a determination that the second object includes two-dimensional content, the computer system moves the first object away from the current viewpoint (e.g., as described with respect to 7P-7W, where window 708 serves as an example of the first object 732 and the user interface object 720 serves as an example of the second object 740 that displays two-dimensional content, and the window 708 is moved away from the viewpoint when the user interface object 720 is displayed); and in accordance with a determination that the second object includes three-dimensional content, the computer system maintains a spatial relationship between the first object and the current viewpoint (e.g., as described with respect to FIGS. 7X-7Y, where the second object 732 serves as an example of an object that includes three-dimensional content, the spatial relationship between the first object 732 and the viewpoint does not change due to the display of the second object 740). Moving the first object away from the current viewpoint in accordance with a determination that the second object includes two-dimensional content, and maintaining a spatial relationship between the first object and the current viewpoint in accordance with a determination that the second object includes three-dimensional content, automatically displays the first object and the second object at the appropriate locations, without requiring additional user input (e.g., without requiring the user to manually determine if the second object includes two-dimensional content or three-dimensional content, and then manually adjust the location of the first object if needed).

In some embodiments, in accordance with a determination that the first object is an object corresponding to an application (e.g., application icon, a window of an application, or a user interface of an application), the second object is displayed in the three-dimensional environment with a first spatial relationship to the first object (e.g., aligned with the bottom of the first object, and displayed in front of the first object; aligned with the center of the first object and displayed above the first object) in response to detecting the first event. In some embodiments, the first object 732 in FIG. 7X serves as an example of an application icon, an application window, or an application user interface of a first application, and the second object 740 in FIG. 7Y serves as an example of a modal user interface or modal window of the first application. In some embodiments, the second object 740 is displayed with a first spatial relationship to the first object 732 (e.g., as described with respect to user interface object 720 and the user interface object 708, and/or as described with respect to the second object 740 and the first object 732). In some embodiments, the second object is displayed at a position that is selected in accordance with the current position of the first object, and has an orientation that is selected based on both the orientation of the first object and the position of the viewpoint relative to the current position of the first object. In some embodiments, the position and orientation of the second object is automatically updated when the first object is moved (e.g., in response to user input) to a different position in the three-dimensional environment, and/or rotated in the three-dimensional environment. In some embodiments, the position and orientation of the second object is automatically updated when the viewpoint is moved relative to the first object in the three-dimensional environment. The first spatial relationship between the first object and the second object determines the baseline position and orientation of the second object relative to the first object, while the position and orientation of the second object is further adjusted from the baseline position and orientation to face toward the viewpoint under the constraint of the curved surface enclosing at least a portion of the first object. In some embodiments, the second object include a menu of an application that corresponds to the first object. In some embodiments, the second object includes a pop-up window of an application that corresponds to the first object. Displaying the second object in the three-dimensional environment with a first spatial relationship to the first object, in response to detecting the first event, and in accordance with a determination that the first object is an object corresponding to an application, automatically displays the second object with the appropriate first spatial relationship to the first object without requiring further user input (e.g., without requiring the user to first identify that the first object corresponds to an application, and then adjusting the spatial relationship of the second object to the first object accordingly).

In some embodiments, in accordance with a determination that the first object is an object corresponding to a system-level function of the computer system (e.g., a system alert, an operating system user interface, or a notification, as opposed to an application icon, a window of an application, or a user interface of an application), the second object is displayed in the three-dimensional environment with a first spatial relationship to the current viewpoint (e.g., displayed in the middle of the field of view, and/or displayed in the upper left quadrant of the field of view) in response to detecting the first event. In some embodiments, the second object is displayed at a position that is selected in accordance with the position of the current viewpoint. In some embodiments, the position and orientation of the second object is not automatically updated when the first object is moved (e.g., in response to user input) to a different position in the three-dimensional environment, and/or rotated in the three-dimensional environment. In some embodiments, the position and orientation of the second object is automatically updated when the viewpoint is moved relative to the first object in the three-dimensional environment. The first spatial relationship between the second object and the current viewpoint determines the baseline position and orientation of the second object relative to the viewpoint, while the position and orientation of the second object is further adjusted from the baseline position and orientation to face toward the viewpoint under the constraint of the curved surface enclosing at least a portion of the first object. For example, in some embodiments, as shown in FIG. 7X-7Y, in accordance with a determination that the first object 732 is an object that corresponds to a system-level function (e.g., the first object is a smart home device, a control hub, and/or a home location of the computer system), the second object 740 is displayed with a first spatial relationship to the viewpoint (e.g., as indicated by the position of the user's eye 592 in FIGS. 7X and 7Y). In some embodiments, the first spatial relationship between the second object and the current viewpoint determines the baseline position and orientation of the second object 740 relative to the viewpoint, while the position and orientation of the second object 740 is further adjusted from the baseline position and orientation to face toward the viewpoint under the constraint of the curved surface 736 enclosing at least a portion of the first object 732. In some embodiments, the second object is a control user interface including controls for network connections, display brightness, and/or volume. Displaying the second object in the three-dimensional environment with a first spatial relationship to the current viewpoint, in response to detecting the first event and in accordance with a determination that the first object is a system-level function of the computer system, automatically displays the second object with the appropriate spatial relationship without requiring additional user input (e.g., without requiring the user to first identify that the first object corresponds to a system-level function of the computer system, and then adjusting the spatial relationship of the second object to the first object accordingly).

In some embodiments, in accordance with a determination that the first object is smaller than the second object in at least a first dimension (e.g., shorter in the vertical direction, and/or smaller in both the vertical direction and the horizontal direction), the second object is displayed in the three-dimensional environment in accordance with a first alignment configuration relative to the first object (e.g., displayed with the bottom edges of the first object and the second object aligned to each other, or displayed with the top edges of the first object and the second object aligned to each other) in response to detecting the first event. For example, in some embodiments, in FIGS. 7X-7Y, in accordance with a determination that the first object 732 is smaller than the second object 740 in at least the vertical direction, the second object 740 is displayed in accordance with a first alignment configuration relative to the first object (e.g., aligned at the bottom or aligned at the top). Displaying the second object in the three-dimensional environment in accordance with a first alignment configuration relative to the first object, in response to detecting the first event and in accordance with a determination that the first object is smaller than the second object in at least a first dimension, automatically displays the second object with the appropriate alignment configuration relative to the first object without requiring further user input (e.g., further user input to manually adjust the alignment configuration of the second object to the first object).

In some embodiments, in accordance with a determination that the first object is larger than the second object in at least the first dimension (e.g., longer in the vertical direction, or larger in both the vertical direction and the horizontal direction), the second object is displayed in the three-dimensional environment in accordance with a second alignment configuration relative to the first object (e.g., displayed with the second object aligned to the center of the first object) in response to detecting the first event, the second alignment configuration being different from the first alignment configuration. For example, in some embodiments, in FIGS. 7X-7Y, in accordance with a determination that the first object 732 is larger than the second object 740 in at least the vertical direction, the second object 740 is displayed in accordance with a second alignment configuration relative to the first object (e.g., aligned at the center in the vertical direction). Displaying the second object in the three-dimensional environment in accordance with a second alignment configuration, different from the first alignment configuration, relative to the first object, in response to detecting the first event and in accordance with a determination that the first object is larger than the second object in at least the first dimension, automatically displays the second object with the appropriate alignment configuration relative to the first object without requiring further user input (e.g., further user input to manually adjust the alignment configuration of the second object to the first object).

The operations described above with reference to FIGS. 8, 9, 10, 11 and 12 are, optionally, implemented by components depicted in FIGS. 1-6. In some embodiments, aspects/operations of methods 800, 900, 1000, 1100, and 1200 may be interchanged, substituted, and/or added between these methods. For brevity, these details are not repeated here.

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, and 1100) are also applicable in an analogous manner to method 1200 described above with respect to FIG. 12. For example, the gestures, gaze inputs, physical objects, user interface objects, controls, movements, criteria, three-dimensional environment, display generation component, surface, representation of physical object, virtual objects, and/or animations described above with reference to method 1200 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 800, 900, 1000 and 1100). For brevity, these details are not repeated here.

The operations described above with reference to FIGS. 8, 9, 10, 11 and 12 are, optionally, implemented by components depicted in FIGS. 1-6. In some embodiments, aspects/operations of methods 800, 900, 1000, 1100, and 1200 may be interchanged, substituted, and/or added between these methods. For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve user input for XR experiences. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve user input for XR experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A method, comprising:
    at a first computer system that is in communication with a first display generation component and one or more input devices:
        displaying, via the first display generation component, a first object in a first view of a three-dimensional environment;
        while displaying the first object, displaying an alert at a first position relative to the three-dimensional environment, the alert at least partially overlapping the first object in the first view, wherein the first position has a respective spatial relationship to a user;
        detecting, via the one or more input devices, movement of a current viewpoint of the user from a first viewpoint to a second viewpoint, wherein:
        a view of the three-dimensional environment is visible from the second viewpoint, and wherein:
            in accordance with a determination that the alert is a first type of alert, the view of the three-dimensional environment from the second viewpoint includes the alert displayed at a second position in the three-dimensional environment that is different from the first position in the three-dimensional environment, wherein the second position in the three-dimensional environment has the respective spatial relationship to the user while the current viewpoint of the user is the second viewpoint; and
            in accordance with a determination that the alert is a second type of alert, the view of the three-dimensional environment from the second viewpoint does not include the alert with the respective spatial relationship to the user while the current viewpoint of the user is the second viewpoint.

2. The method of claim 1, further comprising, in accordance with a determination that the alert is the first type of alert:
in response to detecting that the user satisfies attention criteria with respect to a second object, distinct from the first object, displaying the alert at a third position in the three-dimensional environment, wherein the third position in the three-dimensional environment at least partially overlaps the second object.

3. The method of claim 1, wherein the first object comprises a three-dimensional virtual object.

4. The method of claim 1, wherein the first object comprises a physical object in a physical environment corresponding to the three-dimensional environment.

5. The method of claim 1, wherein:
the view of the three-dimensional environment from the first viewpoint includes the alert displayed at a first angle, and
the view of the three-dimensional environment from the second viewpoint includes the alert displayed at a second angle.

6. The method of claim 1, wherein:
in accordance with a determination that the alert is the second type of alert, the view of the three-dimensional environment from the second viewpoint includes:
a third object that is associated with the first object; and
the alert displayed at a fourth position in the three-dimensional environment, the alert at least partially overlapping the third object, wherein the alert displayed at the fourth position has a different spatial relationship to the user than the respective spatial relationship while the current viewpoint of the user is the second viewpoint.

7. The method of claim 1, further comprising:
while detecting movement of the current viewpoint of the user, visually deemphasizing the alert relative to other objects displayed in the three-dimensional environment; and
in accordance with a determination that movement of the current viewpoint of the user is no longer detected, redisplaying the alert without visually deemphasizing the alert relative to the other objects displayed in a current view of the three-dimensional environment.

8. The method of claim 1, further comprising, while detecting movement of the current viewpoint of the user from the first viewpoint to the second viewpoint, moving the alert in the three-dimensional environment as the current viewpoint of the user moves.

9. The method of claim 8, wherein the first type of alert is moved according to a first set of properties and the second type of alert is moved according to a second set of properties distinct from the first set of properties.

10. The method of claim 8, wherein, while moving the alert in the three-dimensional environment, in accordance with the determination that the alert is the first type of alert, the alert continues to be displayed as the alert moves to the second position.

11. The method of claim 1, further comprising:
detecting that movement of the current viewpoint of the user from the second viewpoint to a third viewpoint does not satisfy a threshold amount of movement, wherein:
a view of the three-dimensional environment is visible from the third viewpoint; and
in accordance with a determination that the alert is the second type of alert, the view of the three-dimensional environment from the third viewpoint includes the alert displayed as moving in the three-dimensional environment as the current viewpoint of the user moves.

12. The method of claim 1, further comprising:
in response to determining that the alert is displayed for a threshold amount of time without detecting user interaction with the alert:
in accordance with the determination that the alert is the first type of alert, maintaining display of the alert in the three-dimensional environment; and
in accordance with the determination that the alert is the second type of alert, ceasing display of the alert.

13. The method of claim 1, wherein the respective spatial relationship of the alert at the first position to the user, if the alert is the second type of alert, is a higher spatial relationship relative to the user than the respective spatial relationship of the alert at the first position to the user, if the alert is the first type of alert.

14. The method of claim 1, further comprising:
detecting movement of the current viewpoint of the user to a fourth viewpoint, wherein a view of the three-dimensional environment visible from the fourth viewpoint does not include virtual objects, wherein:
a view of the three-dimensional environment is visible from the fourth viewpoint, and wherein:
in accordance with a determination that the alert is the first type of alert, the view of the three-dimensional environment from the fourth viewpoint does not include the first type of alert;
in accordance with a determination that the alert is the second type of alert, the view of the three-dimensional environment from the fourth viewpoint includes the alert displayed as moving in the three-dimensional environment as the current viewpoint of the user moves.

15. The method of claim 1, further comprising, while detecting movement of the current viewpoint of the user, displaying the alert at a position in the three-dimensional environment having a respective spatial relationship to the user that is farther than the respective spatial relationship to the user at the first position.

16. The method of claim 1, wherein the respective spatial relationship to the user at the first position for the first type of alert is a closer spatial relationship relative to the user than the respective spatial relationship to the user at the first position for the second type of alert.

17. The method of claim 1, wherein displaying an alert that is the first type of alert includes displaying content and one or more selectable user interface objects for dismissing the alert.

18. The method of claim 1, further comprising:
while displaying a plurality of separate application regions in the three-dimensional environment, displaying the alert, including:
in accordance with a determination that the alert is the first type of alert, visually deemphasizing the plurality of separate application regions, relative to the alert, in the three-dimensional environment; and
in accordance with a determination that the alert is the second type of alert, visually deemphasizing a first application region of the plurality of separate application regions without deemphasizing a second application region of the plurality of separate application regions, relative to the alert, in the three-dimensional environment.

19. The method of claim 1, further comprising:
while a view of the three-dimensional environment includes a portion of a physical environment, displaying the alert, including:
in accordance with a determination that the alert is the first type of alert, visually deemphasizing the portion of the physical environment in the three-dimensional environment; and
in accordance with a determination that the alert is the second type of alert, forgoing deemphasizing the portion of the physical environment in the three-dimensional environment.

20. A first computer system, comprising:
a first display generation component;
one or more input devices;
one or more processors; and
memory storing one or more programs, wherein the one or more programs are configured to be executed by the one or more processors, the one or more programs including instructions for:
displaying, via the first display generation component, a first object in a first view of a three-dimensional environment;
while displaying the first object, displaying an alert at a first position relative to the three-dimensional environment, the alert at least partially overlapping the first object in the first view, wherein the first position has a respective spatial relationship to a user;
detecting, via the one or more input devices, movement of a current viewpoint of the user from a first viewpoint to a second viewpoint, wherein:
a view of the three-dimensional environment is visible from the second viewpoint, and wherein:
in accordance with a determination that the alert is a first type of alert, the view of the three-dimensional environment from the second viewpoint includes the alert displayed at a second position in the three-dimensional environment that is different from the first position in the three-dimensional environment, wherein the second position in the three-dimensional environment has the respective spatial relationship to the user while the current viewpoint of the user is the second viewpoint; and
in accordance with a determination that the alert is a second type of alert, the view of the three-dimensional environment from the second viewpoint does not include the alert with the respective spatial relationship to the user while the current viewpoint of the user is the second viewpoint.

21. The first computer system of claim 20, the one or more programs further including instructions for, in accordance with a determination that the alert is the first type of alert:
in response to detecting that the user satisfies attention criteria with respect to a second object, distinct from the first object, displaying the alert at a third position in the three-dimensional environment, wherein the third position in the three-dimensional environment at least partially overlaps the second object.

22. The first computer system of claim 20, wherein the first object comprises a three-dimensional virtual object.

23. The first computer system of claim 20, wherein the first object comprises a physical object in a physical environment corresponding to the three-dimensional environment.

24. The first computer system of claim 20, wherein:
the view of the three-dimensional environment from the first viewpoint includes the alert displayed at a first angle, and
the view of the three-dimensional environment from the second viewpoint includes the alert displayed at a second angle.

25. The first computer system of claim 20, wherein:
in accordance with a determination that the alert is the second type of alert, the view of the three-dimensional environment from the second viewpoint includes:
a third object that is associated with the first object; and
the alert displayed at a fourth position in the three-dimensional environment, the alert at least partially overlapping the third object, wherein the alert displayed at the fourth position has a different spatial relationship to the user than the respective spatial relationship while the current viewpoint of the user is the second viewpoint.

26. The first computer system of claim 20, the one or more programs further including instructions for:
while detecting movement of the current viewpoint of the user, visually deemphasizing the alert relative to other objects displayed in the three-dimensional environment; and
in accordance with a determination that movement of the current viewpoint of the user is no longer detected, redisplaying the alert without visually deemphasizing the alert relative to the other objects displayed in a current view of the three-dimensional environment.

27. The first computer system of claim 20, the one or more programs further including instructions for, while detecting movement of the current viewpoint of the user from the first viewpoint to the second viewpoint, moving the alert in the three-dimensional environment as the current viewpoint of the user moves.

28. The first computer system of claim 27, wherein the first type of alert is moved according to a first set of properties and the second type of alert is moved according to a second set of properties distinct from the first set of properties.

29. The first computer system of claim 27, wherein, while moving the alert in the three-dimensional environment, in accordance with the determination that the alert is the first type of alert, the alert continues to be displayed as the alert moves to the second position.

30. The first computer system of claim 20, the one or more programs further including instructions for:
detecting that movement of the current viewpoint of the user from the second viewpoint to a third viewpoint does not satisfy a threshold amount of movement, wherein:
a view of the three-dimensional environment is visible from the third viewpoint; and
in accordance with a determination that the alert is the second type of alert, the view of the three-dimensional environment from the third viewpoint includes the alert displayed as moving in the three-dimensional environment as the current viewpoint of the user moves.

31. The first computer system of claim 20, the one or more programs further including instructions for:
in response to determining that the alert is displayed for a threshold amount of time without detecting user interaction with the alert:
in accordance with the determination that the alert is the first type of alert, maintaining display of the alert in the three-dimensional environment; and in accordance with the determination that the alert is the second type of alert, ceasing display of the alert.

32. The first computer system of claim 20, wherein the respective spatial relationship of the alert at the first position to the user, if the alert is the second type of alert, is a higher spatial relationship relative to the user than the respective spatial relationship of the alert at the first position to the user, if the alert is the first type of alert.

33. The first computer system of claim 20, the one or more programs further including instructions for:
   detecting movement of the current viewpoint of the user to a fourth viewpoint, wherein a view of the three-dimensional environment visible from the fourth viewpoint does not include virtual objects, wherein:
      a view of the three-dimensional environment is visible from the fourth viewpoint, and wherein:
         in accordance with a determination that the alert is the first type of alert, the view of the three-dimensional environment from the fourth viewpoint does not include the first type of alert;
         in accordance with a determination that the alert is the second type of alert, the view of the three-dimensional environment from the fourth viewpoint includes the alert displayed as moving in the three-dimensional environment as the current viewpoint of the user moves.

34. The first computer system of claim 20, the one or more programs further including instructions for, while detecting movement of the current viewpoint of the user, displaying the alert at a position in the three-dimensional environment having a respective spatial relationship to the user that is farther than the respective spatial relationship to the user at the first position.

35. The first computer system of claim 20, wherein the respective spatial relationship to the user at the first position for the first type of alert is a closer spatial relationship relative to the user than the respective spatial relationship to the user at the first position for the second type of alert.

36. The first computer system of claim 20, wherein displaying an alert that is the first type of alert includes displaying content and one or more selectable user interface objects for dismissing the alert.

37. The first computer system of claim 20, the one or more programs further including instructions for:
   while displaying a plurality of separate application regions in the three-dimensional environment, displaying the alert, including:
      in accordance with a determination that the alert is the first type of alert, visually deemphasizing the plurality of separate application regions, relative to the alert, in the three-dimensional environment; and
      in accordance with a determination that the alert is the second type of alert, visually deemphasizing a first application region of the plurality of separate application regions without deemphasizing a second application region of the plurality of separate application regions, relative to the alert, in the three-dimensional environment.

38. The first computer system of claim 20, the one or more programs further including instructions for:
   while a view of the three-dimensional environment includes a portion of a physical environment, displaying the alert, including:
      in accordance with a determination that the alert is the first type of alert, visually deemphasizing the portion of the physical environment in the three-dimensional environment; and
      in accordance with a determination that the alert is the second type of alert, forgoing deemphasizing the portion of the physical environment in the three-dimensional environment.

39. A non-transitory computer readable storage medium storing one or more programs, the one or more programs comprising instructions that, when executed by a first computer system that includes a first display generation component and one or more input devices, cause the first computer system to perform operations including:
   displaying, via the first display generation component, a first object in a first view of a three-dimensional environment;
   while displaying the first object, displaying an alert at a first position relative to the three-dimensional environment, the alert at least partially overlapping the first object in the first view, wherein the first position has a respective spatial relationship to a user;
   detecting, via the one or more input devices, movement of a current viewpoint of the user from a first viewpoint to a second viewpoint; wherein:
      a view of the three-dimensional environment is visible from the second viewpoint, and wherein:
         in accordance with a determination that the alert is a first type of alert, the view of the three-dimensional environment from the second viewpoint includes the alert displayed at a second position in the three-dimensional environment that is different from the first position in the three-dimensional environment, wherein the second position in the three-dimensional environment has the respective spatial relationship to the user while the current viewpoint of the user is the second viewpoint; and
         in accordance with a determination that the alert is a second type of alert, the view of the three-dimensional environment from the second viewpoint does not include the alert with the respective spatial relationship to the user while the current viewpoint of the user is the second viewpoint.

40. The non-transitory computer readable storage medium of claim 39, the one or more programs further including instructions that cause the first computer system to perform operations including, in accordance with a determination that the alert is the first type of alert:
   in response to detecting that the user satisfies attention criteria with respect to a second object, distinct from the first object, displaying the alert at a third position in the three-dimensional environment, wherein the third position in the three-dimensional environment at least partially overlaps the second object.

41. The non-transitory computer readable storage medium of claim 39, wherein the first object comprises a three-dimensional virtual object.

42. The non-transitory computer readable storage medium of claim 39, wherein the first object comprises a physical object in a physical environment corresponding to the three-dimensional environment.

43. The non-transitory computer readable storage medium of claim 39, wherein:
   the view of the three-dimensional environment from the first viewpoint includes the alert displayed at a first angle, and
   the view of the three-dimensional environment from the second viewpoint includes the alert displayed at a second angle.

44. The non-transitory computer readable storage medium of claim 39, wherein:
in accordance with a determination that the alert is the second type of alert, the view of the three-dimensional environment from the second viewpoint includes:
a third object that is associated with the first object; and
the alert displayed at a fourth position in the three-dimensional environment, the alert at least partially overlapping the third object, wherein the alert displayed at the fourth position has a different spatial relationship to the user than the respective spatial relationship while the current viewpoint of the user is the second viewpoint.

45. The non-transitory computer readable storage medium of claim 39, the one or more programs further including instructions that cause the first computer system to perform operations including:
while detecting movement of the current viewpoint of the user, visually deemphasizing the alert relative to other objects displayed in the three-dimensional environment; and
in accordance with a determination that movement of the current viewpoint of the user is no longer detected, redisplaying the alert without visually deemphasizing the alert relative to the other objects displayed in a current view of the three-dimensional environment.

46. The non-transitory computer readable storage medium of claim 39, the one or more programs further including instructions that cause the first computer system to perform operations including, while detecting movement of the current viewpoint of the user from the first viewpoint to the second viewpoint, moving the alert in the three-dimensional environment as the current viewpoint of the user moves.

47. The non-transitory computer readable storage medium of claim 46, wherein the first type of alert is moved according to a first set of properties and the second type of alert is moved according to a second set of properties distinct from the first set of properties.

48. The non-transitory computer readable storage medium of claim 46, wherein, while moving the alert in the three-dimensional environment, in accordance with the determination that the alert is the first type of alert, the alert continues to be displayed as the alert moves to the second position.

49. The non-transitory computer readable storage medium of claim 39, the one or more programs further including instructions that cause the first computer system to perform operations including:
detecting that movement of the current viewpoint of the user from the second viewpoint to a third viewpoint does not satisfy a threshold amount of movement, wherein:
a view of the three-dimensional environment is visible from the third viewpoint; and
in accordance with a determination that the alert is the second type of alert, the view of the three-dimensional environment from the third viewpoint includes the alert displayed as moving in the three-dimensional environment as the current viewpoint of the user moves.

50. The non-transitory computer readable storage medium of claim 39, the one or more programs further including instructions that cause the first computer system to perform operations including:
in response to determining that the alert is displayed for a threshold amount of time without detecting user interaction with the alert:
in accordance with the determination that the alert is the first type of alert, maintaining display of the alert in the three-dimensional environment; and
in accordance with the determination that the alert is the second type of alert, ceasing display of the alert.

51. The non-transitory computer readable storage medium of claim 39, wherein the respective spatial relationship of the alert at the first position to the user, if the alert is the second type of alert, is a higher spatial relationship relative to the user than the respective spatial relationship of the alert at the first position to the user, if the alert is the first type of alert.

52. The non-transitory computer readable storage medium of claim 39, the one or more programs further including instructions that cause the first computer system to perform operations including:
detecting movement of the current viewpoint of the user to a fourth viewpoint, wherein a view of the three-dimensional environment visible from the fourth viewpoint does not include virtual objects, wherein:
a view of the three-dimensional environment is visible from the fourth viewpoint, and wherein:
in accordance with a determination that the alert is the first type of alert, the view of the three-dimensional environment from the fourth viewpoint does not include the first type of alert;
in accordance with a determination that the alert is the second type of alert, the view of the three-dimensional environment from the fourth viewpoint includes the alert displayed as moving in the three-dimensional environment as the current viewpoint of the user moves.

53. The non-transitory computer readable storage medium of claim 39, the one or more programs further including instructions that cause the first computer system to perform operations including, while detecting movement of the current viewpoint of the user, displaying the alert at a position in the three-dimensional environment having a respective spatial relationship to the user that is farther than the respective spatial relationship to the user at the first position.

54. The non-transitory computer readable storage medium of claim 39, wherein the respective spatial relationship to the user at the first position for the first type of alert is a closer spatial relationship relative to the user than the respective spatial relationship to the user at the first position for the second type of alert.

55. The non-transitory computer readable storage medium of claim 39, wherein displaying an alert that is the first type of alert includes displaying content and one or more selectable user interface objects for dismissing the alert.

56. The non-transitory computer readable storage medium of claim 39, the one or more programs further including instructions that cause the first computer system to perform operations including:
while displaying a plurality of separate application regions in the three-dimensional environment, displaying the alert, including:
in accordance with a determination that the alert is the first type of alert, visually deemphasizing the plurality of separate application regions, relative to the alert, in the three-dimensional environment; and
in accordance with a determination that the alert is the second type of alert, visually deemphasizing a first application region of the plurality of separate application regions without deemphasizing a second application region of the plurality of separate application regions, relative to the alert, in the three-dimensional environment.

57. The non-transitory computer readable storage medium of claim 39, the one or more programs further including instructions that cause the first computer system to perform operations including:
  while a view of the three-dimensional environment includes a portion of a physical environment, displaying the alert, including:
    in accordance with a determination that the alert is the first type of alert, visually deemphasizing the portion of the physical environment in the three-dimensional environment; and
    in accordance with a determination that the alert is the second type of alert, forgoing deemphasizing the portion of the physical environment in the three-dimensional environment.

* * * * *